US012669012B2

(12) United States Patent
Wei et al.

(10) Patent No.: US 12,669,012 B2
(45) Date of Patent: Jun. 30, 2026

(54) WINDOW BLIND

(71) Applicant: Nien Made Enterprise Co., Ltd., Taichung City (TW)

(72) Inventors: Shui-Dong Wei, Taichung City (TW); Lei Luo, Taichung City (TW); Lin Chen, Taichung City (TW)

(73) Assignee: Nien Made Enterprise Co., Ltd., Taichung City (TW)

( * ) Notice: Subject to any disclaimer, the term of this patent is extended or adjusted under 35 U.S.C. 154(b) by 502 days.

(21) Appl. No.: 18/116,313

(22) Filed: Mar. 2, 2023

(65) Prior Publication Data

US 2023/0295984 A1 Sep. 21, 2023

(30) Foreign Application Priority Data

Mar. 18, 2022 (TW) ................................ 111202817
Mar. 23, 2022 (CN) ........................ 202220642916.7

(51) Int. Cl.
*E06B 9/382* (2006.01)
*E06B 9/303* (2006.01)
(Continued)

(52) U.S. Cl.
CPC .............. *E06B 9/303* (2013.01); *E06B 9/326* (2013.01); *E06B 2009/285* (2013.01)

(58) Field of Classification Search
CPC .......... E06B 9/303; E06B 9/304; E06B 9/305; E06B 9/306; E06B 9/307; E06B 9/308;
(Continued)

(56) References Cited

U.S. PATENT DOCUMENTS 11,549,308 B2 * 1/2023 Luo ......................... E06B 9/384
2018/0073295 A1 * 3/2018 Nien ....................... E06B 9/382

FOREIGN PATENT DOCUMENTS

CN 101210474 B * 6/2011
CN 206360623 U * 7/2017 ............ E06B 9/384
EP 1956181 A1 * 8/2008 ............ E06B 9/303

OTHER PUBLICATIONS

Machine translation CN206360623 (Year: 2017).*
Machine translation CN101210474 (Year: 2011).*

* cited by examiner

*Primary Examiner* — Daniel P Cahn
*Assistant Examiner* — Jeremy C Ramsey
(74) *Attorney, Agent, or Firm* — Winston Hsu

(57) ABSTRACT

A window blind, wherein each ladder tape thereof includes two longitudinal cords, plural bearers and plural limiting members. The longitudinal cords each have an end connected to a deflecting mechanism disposed on the upper rail. The bearers are disposed between the two longitudinal cords for respectively supporting the slats. The limiting members include a first limiting member and a second limiting member neighboring thereto. The first limiting member has an end disposed on one of the longitudinal cords and includes a first slat-through portion located between two ends thereof passing through a first through hole of a first slat. A first linking loop is formed after the first slat-through portion passes through the first through hole. The second limiting member passes through the first linking loop for keeping the first through hole threaded through by one of the first limiting member and the second limiting member.

23 Claims, 57 Drawing Sheets

(51) Int. Cl.
*E06B 9/326* (2006.01)
*E06B 9/28* (2006.01)

(58) Field of Classification Search
CPC . E06B 9/30; E06B 9/384; E06B 9/382; E06B 9/322; E06B 2009/3222; E06B 2009/3225; E06B 9/326
See application file for complete search history.

WINDOW BLIND

BACKGROUND OF THE DISCLOSURE

1. Field of the Disclosure

The present disclosure relates to a window blind, and more particularly relates to a window blind can prevent the slats of it from being taken out and can fully close the slats to effectively block light leakage, and is safe to use.

2. Description of the Prior Art

A conventional window blind includes an upper rail, a lower rail, several slats, a ladder tape and a deflecting mechanism. The upper rail is for being fixed on a window frame or the wall to suspend the slats and the lower rail. The ladder tape includes a front strip, a rear strip, and several weft strings provided between the front and the rear strips in a spaced parallel alignment, making the whole ladder tape shaped like a ladder with several steps. The deflecting mechanism is disposed inside the upper rail. The top ends of the front and the rear strips are coupled with the deflecting mechanism, so that the ladder tape is suspended below the upper rail. The slats are disposed on the respective steps and supported by the respective weft strings. The deflecting mechanism can retract the front strip and release the rear strip at the same time, or reversely, release the front strip and retract the rear strip at the same time, to tilt the slats for adjusting the amount of light passing through the gaps between the slats.

However, since the slats are simply placed on the respective steps of the ladder tape, the slats can be easily taken out from the corresponding steps because the slats are not restricted from moving. Moreover, since the ladder tape is usually made of soft strands, and the weft strings are usually slightly longer than the length of a shorter side of each slat, when the slats are tilted, particularly in a closed state in which the slats are almost vertical, the tilted slats would have slipped downward from their lower sides in different distances. Under this circumstance, the slats on the respective steps are arranged non-uniformly, causing not only messy appearance of the window blind but also light leakage through the slats, which affects the effects of shielding light and protecting user privacy. Furthermore, the strips, cords and strings of the window blind may be drawn by a child and accidentally wound on the neck of the child.

SUMMARY OF THE DISCLOSURE

In light of the above reasons, one aspect of the present disclosure is to provide a window blind solving the light leakage problem caused by unevenly arrangement of the slats while the window blind is in the light-shielding state, and solving the safety problem caused by the cords. The present disclosure provides a window blind can be switched between a first state and a second state with different amount of light passing therethrough. The window blind includes an upper rail, a lower rail, a deflecting mechanism, a ladder tape and plural slats. The lower rail is situated below the upper rail. The deflecting mechanism is disposed on the upper rail. The ladder tape is connected to the deflecting mechanism and includes a first longitudinal cord, a second longitudinal cord, plural bearers and plural limiting members. The first longitudinal cord has plural first positions evenly spaced thereon and separated by a predetermined interval. The second longitudinal cord is spaced from and substantially parallel to the first longitudinal cord, having plural second positions and plural third positions thereon. When the window blind is in the first state, the second positions are respectively at the same height as the first positions, and each of the third positions is adjacent to a corresponding one of the second positions.

The first ends of the first longitudinal and the second longitudinal cord are connected to the deflecting mechanism within the upper rail, by which the ladder tape is suspended below the upper rail. Meanwhile, the second ends of the first longitudinal and the second longitudinal cord are connected to the lower rail. When the deflecting mechanism drives the first longitudinal and the second longitudinal cord to move in opposite directions, the bearers change their inclination angles along with upward and downward movements of the first longitudinal and the second longitudinal cord, and the slats are also driven to change their inclination angles, making the window blind switched from the first state in which the slats are in the horizontal state to the second state in which the slats are tilted and the distance from a lateral edge of each slat to another lateral edge of the neighboring slat is minimum.

The bearers are disposed between the first longitudinal and the second longitudinal cord, each of which has two ends connected to the corresponding first position on the first longitudinal cord and the corresponding second position on the second longitudinal cord, respectively. The slats are disposed between the upper rail and the lower rail and respectively supported by the bearers. The bearers comprise a first bearer and a second bearer adjacent thereto. The slats also comprise a first slat and a second slat adjacent thereto, and the first slat and the second slat are respectively supported by the first bearer and the second bearer. Meanwhile, the first slat has a first through hole adjacent to the second longitudinal cord.

Each of the limiting members has a first end and a second end opposing thereto. The limiting members have their first ends respectively disposed on the third positions on the second longitudinal cord. Moreover, the limiting members comprise a first limiting member and a second limiting member adjacent thereto, wherein the first limiting member comprises a first slat-through portion and a first linking loop. The first slat-through portion is located between the first end and the second end of the first limiting member, and goes through the first through hole of the first slat. The second end of the first limiting member is located at the first linking loop. The second limiting member passes through the first linking loop.

In one embodiment of the present disclosure, the first limiting member passes through the first through hole of the first slat, after which the portion of the first limiting member within the first through hole is defined as the first slat-through portion, whereas the portion has passed through and outside the first through hole is defined as the first linking loop. The second limiting member passes through the first linking loop to keep the first through hole of the first slat being threaded through by one of the first limiting member and the second limiting member. Preferably, the second slat has a second through hole adjacent to the second longitudinal cord, and the second limiting member comprises a second slat-through portion located between the first end and the second end of the second limiting member. The second limiting member sequentially passes through the first linking loop and the second through hole of the second slat, after which the portion of the second limiting member within the second through hole is defined as the second slat-through portion. Since the second slat-through portion is passing through the second through hole of the second slat, the first limiting member is limited to passing through the first through hole of the first slat.

In one embodiment of the present disclosure, the second longitudinal cord further has plural fourth positions thereon, which are arranged in staggered relation to the third positions. Meanwhile, other than the first slat-through portion and the first linking loop, the first limiting member further comprises a first main portion extending from the first end thereof to the second end thereof. The first slat-through portion has a connecting end disposed on the corresponding fourth position on the second longitudinal cord, and is shorter than the first main portion as well as being located between the first end and the second end of the first limiting member. On the second longitudinal cord, the fourth position where the first slat-through portion disposed is closer to the second position where the first bearer disposed than the third position where the first limiting member disposed. The first slat-through portion forms a first limiting loop after passing through the first through hole. The first main portion passes through the first limiting loop to keep the first through hole threaded through by one of the first slat-through portion and the first main portion. Preferably, the first linking loop is formed by the first main portion after the first main portion passes through the first limiting loop.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
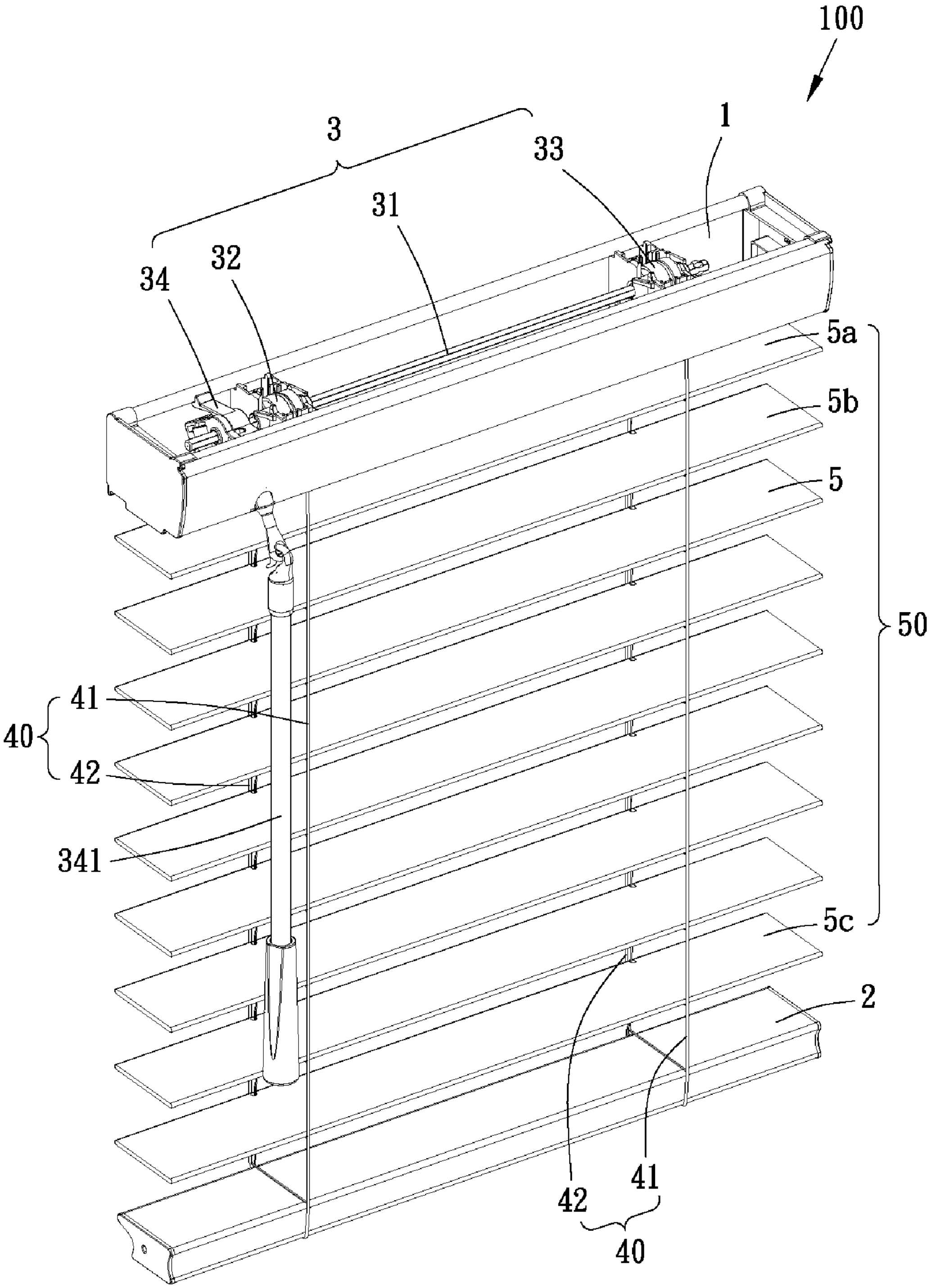
FIG. 1 is a perspective view of the window blind according to a first embodiment of the present disclosure, wherein the window blind is fully extended and the curtain body thereof is in a transparency state.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Figure 2:
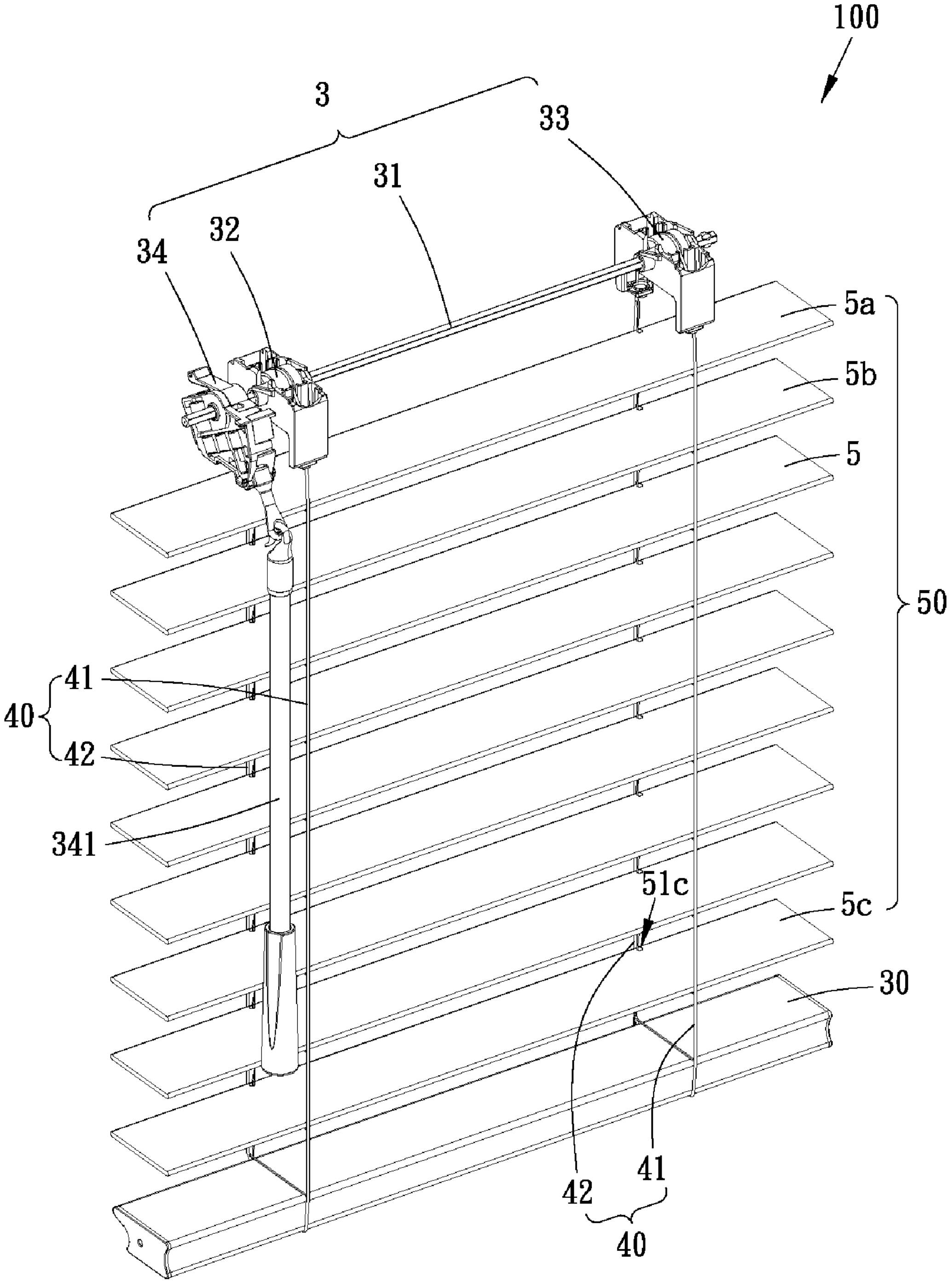
FIG. 2 is a perspective view of the window blind in FIG. 1 omitting the upper rail thereof.
Figure 4:
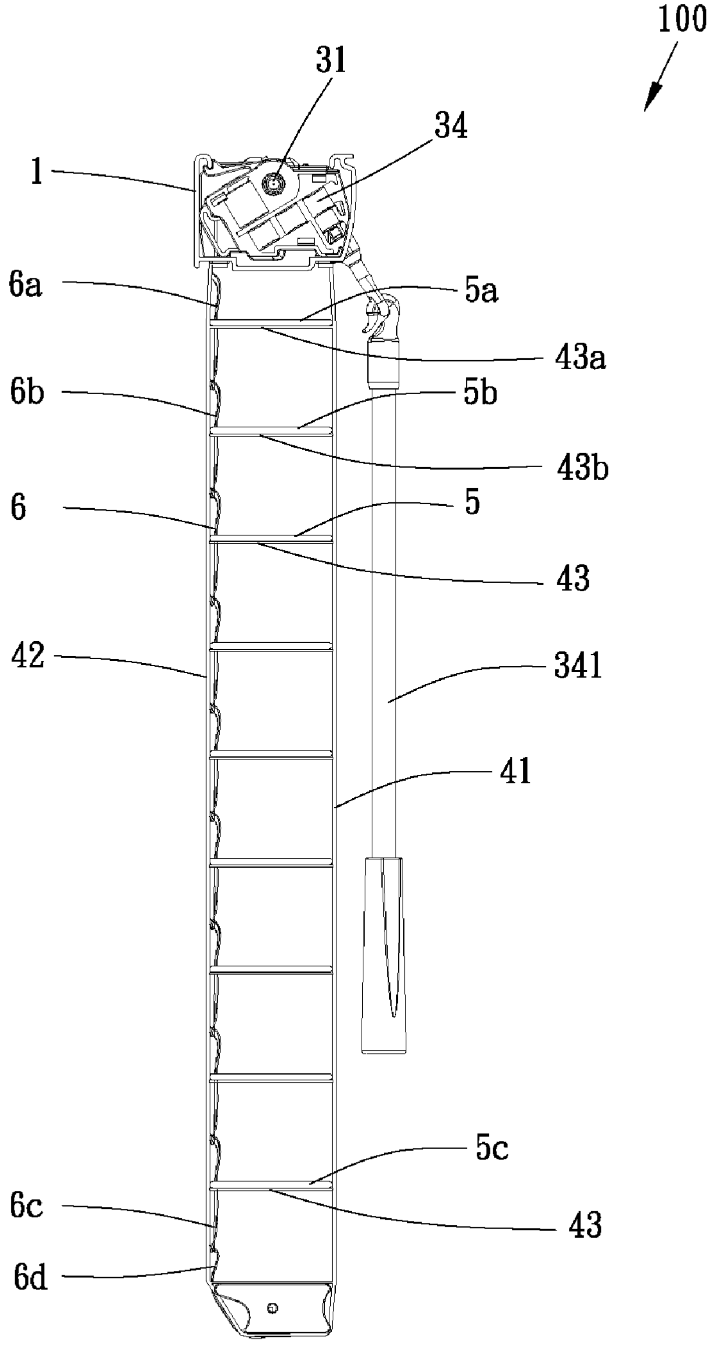
FIG. 4 is a left side view of the window blind in FIG. 1.

The window blind of the present disclosure is switchable between a first state and a second state with different amount of light passing through the window blind. Referring to FIGS. 1, 2 and 4, the window blind of the present disclosure comprises an upper rail 1, a lower rail 2, a deflecting mechanism 3, two ladder tapes 40, and a curtain body 50 which comprises plural slats 5. The upper rail 1 can be fixed on the frame or the wall for suspending the curtain body 50 and the lower rail 2. The slats 5 of the curtain body 50 comprise a first slat 5*a* and a second slat 5*b* adjacent to the first slat 5*a*. In the present embodiment, the first slat 5*a* is closer to the upper rail 1 than the second slat 5*b*, and the slats 5 further comprise a last slat 5*c*, which is the closest one of the slats 5 to the lower rail 2. The upper rail 1 has a chamber for receiving the deflecting mechanism 3. The deflecting mechanism 3 comprises a shaft 31, a first drum 32, a second drum 33 and a deflecting module 34. As shown in FIGS. 1 and 2, the first drum 32 and the second drum 33 are disposed inside the upper rail 1 and respectively close to the two opposing lateral sides of the upper rail 1. The deflecting module 34 is located between the first drum 32 and one lateral side of the upper rail 1. The shaft 31 passes through the deflecting module 34, the first drum 32 and the second drum 33. Hence, the deflecting module 34 can drive the first drum 32 and the second drum 33 to rotate concurrently via the shaft 31. The top ends of the ladder tapes 40 are respectively connected with the first drum 32 and the second drum 33, such that the ladder tapes 40 are suspended below the upper rail 1.

Figure 3:
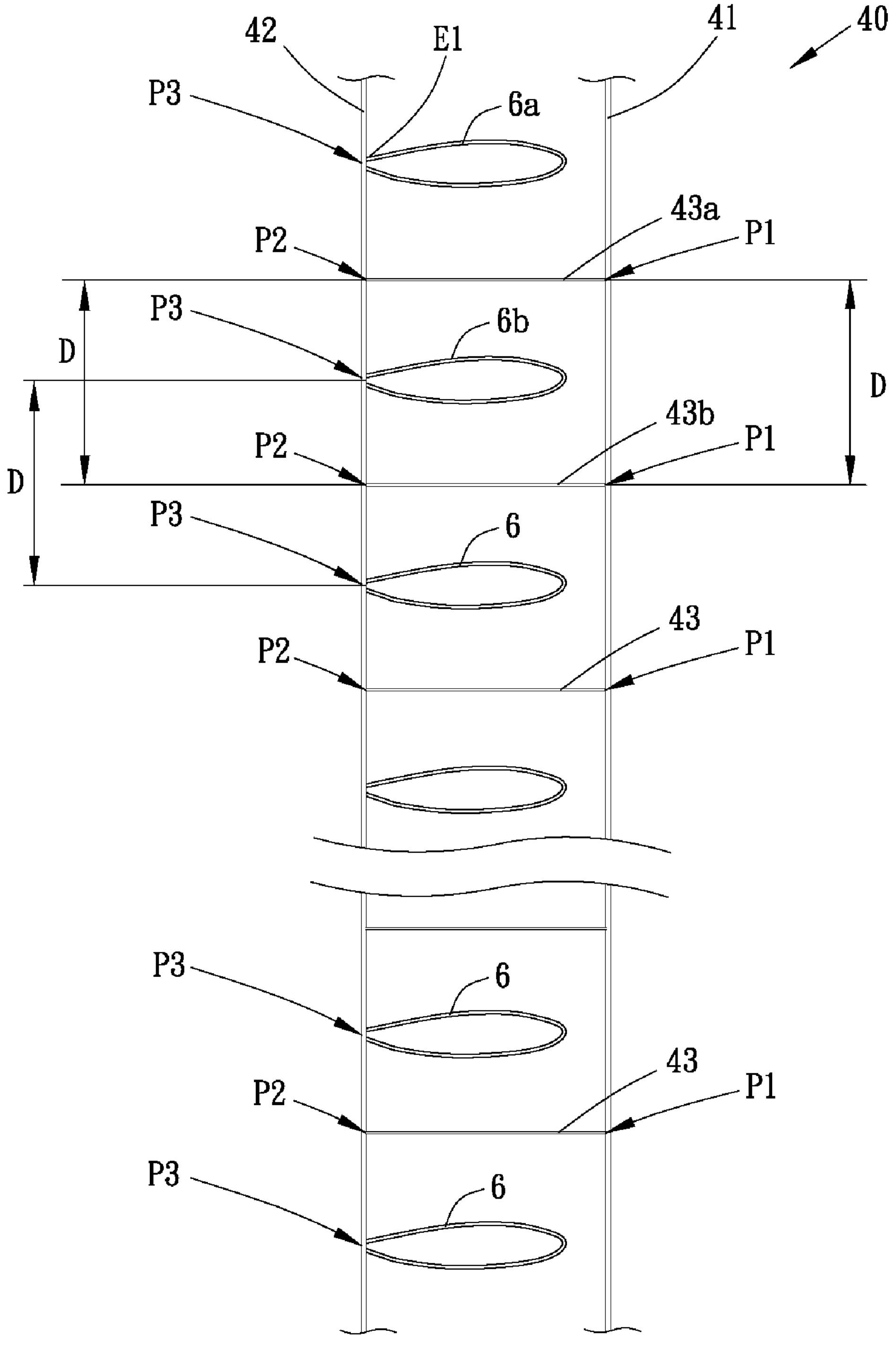
FIG. 3 is a schematic diagram illustrating an original structure of the ladder tape of the window blind in FIG. 1, as the ladder tape is not assembled with the slats yet.
Figure 5:
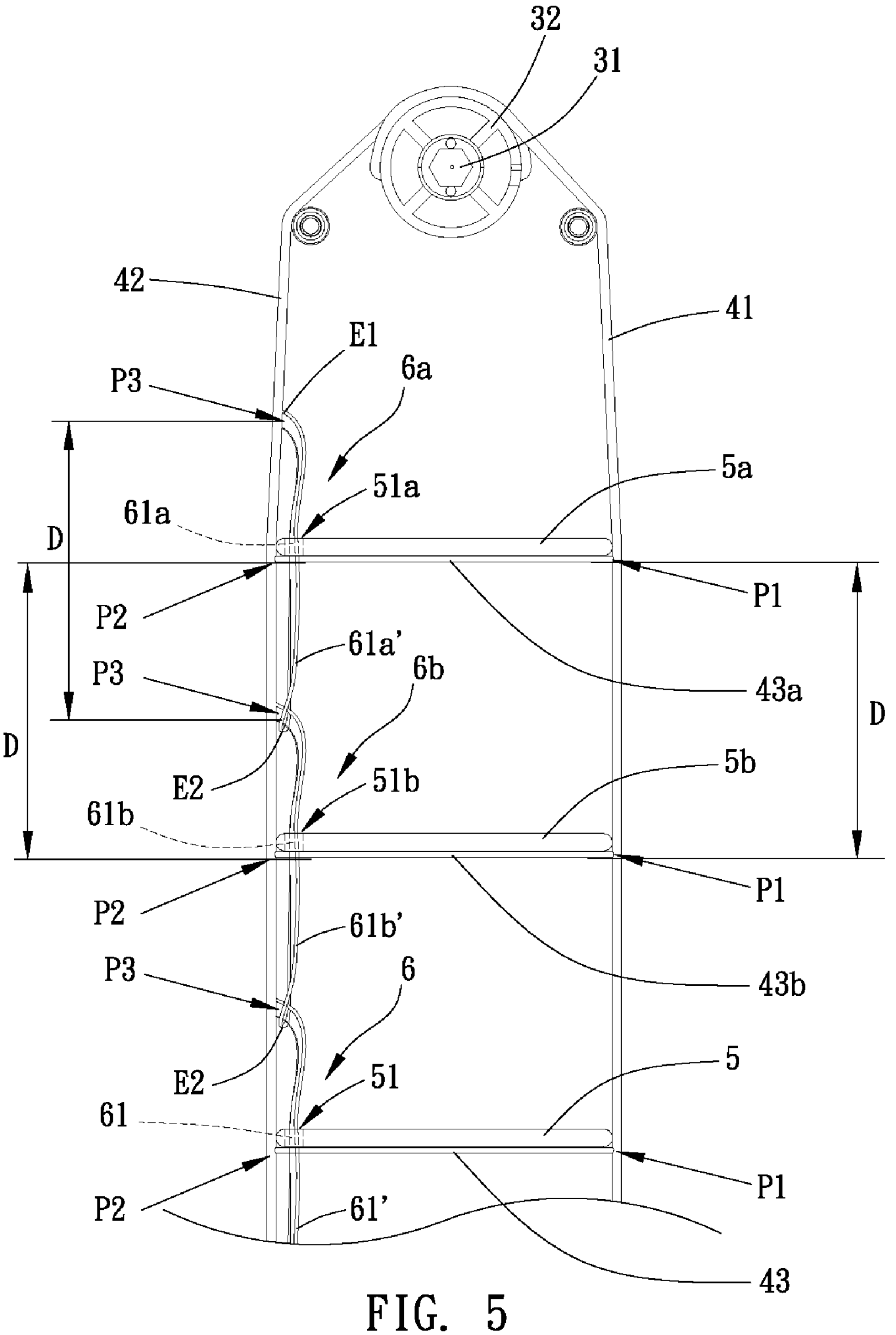
FIG. 5 is an enlarged view of the window blind in FIG. 4 omitting the upper rail and the deflecting mechanism thereof.

Please refer to FIGS. 1 to 7, which illustrate the structure and configuration of the ladder tapes 40 according to the present embodiment. The window blind 100 comprises two ladder tapes 40, however, the amount of the ladder tapes 40 is not limited thereto and can be adjusted according to the lateral lengths of the slats 5. In general, at least two ladder tapes are required for easily making the slats 5 parallel to each other. However, in case that each slat 5 has shorter lateral length, one ladder tape aligned with the midline of the window blind can also be implemented. In the present embodiment, the two ladder tapes 40 have the same structures. Referring to FIGS. 1, 3 and 5, as the ladder tape 40 on the left side in FIG. 1 is taken as an example herein, the ladder tape 40 comprises a first longitudinal cord 41, a second longitudinal cord 42, plural bearers 43 and plural limiting members 6. A first end of the first longitudinal cord 41 and a first end of the second longitudinal cord 42 are connected to the first drum 32. The first longitudinal cord 41 is mostly parallel to the second longitudinal cord 42, while the parts of the first longitudinal cord 41 and the second longitudinal cord 42 close to the upper rail 1 and/or lower rail 2 may be not parallel to each other. The first longitudinal cord 41 passes the front side of the curtain body 50, whereas the second longitudinal cord 42 passes the rear side of the curtain body 50. The plural bearers 43 are disposed between the first longitudinal cord 41 and the second longitudinal cord 42, as the bearers 43 are arranged with spacing. There are several particular location positions defined on the first longitudinal cord 41 and the second longitudinal cord 42. For instance, the first longitudinal cord 41 has plural first positions P1 thereon, while the second longitudinal cord 42 has plural second positions P2 and plural third positions P3 thereon, wherein the third positions P3 are respectively adjacent to the corresponding one of the second positions P2.

In the present embodiment, the first positions P1 on the first longitudinal cord 41 are spaced a predetermined interval D apart from each other. Meanwhile, on the second longitudinal cord 42, the second positions P2 are also spaced the predetermined interval D apart from each other, and so do the third positions P3. In the present embodiment, on the second longitudinal cord 42, the third positions P3 are arranged in staggered relation to the second positions P2. Meanwhile, the amount of the third positions P3 is one more than that of the second positions P2, such that the second longitudinal cord 42 has one third position P3 each located between the upper rail 1 and the second position P2 closest to the upper rail 1, and between the lower rail 2 and the second position P2 closest to the lower rail 2. Each of the bearers 43 is disposed between the first longitudinal cord 41 and the second longitudinal cord 42. More specifically, one end of each bearer 43 is connected to the corresponding first position P1 on the first longitudinal cord 41, while another end of each bearer 43 is connected to the corresponding second position P2 on the second longitudinal cord 42. The bearers 43 comprise a first bearer 43 and a second bearer 43*b* neighboring thereto, and the first slat 5*a* and the second slat 5*b* are respectively supported by the first bearer 43 and the second bearer 43*b*. Referring to FIG. 5, when the window blind 100 is in the first state, the second positions P2 are respectively at the same height as the first positions P1, which makes each bearer 43 and the slat 5 supported thereby in a horizontal state.

Figure 6:
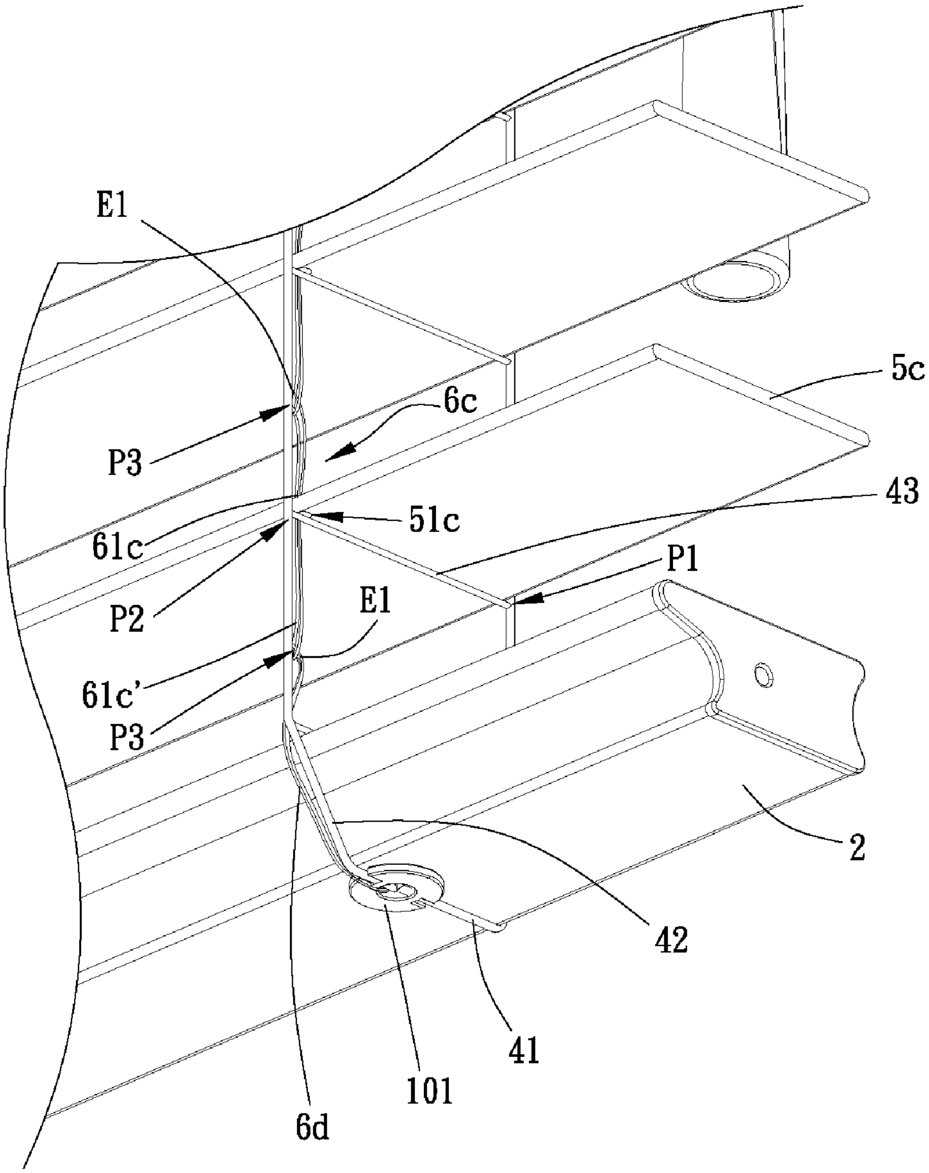
FIG. 6 is a partial enlarged perspective view of the window blind in FIG. 1.
Figure 7:
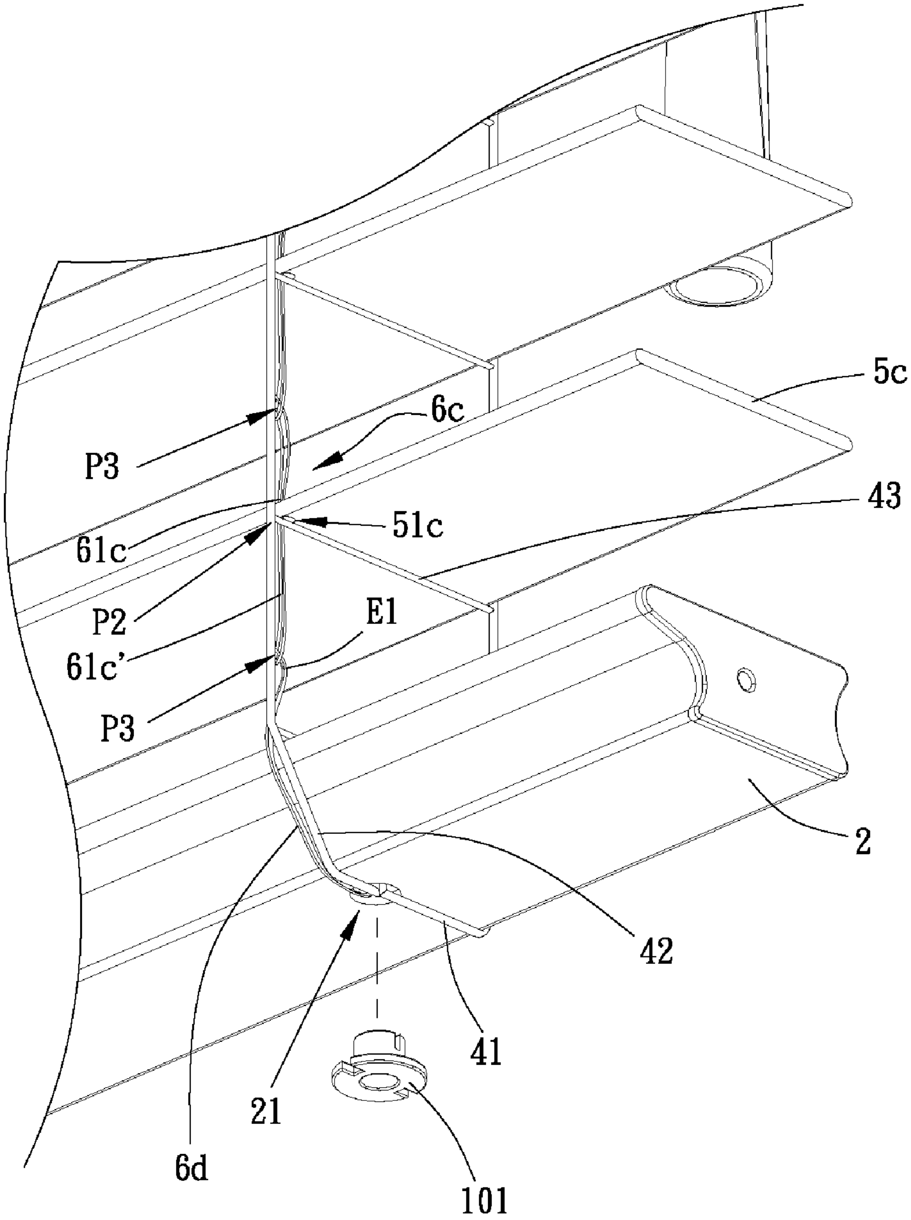
FIG. 7 is an exploded view illustrating the anchoring member in FIG. 6 separated from the lower rail.

Referring to FIGS. 5 to 7, in the present embodiment, each slat 5 comprises a through hole 51 at a side thereof adjacent to the second longitudinal cord 42. More specifically, the first slat 5*a*, the second slat 5*b* and the last slat 5*c* comprise a first through hole 51*a*, a second through hole 51*b*, and a last through hole 51*c*, respectively, at their sides adjacent to the second longitudinal cord 42. Referring to FIG. 5, in the present embodiment, each limiting member 6 is ring-shaped and formed by folding a cord and then connecting two ends of the cord together to the corresponding the position P3 on the second longitudinal cord 42. Each limiting member 6 has a first end E1 and a second end E2 opposing to the first end E1. The first ends E1 of the limiting members 6 are respectively disposed on the third positions P3 on the second longitudinal cord 42, so that the limiting members 6 are vertically arranged on the second longitudinal cord 42 in sequence. The limiting members 6 comprise a first limiting member 6*a* and a second limiting member 6*b* neighboring thereto. In the present embodiment, on the second longitudinal cord 42, the third position P3 where the first limiting member 6*a* disposed is closer to the upper rail 1 than the third position P3 where the second limiting member 6*b* disposed, the third position P3 where the first limiting member 6*a* disposed is correspondingly adjacent to and located above the second position P2 where the first bearer 43*a* connected, and the third position P3 where the second limiting member 6*b* disposed is correspondingly adjacent to and located above the second position P2 where the second bearer 43*b* connected.

According to the present disclosure, the first limiting member 6*a* of the limiting members of the ladder tape of the window blind comprises a first slat-through portion 61*a* and a first linking loop 61*a*'. The first slat-through portion 61*a* is located between the first end E1 and the second end E2 of the first limiting member 6*a*, and is passing through the first through hole 51*a* of the first slat 5*a*. The second end E2 of the first limiting member 6*a* is located at the first linking loop 61*a*'. In the present embodiment, more specifically, the first limiting member 6*a* passes through the first through hole 51*a* of the first slat 5*a*, after which the portion of the first limiting member 6*a* passing through and within the first through hole 51*a* is defined as the first slat-through portion 61*a*, whereas the portion of the first limiting member 6*a* has passed through and outside the first through hole 51*a* is defined as the first linking loop 61*a*'. The second limiting member 6*b* passes through the first linking loop 61*a*' for keeping the first through hole 51*a* of the first slat 5*a* in one of the following two situations: being threaded through by the first limiting member 6, or being threaded through by the second limiting member 6*b* when the first limiting member 6*a* is accidentally pulled out in reverse direction.

In the present embodiment, the second limiting member 6*b* comprises a second slat-through portion 61*b* and a second linking loop 61*b*', wherein the second slat-through portion 61*b* is located between the first end E1 and the second end E2 of the second limiting member 6*b*. More specifically, the second end E2 of the second limiting member 6*b* passes through the first linking loop 61*a*' and the second through hole 51*a* of the second slat 5*b* sequentially, while the portion of the second limiting member 6*b* passing through and within the second through hole 51*b* is defined as the second slat-through portion 61*b*, and the portion of the second limiting member 6*b* has passed through and outside the second through hole 51*b* is defined as the second linking loop 61*b*'. The fact that the second slat-through portion 61*b* is threading through the second through hole 51*a* of the second slat 5*b* is beneficial to keeping the first limiting member 6*a* threading through the first through hole 51*a* of the first slat 5*a*. The second linking loop 61*b*' is provided to be penetrated by the next limiting member 6. So on and so forth, every two neighboring limiting members 6 are linked in the same way as the first limiting member 6*a* and the second limiting member 6*b*, whereby the through holes 51 of all the slats 5 are each threaded by at least one limiting member 6 and restricted in the vicinity of each of the limiting members 6. On this circumstance, if one of the limiting members 6 is accidentally drawn out from the corresponding through hole 51 in the opposite direction that it went into initially, another limiting member 6 linked to the aforesaid limiting member 6 will be drawn simultaneously in the same direction and go through the aforesaid through hole 51, whereby the position of the aforesaid through hole 51 is continuously restricted. Therefore, each slat 5 is prevented from being drawn out from the ladder tape 40 and moving significantly in the lateral direction.

Referring to FIGS. 6 and 7, in the present embodiment, the limiting members 6 further comprise a last limiting member 6*a* and a fixed limiting member 6*d*, which are respectively the second last one and the last one of the sequence of the vertically arranged limiting members 6. On the second longitudinal cord 42, the third positions P3 where the last limiting member 6*a* and the fixed limiting member 6*d* disposed, are respectively the second closest one and the closest one to the lower rail 2. The last limiting member 6*c* comprises a last slat-through portion 61*c* and a last linking loop 61*c*', wherein the last slat-through portion 61*c* is located between the first end E1 and the second end E2 of the last limiting member 6*c*. The last limiting member 6*c* passes through the last through hole 51*c* of the last slat 5*c*, after which the portion of the last limiting member 6*c* passing through and within the last through hole 51*c* is defined as the last slat-through portion 61*c*, and the portion of the last limiting member 6*c* has passed through and outside the last through hole 51*c* is defined as the last linking loop 61*c*'. The first end E1 of the fixed limiting member 6*d* is fixed to the closest one of the third positions P3 to the lower rail 2. After passing through the last linking loop 61*c*', the second end of the fixed limiting member 6*d* (not shown) extends to the bottom of the lower rail 2, then being inserted into the locating hole 21 together with the second ends of both the first longitudinal cord 41 and the second longitudinal cord 42. Afterwards, an anchoring member 101 is inserted into and closely fitted to the locating hole 21 to make the second end of the fixed limiting member 6*d* (not shown) together with the second ends of both the first longitudinal cord 41 and the second longitudinal cord 42 fixedly connected to the lower rail 2.

In another embodiment, the ladder tape has the same original structure as the previous embodiment shown in FIG. 3 while not being assembled yet. However, compared to the previous embodiment, each of the limiting members 6 of the ladder tape of the present embodiment goes around the next limiting member 6 in reverse order, e.g., from bottom to top. Since the limiting members 6 are arranged in reverse order, different ones of the limiting members 6 from the previous embodiment are defined as the first limiting member, the second limiting member, the last limiting member and the last limiting member, respectively. For the same reason, different ones of the bearers are defined as the first bearer and the second bearer, and different ones of the slats are defined as the first slat, the second slat and the third slat. On the second longitudinal cord 42, the third position P3 where the first limiting member disposed, is closer to the lower rail than the third position P3 where the second limiting member disposed; the third position P3 where the first limiting member disposed, is correspondingly adjacent to and located below the second position P2 where the first bearer disposed; and the third position P3 where the second limiting member disposed, is correspondingly adjacent to and located below the second position P2 where the second bearer disposed. The first limiting member passes through the first through hole of the first slat supported by the first bearer in a direction from bottom to top, after which the portion of the first limiting member within the first through hole is defined as the first slat-through portion, and the portion of the first limiting member has passed through the first through hole is defined as a first linking loop. The second limiting member sequentially passes through the first linking loop and the second through hole of the second slat supported by the second bearer, after which the portion of the second limiting member within the second through hole is defined as the second slat-through portion, and the portion of the second limiting member has passed through and outside the second through hole is defined as a second linking loop. The second linking loop is provided to be penetrated by the next limiting member 6, and so on. Form the above two embodiments, it can be seen that the limiting members 6 of the present disclosure are vertically arranged on the second longitudinal cord 42 in sequence as each of the limiting members 6 goes around the next limiting member 6, and the arranged order of the limiting members 6 can be from top to bottom or from bottom to top.

Besides, in this embodiment, on the second longitudinal cord 42, the third positions P3 where the last limiting member and the fixed limiting member disposed are respectively the second closest one and the closest one of the third positions P3 to the upper rail 1. The last limiting member passes through the last through hole of the last slat, after which the portion of the last limiting member within the last through hole is defined as the last slat-through portion, and the portion of the last limiting member has passed through and outside the last through hole is defined as the last linking loop. After passing through the last linking loop, the second end of the fixed limiting member is fixed to the second longitudinal cord 42, such that last limiting member remains threading through the last through hole of the last slat. As so, in this embodiment, the through hole 51 of each slat 5 is ensured to be threaded through by at least one of the limiting members 6, and the slats 5 are prevented from being accidentally drawn out from the ladder tape 40 and prevented from excessively moving in the lateral direction.

Please keep referring to FIGS. 6 and 7. In the first embodiment of the present disclosure, the ladder tapes 40 each correspond to a locating hole 21 located on the bottom surface of the lower rail 2. However, the configuration of the locating holes 21 is not limited thereto. The locating holes 21 may be disposed on the other surfaces of the lower rail 2, or there may be several locating holes corresponding to each of the components of the ladder tapes 40, e.g., the first longitudinal cord, the second longitudinal cord and the fixed limiting member. The only requirement for setting the locating holes is that the fixed limiting member and the second ends of the first longitudinal cord and the second longitudinal cord have to be fixedly connected to the lower rail 2, so that the fixed limiting member is prevented from loosening and the ladder tape 40 is prevented from being separated from the lower rail 2. With the arrangements mentioned above, the slats 5 are limited by the limiting members 6 and prevented from excessively moving in the lateral direction.

In the first embodiment of the present disclosure, the first longitudinal cord 41, the second longitudinal cord 42, the bearers 43 and the limiting members 6 are integrated into one piece during the weaving process. In some other embodiments, the bearers 43 and the limiting members 6 are independently formed loops each combined with the first longitudinal cord 41 and the second longitudinal cord 42, by stitching or adhesion, therefore being fixed on and immovable relative to the first longitudinal cord 41 and/or the second longitudinal cord 42.

In the first embodiment of the present disclosure, each limiting member 6 is ring-shaped. More specifically, each limiting member 6 is a loop formed by folding a cord. In some other embodiments, each limiting member 6 can also be a complete cord loop. Anywhere on the cord loop can be connected to the second longitudinal cord 42, as the portion of the cord loop connected to the second longitudinal cord 42 will be deemed to the first end E1 of the limiting member 6. The total length of the cord segment for forming the limiting member 6 is required to be larger than twice the length of the predetermined interval D for allowing the limiting member 6 to pass through the linking loop 61' formed by the previous limiting member 6 and the through hole 51 of the closest slat 5. On the other hand, although the second longitudinal cord 42 passes the rear side of the curtain body 50 according to the present embodiment, the configuration of the second longitudinal core 42 is not limited thereto, as the positions of the first longitudinal core 41 and the second longitudinal cord 42 can be exchanged. In some other embodiments, each slat has two through holes adjacent to the first longitudinal cord 41 and the second longitudinal cord 42, respectively, and there are limiting members correspondingly disposed on both the first longitudinal cord 41 and the second longitudinal cord 42 to match the two through holes of each of the slats.

Referring to FIGS. 1 to 5, which illustrate the window blind 100 in the first state in which the slats 5 are in a horizontal state, and at the same time, the window blind 110 has fully extended in the vertically direction as the lower rail 2 is located at a farthest position away from the upper rail 1 within its reachable range. In the meantime, the parts of the first longitudinal cord 41 and the second longitudinal cord 42 located between the upper rail 1 and the lower rail 2 extend vertically and are parallel to each other. Moreover, since the window blind 110 is in the first state, referring to FIGS. 4 and 5, the second positions P2 on the second longitudinal cord 42, are respectively at the same height as the first positions P1 on the first longitudinal cord 41. Hence, the bearers 43 are arranged vertically at intervals and parallel to each other. As being supported by the bearers 43, the slats 5 are also arranged vertically at intervals and parallel to each other. On this circumstance, the window blind 100 allows relatively larger amount of light passing therethrough and is in a transparency state.

Figure 8:
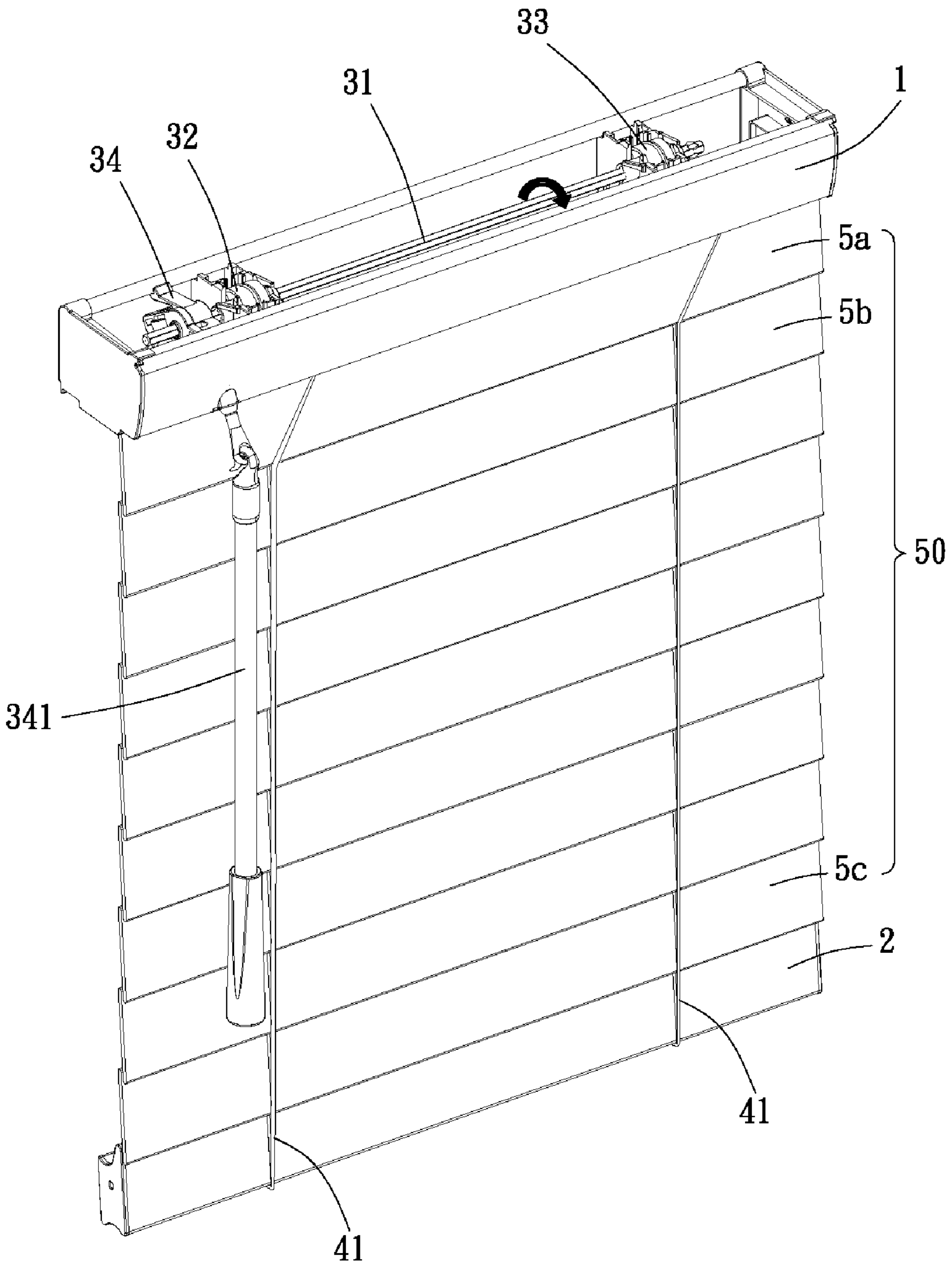
FIG. 8 is a perspective view of the window blind according to the first embodiment of the present disclosure, wherein the window blind is fully extended and the curtain body thereof is in a closed state.
Figure 9:
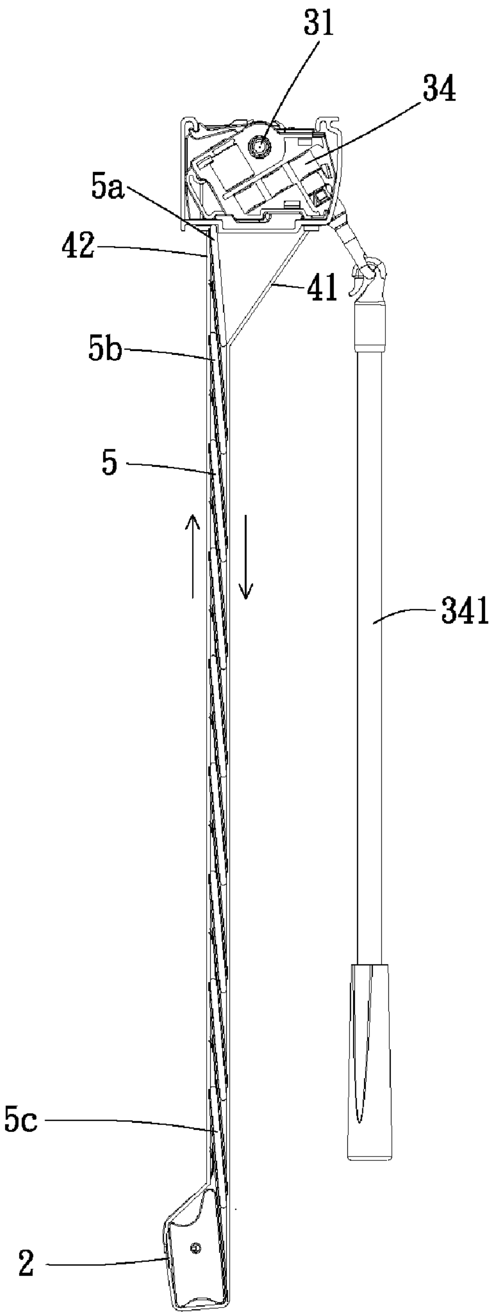
FIG. 9 is a left side view of the window blind in FIG. 8.
Figure 10:
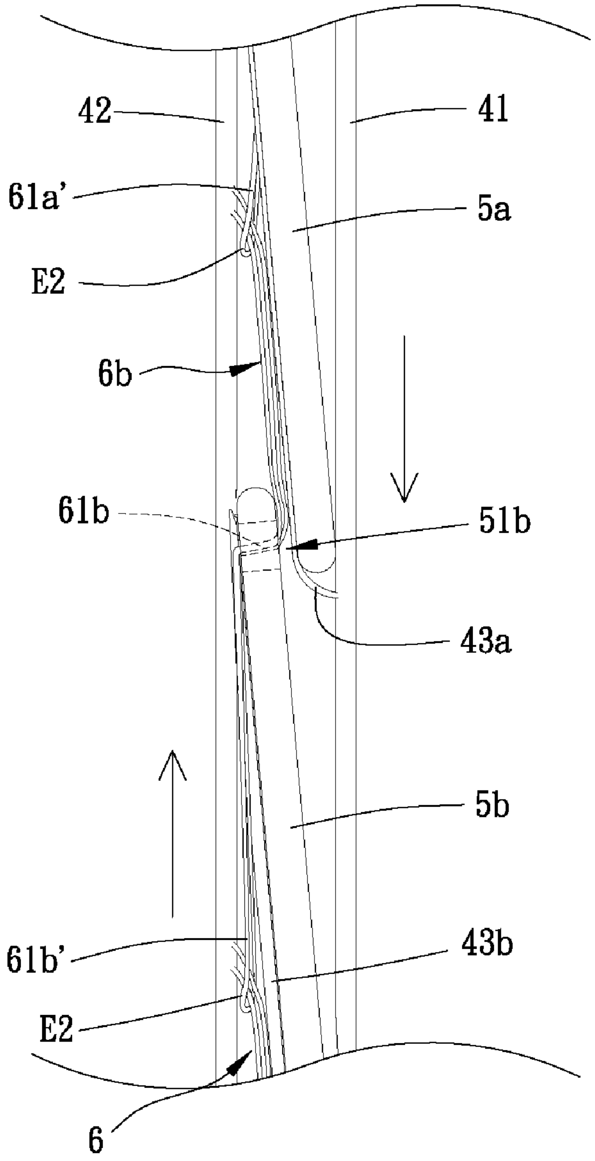
FIG. 10 is a partial enlarged view of FIG. 9.

Please refer to FIGS. 2, 8 and 10. In the present embodiment, the deflecting module 34 further comprises an operating rod 341 outside the upper tail 1, which is provided for driving the deflecting module 34 by a user. In order to change the amount of light passing through the window blind 100, the user can rotate the operating rod 341 to drive the shaft 31 of the deflecting module 34 to rotate, which makes the first drum 32 and the second drum 33 rotate concurrently in the same direction, such that the ladder tapes 40 connected to the first drum 32 and the second drum 33 change their states. Referring to FIGS. 8 to 10, as the ladder tape 40 on the left side of FIG. 2 is taken as an example hereinafter, when the user rotates the operating rod 341 to drive the shaft 31 to rotate in clockwise direction, the first drum 32 releases part of the first longitudinal cord 41 and retracts part of the second longitudinal cord 42 concurrently. Therefore, the length of the first longitudinal cord 41 located between the upper rail 1 and the lower rail 2 increases, and the length of the second longitudinal cord 42 located between the upper rail 1 and the lower rail 2 decreases, by which the bearers 43 disposed between the first longitudinal cord 41 and the second longitudinal cord 42 are each tilted to be lower at the front and higher at the rear (from a view by the user facing the window blind 100), and the slats 5 placed thereon are also tilted in the same way.

As shown in FIG. 10, the first linking loop 61*a*' of the first limiting member 6*a* abuts on the bottom surface of the slat 5*a*. The second limiting member 6*b* passes the first linking loop 61*a*', then extending along the bottom surface of the slat 5*a* until passing through the second through hole 51*b* of the second slat 5*b*. The portion of the second limiting member 6*b* which is passing through and within the second through hole 51*b* is defined as the second slat-through portion 61*b*. The second slat-through portion 61*b* is in a bent state compared to another part of the second limiting member 6*b* extending along the bottom surface of the second slat 5*b*, which is beneficial to positioning the second slat 5*b*, so that the second slat 5*b* is prevented from sliding downwardly. So on and so forth, all of the slats 5 are each restricted in the same position by the slat-through portion 61 of the corresponding limiting member 6 in the bent state. Therefore, as shown in FIG. 9, the overlapping area of each two neighboring slats 5 are approximately the same, so that there is no gap between each two neighboring slats 5 and the slats 5 are fully closed for effectively shielding light and protecting privacy. At this moment, the window blind 100 is in a light-shielding state. The way of using the deflecting mechanism 3 to adjust the translucent degree of the curtain body 50 while the window blind 100 is being switched between the first state and the second state in which different amount of light is allowed to pass through the window blind 100, e.g., the transparent state and the light-shielding state, is known in the art and will not be redundantly described hereinafter.

Please refer to FIGS. 11 to 15, which illustrate a window blind 110 according to a second embodiment of the present disclosure. The window blind 110 comprises an upper rail 1, a lower rail 2, a deflecting mechanism 3, two ladder tapes 410, and a curtain body 50 which is composed of plural slats 5. Compared to the first embodiment, the window blind 110 further comprises a lifting mechanism 70 and two sets of pulling cords, in which the amount of the sets of pulling cords corresponds to the amount of the ladder tapes 410. The two sets of pulling cords are adjacent to the two ladder tapes 410, respectively. Each set of pulling cords comprises a first pulling cord 112 and a second pulling cord 112*a*. The first pulling cord 112 and the second pulling cord 112*a* are respectively located on the front side and the rear side of the window blind 110, and respectively adjacent to the first longitudinal cord 41 and the second longitudinal cord 42 of the corresponding ladder tape 40. The functions of the sets of pulling cords are to retract the slats upwardly and to extend the slats downwardly.

Figure 11:
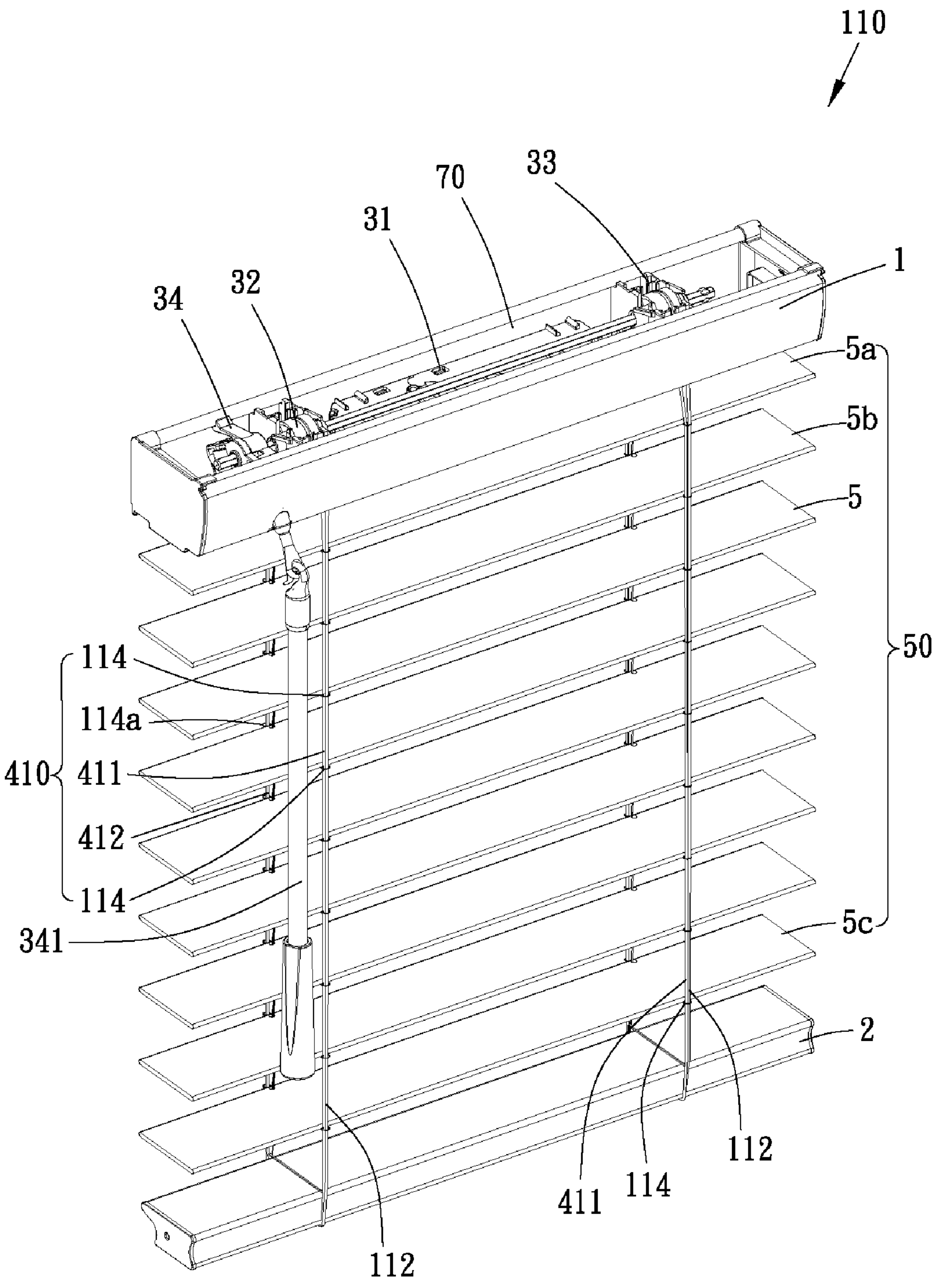
FIG. 11 is a perspective view of the window blind according to a second embodiment of the present disclosure, wherein the window blind is fully extended and the curtain body thereof is in a transparency state.
Figure 12:
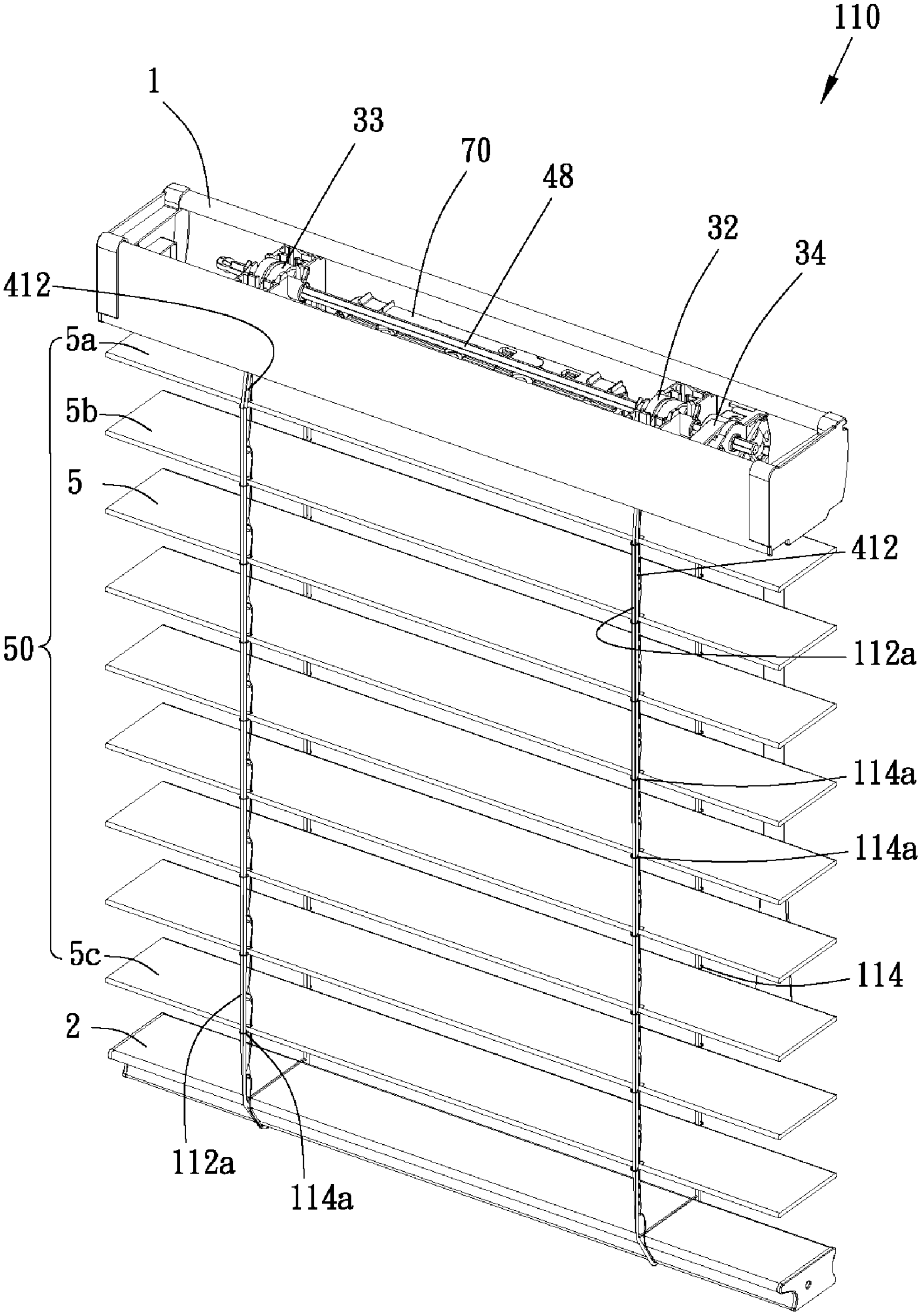
FIG. 12 is another perspective view of the window blind in FIG. 11.
Figure 13:
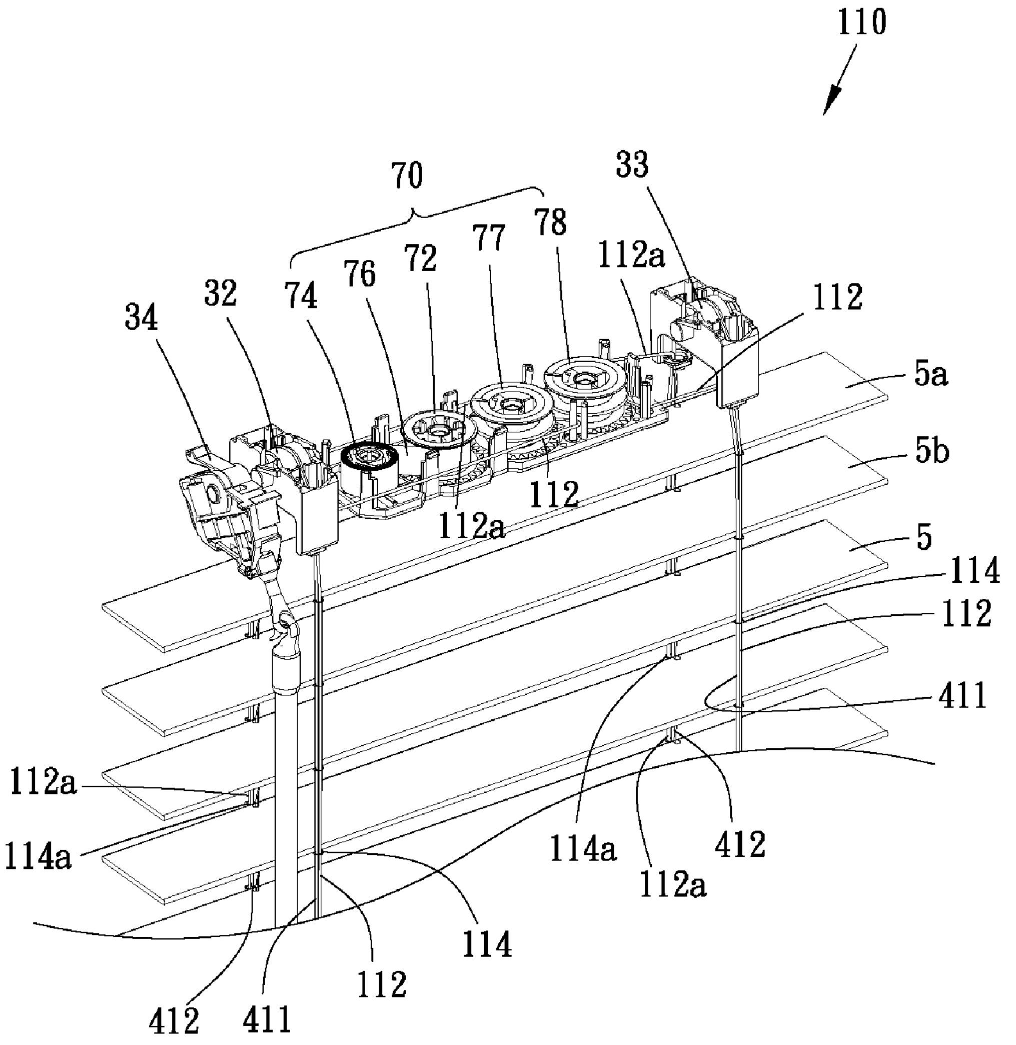
FIG. 13 is a partial enlarged view of the window blind in FIG. 11 omitting the upper rail thereof.
Figure 14:
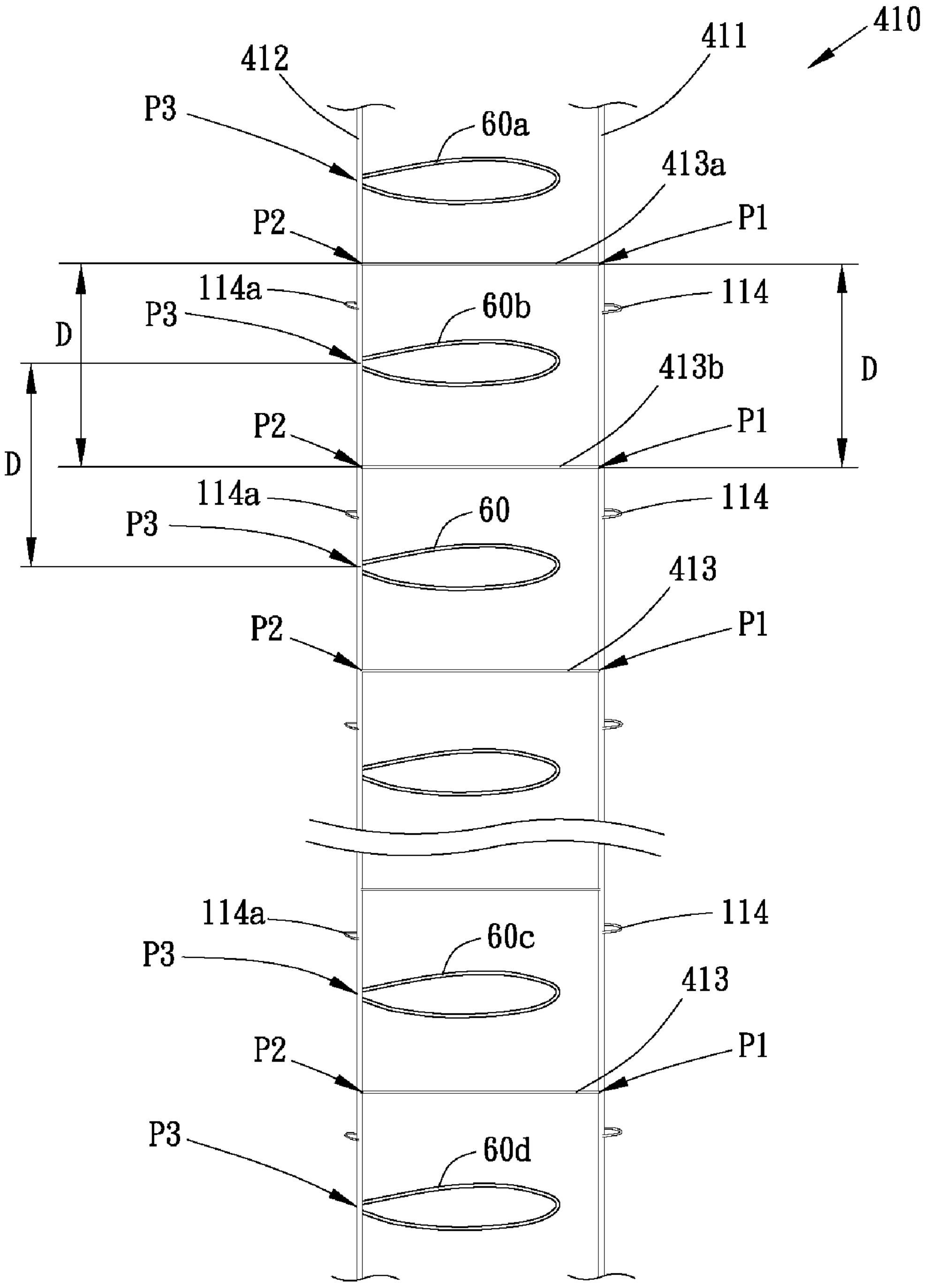
FIG. 14 is a schematic diagram illustrating an original structure of the ladder tape of the window blind in FIG. 11, as the ladder tape is not assembled with the slats yet.
Figure 15:
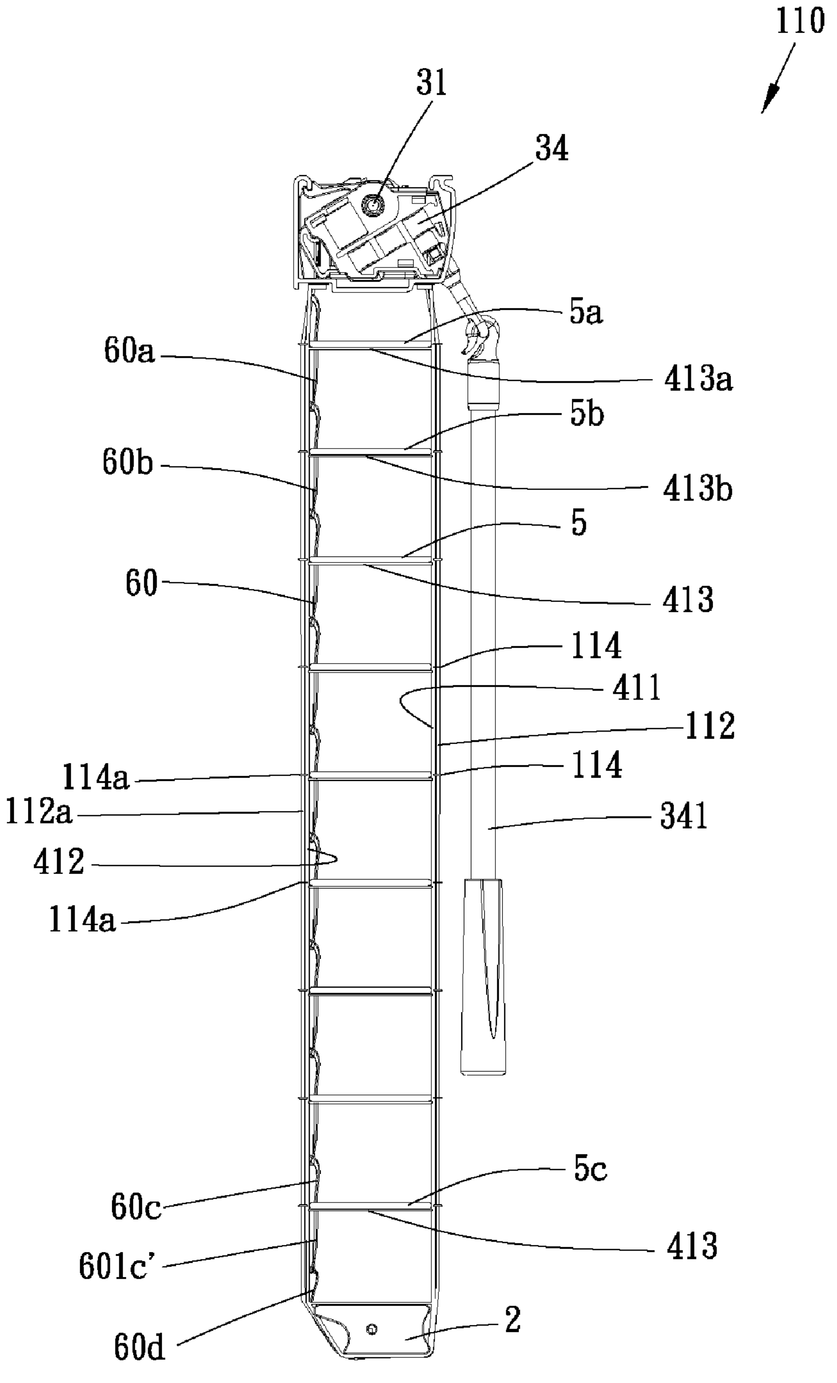
FIG. 15 is a left side view of the window blind in FIG. 11.
Figure 16:
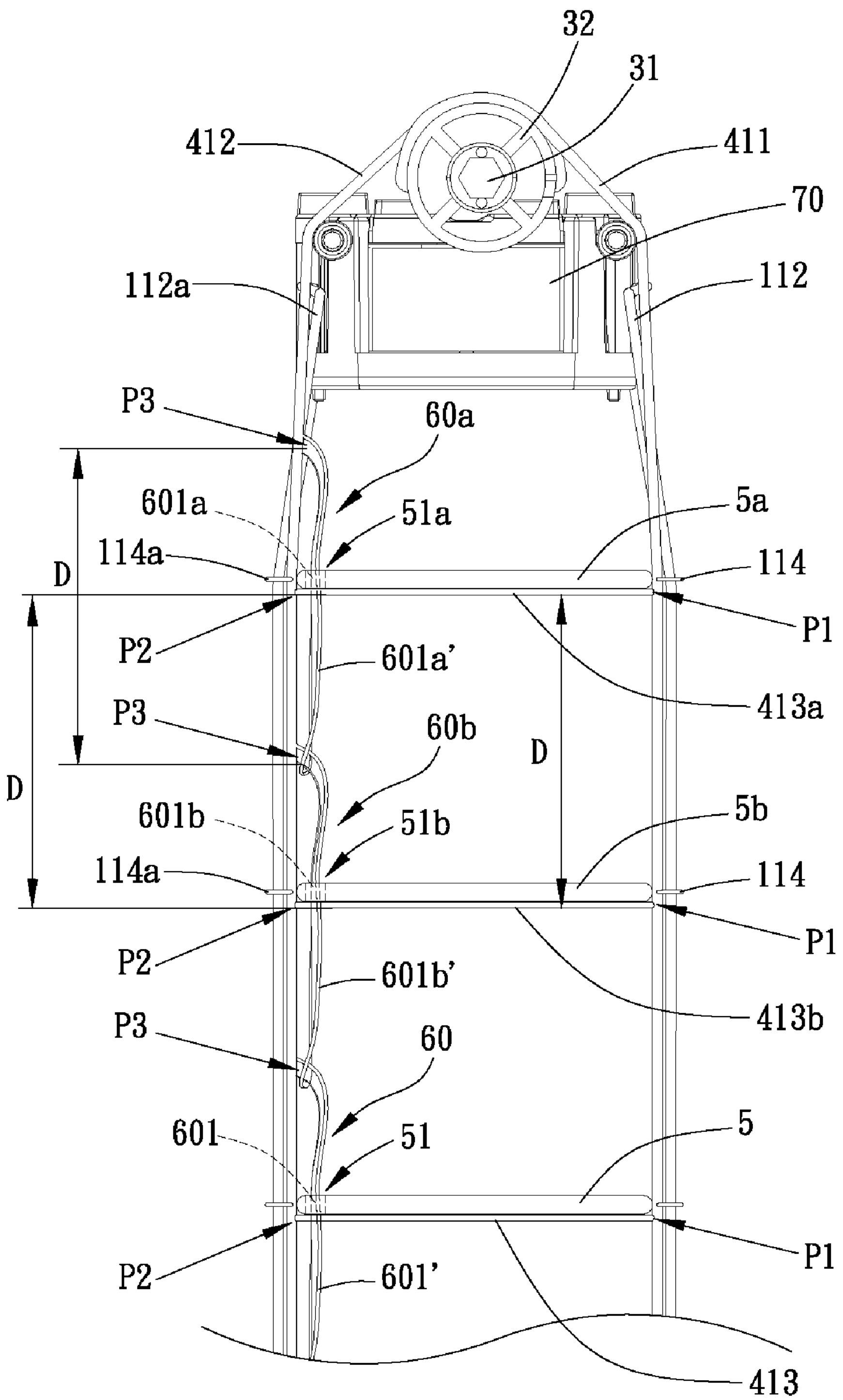
FIG. 16 is a an enlarged view of the window blind in FIG. 15 omitting the upper rail and the deflecting mechanism thereof.

Referring to FIGS. 11 to 14, the lifting mechanism 70 is disposed within the chamber of the upper rail 1 and located between the first drum 32 and the second drum 33. The lifting mechanism 70 comprises a driving wheel 72, a spring storage wheel 74, a spring 76 and two reeling wheels 77 and 78. The spring 76 has one end connected to the driving wheel 72 and another end wound on the spring storage wheel 74. According to the rotation directions of the driving wheel 72, the spring 76 is released from the spring storage wheel 74 and wound on the driving wheel 72 at the same time, or released from the driving wheel 72 and wound on the spring storage wheel 74 at the same time. Referring to FIG. 13, in the present embodiment, the reeling wheel 77 is closer to the driving wheel 72 and the first drum 32 than the reeling wheel 78. The driving wheel 72 and the reeling wheels 77 and 78 can be driven by each other to rotate as their wheel teeth are engaged with each other. In the present embodiment, regarding the set of pulling cords located on the left side of FIG. 13, the first pulling cord 112 and the second pulling cord 112*a* have their top ends wound on and connected to the reeling wheel 77. Meanwhile, regarding the set of pulling cords located on the right side of FIG. 13, the first pulling cord 112 and the second pulling cord 112*a* have their top ends wound on and connected to the reeling wheel 78. When the reeling wheels 77 and 78 are driven by the spring 76 and the driving wheel 72 to rotate concurrently, the first pulling cord 112 and the second pulling cord 112*a* of the two sets of pulling cords are retracted by the corresponding one of the reeling wheels 77 and 78. By contrast, when the reeling wheels 77 and 78 rotate reversely, as the reeling wheels 77 and 78 are driven by the first pulling cords 112 and the second pulling cords 112*a* moving down drawn by the downward movement of the lower rail 2, the first pulling cord 112 and the second pulling cord 112*a* of the two sets of pulling cords are released by the corresponding one of the reeling wheels 77 and 78.

Referring to FIGS. 11 to 18, the window blind 110 comprises two ladder tapes 410 having the same structures. Taking the ladder tape 410 on the left side of FIG. 11 as an example, as shown in FIGS. 11 to 16, the ladder tape 410 comprises a first longitudinal cord 411, a second longitudinal cord 412, plural bearers 413, plural limiting members 60, plural first locating rings 114 and plural second locating rings 114*a*. The first locating rings 114 are disposed on the first longitudinal cord 411 and spaced apart from each other. The second locating rings 114*a* are disposed on the second longitudinal cord 412 and spaced apart from each other. Apart from that, the ladder tapes 410 and the configuration of the limiting members 60 are the same as the first embodiment. However, the limiting members 60 are not limited to going around one another from top to bottom. They can be selectively set up to go around one another from bottom to top. In the present embodiment, the first locating rings 114 are adjacent to the first positions P1 respectively, and the second locating rings 114*a* are adjacent to the second positions P2 respectively, but not limited thereto. The amount and the configuration locations of the first locating rings 114 and the second locating rings 114*a* can be adjusted.

Figure 17:
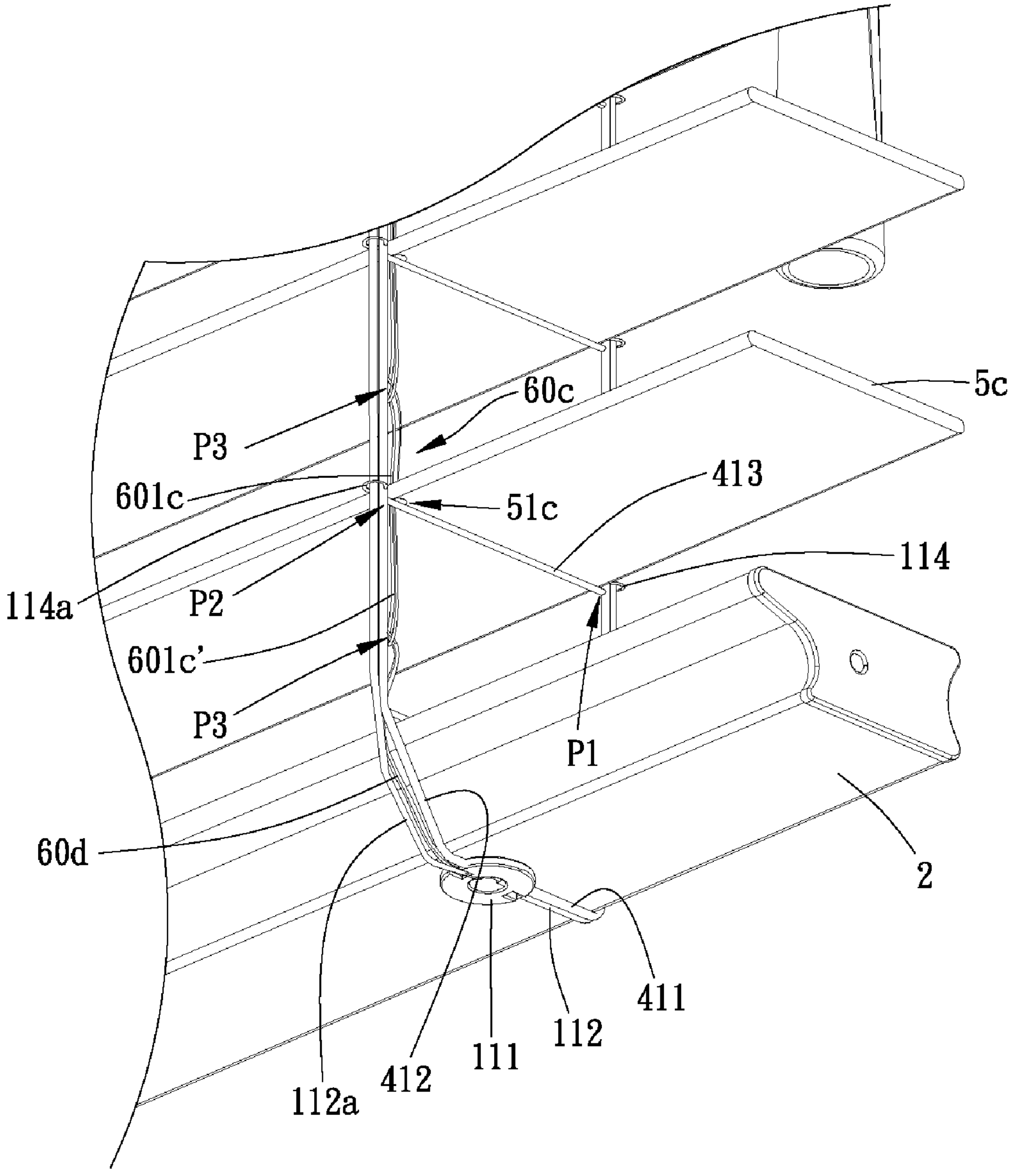
FIG. 17 is a partial enlarged perspective view of the window blind in FIG. 11.
Figure 18:
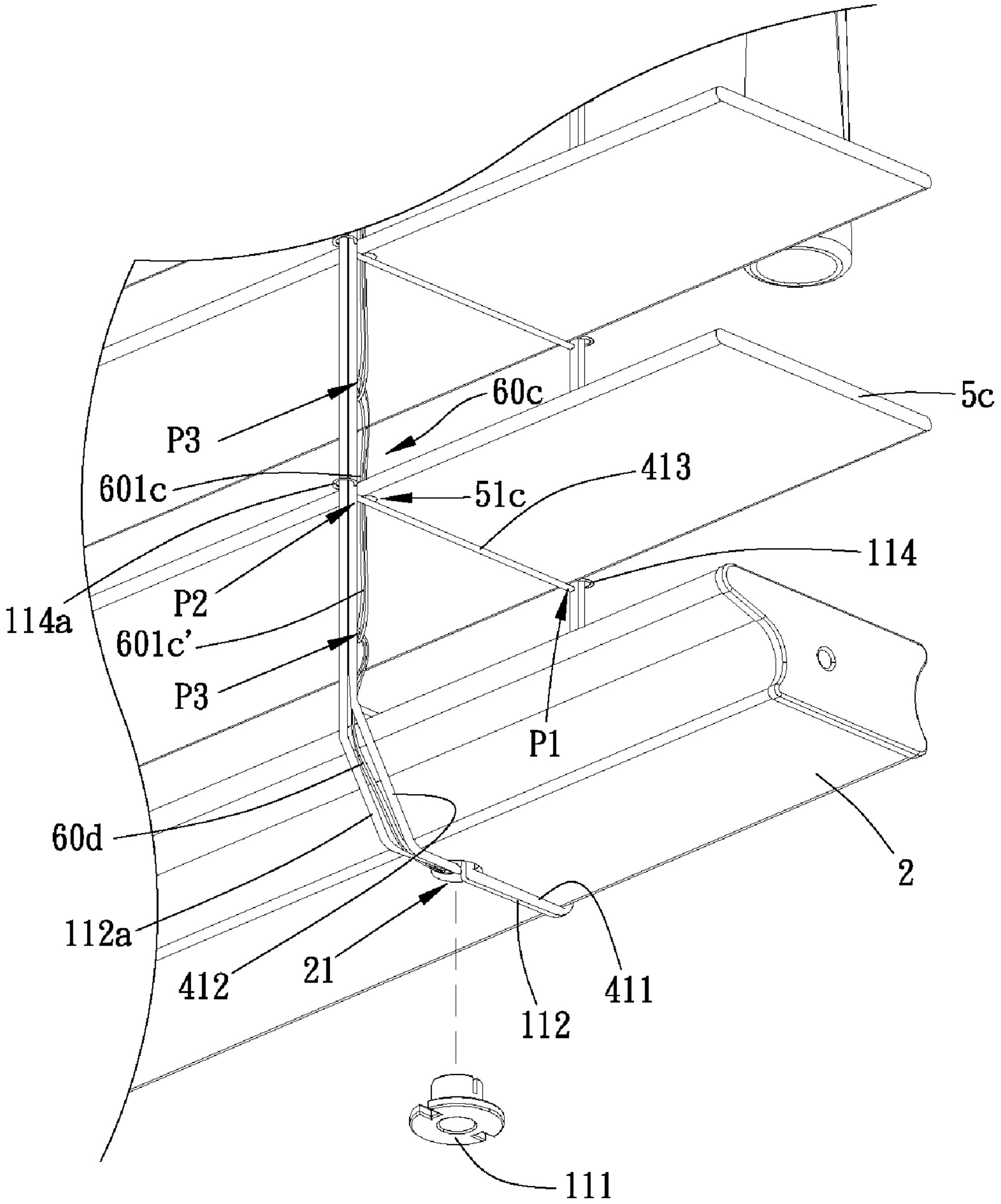
FIG. 18 is an exploded view illustrating the anchoring member in FIG. 17 separated from the lower rail.

Referring to FIGS. 11 to 13, the first pulling cord 112 extends outwardly from the reeling wheel 77 to the outside of the upper rail 1 and passes the front side of the curtain body 50. The second pulling cord 112*a* extends outwardly from the reeling wheel 78 to the outside of the upper rail 1 and passes the rear side of the curtain body 50. Afterwards, as shown in FIGS. 17 and 18, the bottom ends of the first pulling cord 112 and the second pulling cord 112*a* are inserted into the locating hole 21 of the lower rail 2. The segment of the first pulling cord 112 located between the upper rail 1 and the lower rail 2 is adjacent to the first longitudinal cord 411 and sequentially passes through the first locating rings 114 disposed on the first longitudinal cord 411. In similar manner, the segment of the second pulling cord 112*a* located between the upper rail 1 and the lower rail 2 is adjacent to the second longitudinal cord 412 and sequentially passes through the second locating rings 114*a* disposed on the second longitudinal cord 412. An anchoring member 111 is inserted into and closely fitted to the locating hole 21, such that the fixed limiting member 60*d*, the first longitudinal cord 411, the second longitudinal cord 412, the first pulling cord 112 and the second pulling cord 112*a* are together fixedly connected to the lower rail 2.

In the present embodiment, each ladder tape 410 corresponds to one locating hole 21 disposed on the bottom surface of the lower rail 2, but not limited thereto. The locating holes 21 may be disposed on other surfaces of the lower rail 2 depend on different design requirements, or there may be several locating holes corresponding to each of the components of the ladder tapes 410, e.g., the first longitudinal cord, the second longitudinal cord, and the fixed limiting member. The only requirement for setting the locating holes is that the fixed limiting member 60*d*, the first longitudinal cord 411, the second longitudinal cord 412, the first pulling cord 112 and the second pulling cord 112*a* have to be fixedly connected to the lower rail 2 for preventing the fixed limiting member from loosening and preventing the ladder tape 410, the first pulling cord 112 and the second pulling cord 112*a* from being separated from the lower rail 2.

In addition, in the present embodiment, the first longitudinal cord 411, the second longitudinal cord 412, the bearers 413, the limiting members 60, the first locating rings 114 and the second locating rings 114*a* are integrated into one piece in weaving process. In another embodiment, the bearers 413, the limiting members 60, the first locating rings 114 and the second locating rings 114*a* are independent loops each combined with the first longitudinal cord 411 and/or the second longitudinal cord 412, by stitching or adhesion, and are immovable relative to the first longitudinal cord 411 and/or the second longitudinal cord 412.

Furthermore, in the present embodiment, each limiting member 60 is a loop formed by folding a cord, but not limited thereto. Each limiting member 60 can also be a complete cord loop with a random portion thereof connected to the second longitudinal cord 412. The length of each cord for forming each of the limiting members 60 is required to be large enough for allowing each of the limiting members 60 to pass through the linking loop 61' formed by the previous limiting member 60 and the through hole 51 of the slat 5 below itself. For example, the circumference of the limiting member 60 may be required to be larger than twice the length of the predetermined interval D. In the present embodiment, each of the first locating rings 114 is correspondingly disposed adjacent to each of the first positions P1, respectively. In the meantime, each of the second locating rings 114*a* is correspondingly disposed adjacent to each of the second positions P2, respectively. Since then, the distance between each two neighboring first locating rings 114, as well as the distance between each two neighboring second locating rings 114*a*, is each approximately equal to the predetermined interval D. However, the configuration of the first locating rings 114 and the second locating rings 114*a* is not limited thereto and can be varied depend on design requirements. The first locating rings 114 and the second locating rings 114*a* are also not limited to being arranged at equal intervals. In the present embodiment, the first locating rings 114 are configured to allow the first pulling cord 112 to go therethrough, and the second locating rings 114*a* are configured to allow the second pulling cord 112*a* to go therethrough, such that the circumferences of the first locating rings 114 and the second locating rings 114*a* are smaller than the circumference of the limiting member 60, but not limited thereto. The size of the first locating rings 114 and the second locating rings 114*a* can be varied according to design requirements, and the diameters thereof are merely required to be larger than the cord diameters of the first pulling cord 112 and the second pulling cord 112*a* for allowing the first pulling cord 112 and the second pulling cord 112*a* to go through and freely move upwardly and downwardly in the first locating rings 114 and the second locating rings 114*a*, respectively.

With the arrangements mentioned above, the slats 5 are respectively limited by the limiting members 60 and prevented from excessively moving in the lateral direction resulting in an unevenly state of the two lateral sides of the curtain body 50. The first pulling cords 112 are each limited by the corresponding first locating rings 114 and would not be moved far away from the corresponding first longitudinal cord 411 in the horizontal direction. Even if the first pulling cord 112 is drawn out in the horizontal direction, friction force between the first locating rings 114 and the first pulling cord 112 will make the first pulling cord 112 not easily drawn out. In similarly manner, the second pulling cords 112*a* are limited by the corresponding second locating rings 114*a* and would not be moved far away from the corresponding second longitudinal cord 412 in the horizontal direction. If the second pulling cord 112*a* is drawn out in the horizontal direction, friction force between the second locating rings 114 and the second pulling cord 112 will make the second pulling cord 112 not easily drawn out. With the arrangements mentioned above, the full lengths of the first pulling cords 112 and the second pulling cords 112*a* are respectively close to the first longitudinal cords 411 and the second longitudinal cords 412, which makes the window blind 110 have an integrated visual design and pithy appearance. Moreover, on this circumstance, the first pulling cords 112 and the second pulling cords 112*a* are not easily drawn out in the horizontal direction, which avoids producing loops that may cause danger and improves safety in use of the window blind 110.

Referring to FIGS. 11 to 16, the window blind 110 is in the first state in which the slats 5 are in the horizontal state. In the meantime, the window blind 110 has fully extended in a vertical direction as the lower rail 2 is located at a farthest place away from the upper rail 1 within its reachable range. At this moment, the parts of the first longitudinal cord 411 and the second longitudinal cord 412 located between the upper rail 1 and the lower rail 2 are vertically extending and mostly parallel to each other. Meanwhile, the spring 76 of the lifting mechanism 70 are mostly wound on the driving wheel 72 and accumulates energy, and the reeling wheels 77 and 78 have released most parts of the first pulling cord 112 and the second pulling cords 112*a*.

Figure 19:
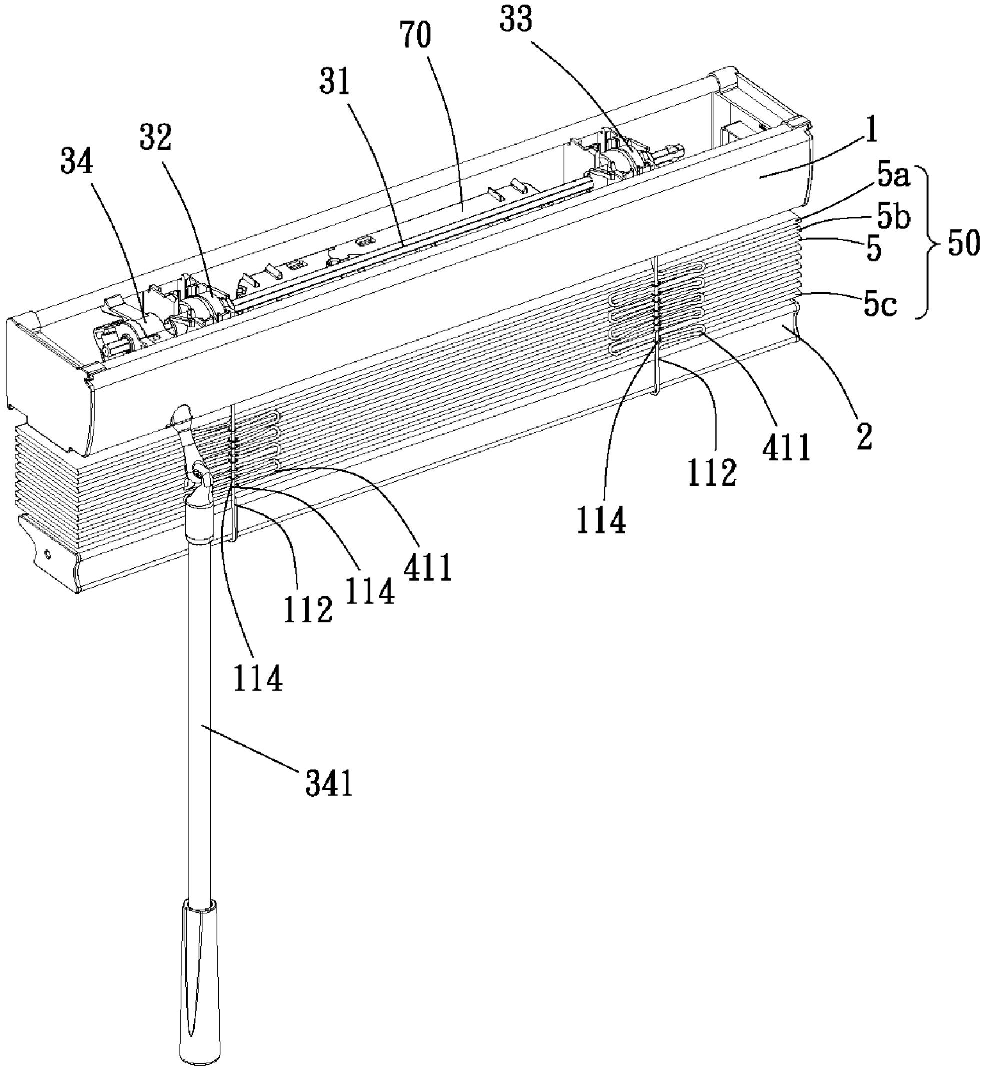
FIG. 19 is a perspective view of the window blind according to the second embodiment of the present disclosure, wherein the window blind is fully retracted.

Please refer to FIGS. 11 and 19. As shown in FIG. 19, in order to change the light-shielding range of the curtain body 50 of the window blind 110 shown in FIG. 11, the lower rail 2 is pushed upwardly, so that the distance between the upper rail 1 and the lower rail 2 decreases. On this circumstance, the first pulling cords 112 and the second pulling cords 112*a* become loosed, and the spring 76 of the lifting mechanism 70 is gradually released from the driving wheel 72 and wound on the spring storage wheel 74 at the same time, releasing energy to drive the driving wheel 72 and the reeling wheels 77 and 78 to rotate. Meanwhile, the top ends of the first pulling coed 112 and the second pulling cord 112*a* wound on and connected to the first drum 32 are gradually retracted by and wound on the reeling wheel 77, and the top ends of the first pulling coed 112 and the second pulling cord 112*a* wound on and connected to the second drum 33 are gradually retracted by and wound on the reeling wheel 78. When the lower rail 2 has moved to a place within its reachable range closest to the upper rail 1, the window blind 110 is defined as being in a fully-retracted state, as shown in FIG. 19. The user can adjust the light-shielding range of the curtain body 50 between the fully-extended state and the fully-retracted state by moving the lower rail 2.

The action principle of the lifting mechanism 70 to retract or release the first pulling cords 112 and the second pulling cords 112*a* according to the change of the distance between the lower rail 2 and the upper rail 1 while the lower rail 2 moves relative to the upper rail 1, and the technique of stopping the lower rail 2 at the position when the operation is over, are known in the art and will not be redundantly described herein. The amount of the first pulling cords 112, and the amount of the second pulling cords 112*a*, each are not limited to two and can be varied according to the width of the window blind 110. However, it is noticed that merely one first pulling cord 112 and one second pulling cord 112*a* can help the lower rail 2 of the window blind 200 to maintain in the horizontal state and avoid randomly tilting.

Figure 20:
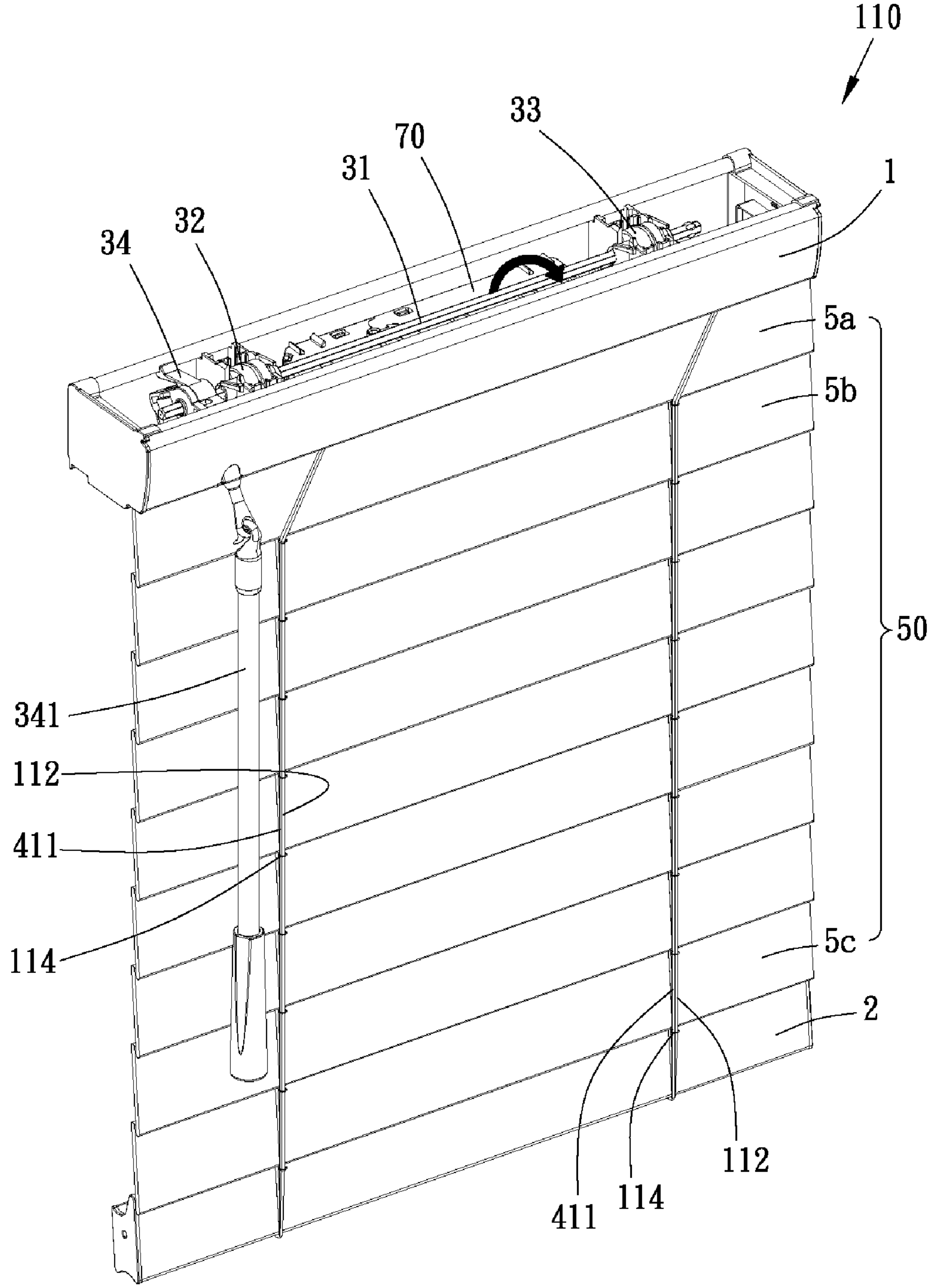
FIG. 20 is a perspective view of the window blind according to the second embodiment of the present disclosure, wherein the window blind is fully extended and the curtain body thereof is in a closed state.
Figure 21:
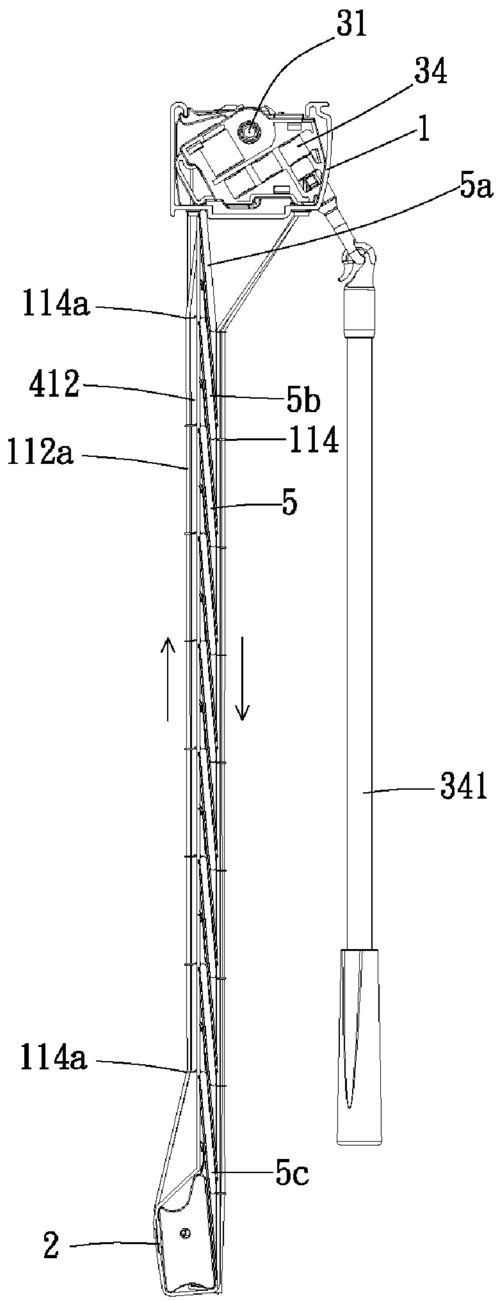
FIG. 21 is a left side view of the window blind in FIG. 20.
Figure 22:
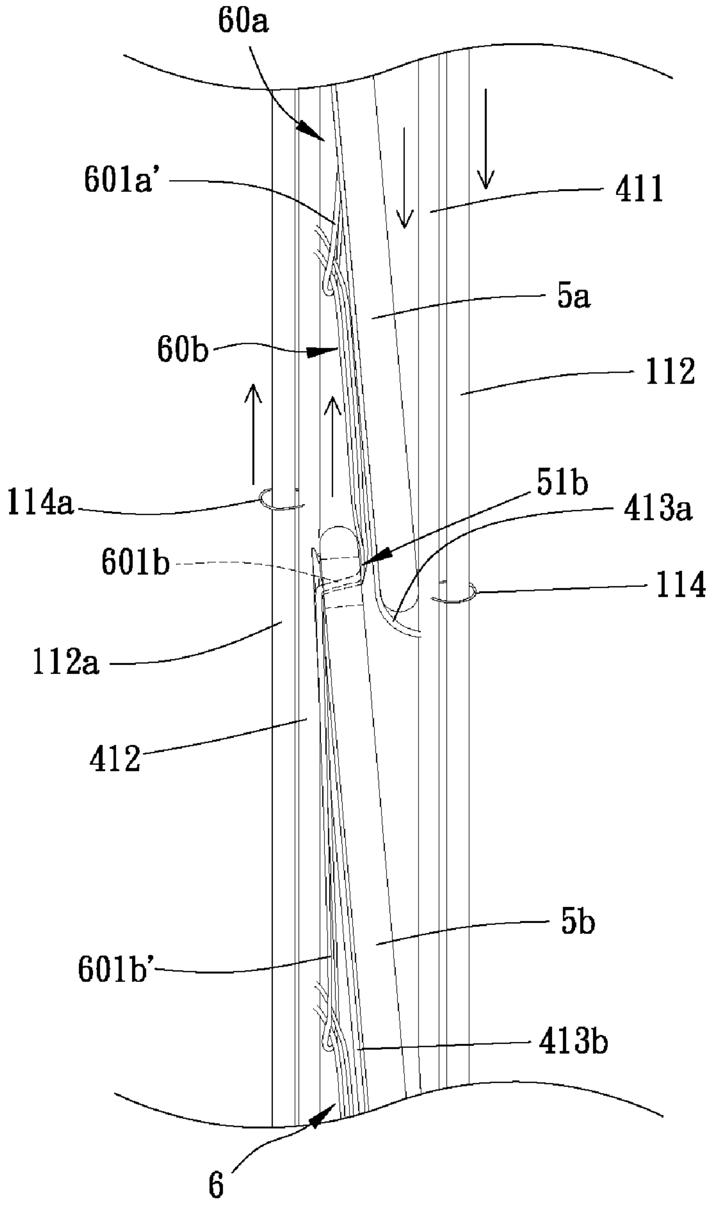
FIG. 22 is a partial enlarged view of FIG. 21.

Please refer to FIGS. 20 to 22. The user can change the translucent degree of the window blind 110 by using the operating rod 341 to drive the deflecting module 34. The acting way of the components is identical to that in the first embodiment so will not be redundantly described below. As shown in FIG. 22, after passing through the first linking loop 601*a*', the second limiting member 60*b* extends to the second slat 5*b* along the bottom of the first slat 5*a* until the second slat-through portion 601*b* thereof passes through the second through hole 51*b* of the second slat 5*b*. That is, the portion of the second limiting member 60*b* passing through the second through hole 51*b* is defined as the second slat-through portion 601*b*. The second slat-through portion 601*b* is in a bent state in comparison with other part of the second limiting member 60*b* extending along the second slat 5*b* for fixing the second slat 5*b* in place and prevented the second slat 5*b* from sliding downwardly. In the same manner, each of the slats 5 is restricted in the same position by the corresponding limiting member 60 penetrating therethrough in the bent state. Therefore, as shown in FIG. 20, the overlapping area of each two neighboring slats 5 are equal, and there is no gap between each two neighboring slats 5, such that the slats 5 are fully closed for effectively shielding light and protecting privacy.

In the present embodiment, the lifting mechanism 70 is exemplified by a spring box, but not limited thereto. In the related technical filed, many kinds of manually or motorized mechanisms can be selected depend on requirement and used to drive the lower rail 2 to move and change its position. In the present embodiment, the lifting mechanism 70 is disposed within the chamber of the upper rail 1 and located between the first drum 32 and the second drum 33, but not limited thereto. The amount of the drums may be increased according to the width of the window blind. The lifting mechanism may be disposed at the other place within the chamber of the upper rail 1, or disposed within the lower rail 2.

Referring to FIGS. 23 to 27, which illustrates the window blind 120 in a third embodiment of the present disclosure, the window blind 120 comprises an upper rail 1, a lower rail 2, a deflecting mechanism 3, two ladder tapes 420, a curtain body 50 composed of plural slats 5, a lifting mechanism 70*a* and two sets of pulling cords. Each of the two sets of pulling cords includes a first pulling cord 122 and a second pulling cord 122*a*. The window blind 120 is different from the second embodiment as the lifting mechanism 70*a* thereof is disposed on the lower rail 2, whereas the lifting mechanism 70 is disposed on the upper rail 1 in the second embodiment. Apart from this, the structures of the ladder tapes 420 of the window blind 120 and the limiting members 65 thereof, are identical to the structures of the ladder tapes 410 and the limiting members 60 thereof in the second embodiment, and will not be redundantly described below.

The lower rail 2 of the window blind 120 has a chamber for receiving the lifting mechanism 70*a*. Like the lifting mechanism 70, the lifting mechanism 70*a* comprises a driving wheel 72*a*, a spring storage wheel 74*a*, a spring 76*a* and two reeling wheels 77*a* and 78*a*. The spring 76*a* has one end connected to the driving wheel 72*a* and another end wound on the spring storage wheel 74*a*. According to different rotation directions of the driving wheel 72*a*, the spring 76*a* is wound on the driving wheel 72*a* or is released from the driving wheel 72*a* and wound on the spring storage wheel 74*a*. Compared to the reeling wheel 78*a*, the reeling wheels 77*a* is relatively closer to the driving wheel 72*a*, which means the reeling wheel 78*a* is relatively farthest to the driving wheel 72*a*. The driving wheel 72*a* and the reeling wheels 77*a* and 78*a* can drive each other to rotate as their teeth are engaged with each other.

Figure 23:
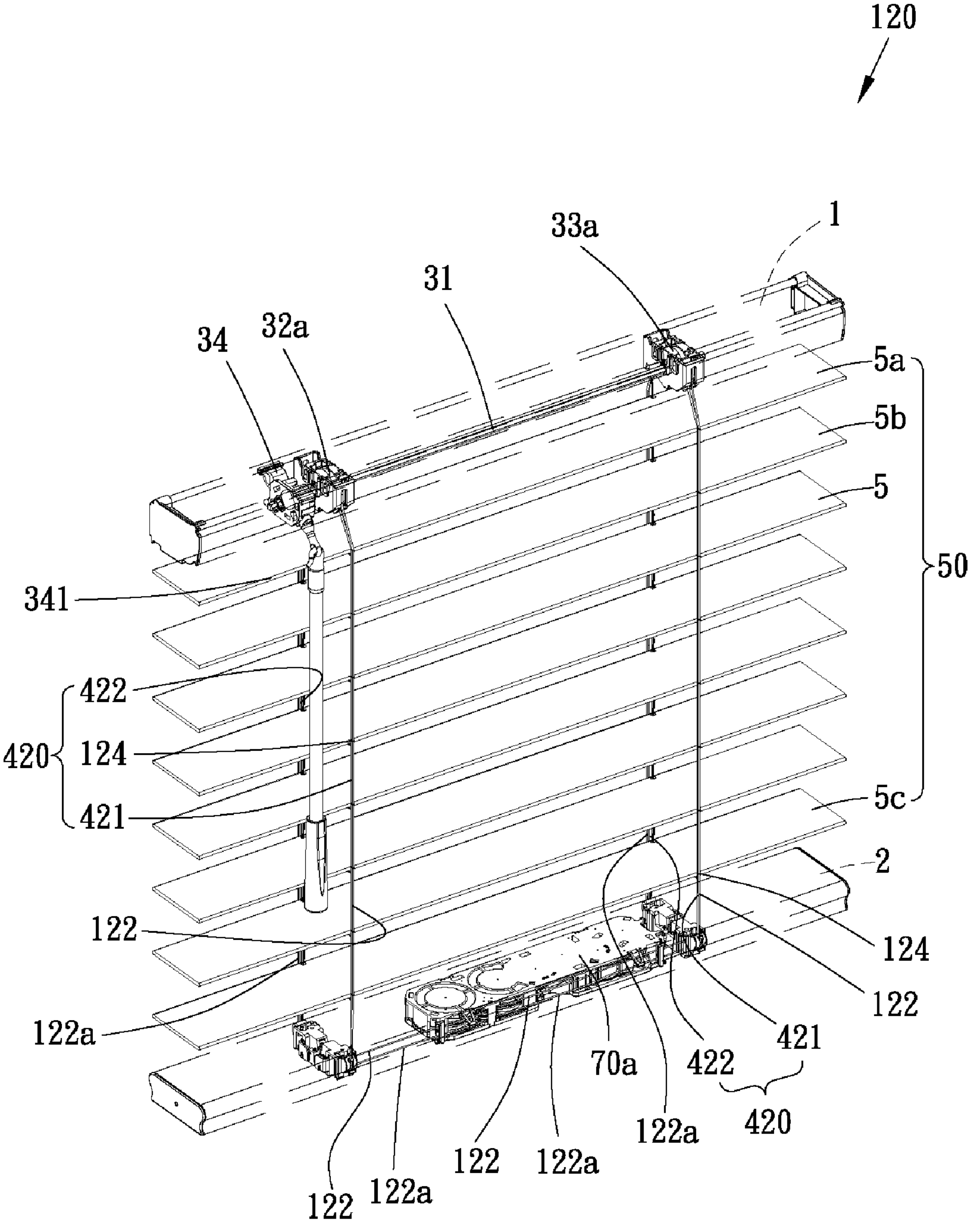
FIG. 23 is a perspective view of the window blind according to a third embodiment of the present disclosure, wherein the window blind is fully extended, the curtain body thereof is in the transparency state, and the upper rail and the lower rail are schematically shown.

In the present embodiment, the bottom ends of the first pulling cord 112 and the second pulling cord 122*a* which are located on the left side of FIG. 23, are connected to the reeling wheel 78*a*, respectively. Oppositely, the bottom ends of the first pulling cord 112 and the second pulling cord 122*a* which are located on the right side of FIG. 23, are connected to the reeling wheel 77*a*. The user can move the lower rail 2 to adjust the light-shielding range of the curtain body 50 between a fully-extended state and a fully-retracted state. When the distance between the lower rail 2 and the upper rail 1 decreases, the spring 76*a* releases energy to drive the driving wheel 72*a* to rotate, thereby driving the reeling wheels 77*a* and 78*a* to rotate and respectively retract the corresponding first pulling cord 122 and the corresponding second pulling cord 122*a*. When the distance between the lower rail 2 and the upper rail 1 increases, the reeling wheels 77*a* and 78*a* is driven to rotate by the corresponding first pulling cord 122 and the corresponding second pulling cord 122*a* which are drawn, thereby driving the driving wheel 72*a* to rotate and winding the spring 76*a* to accumulate energy.

Figure 24:
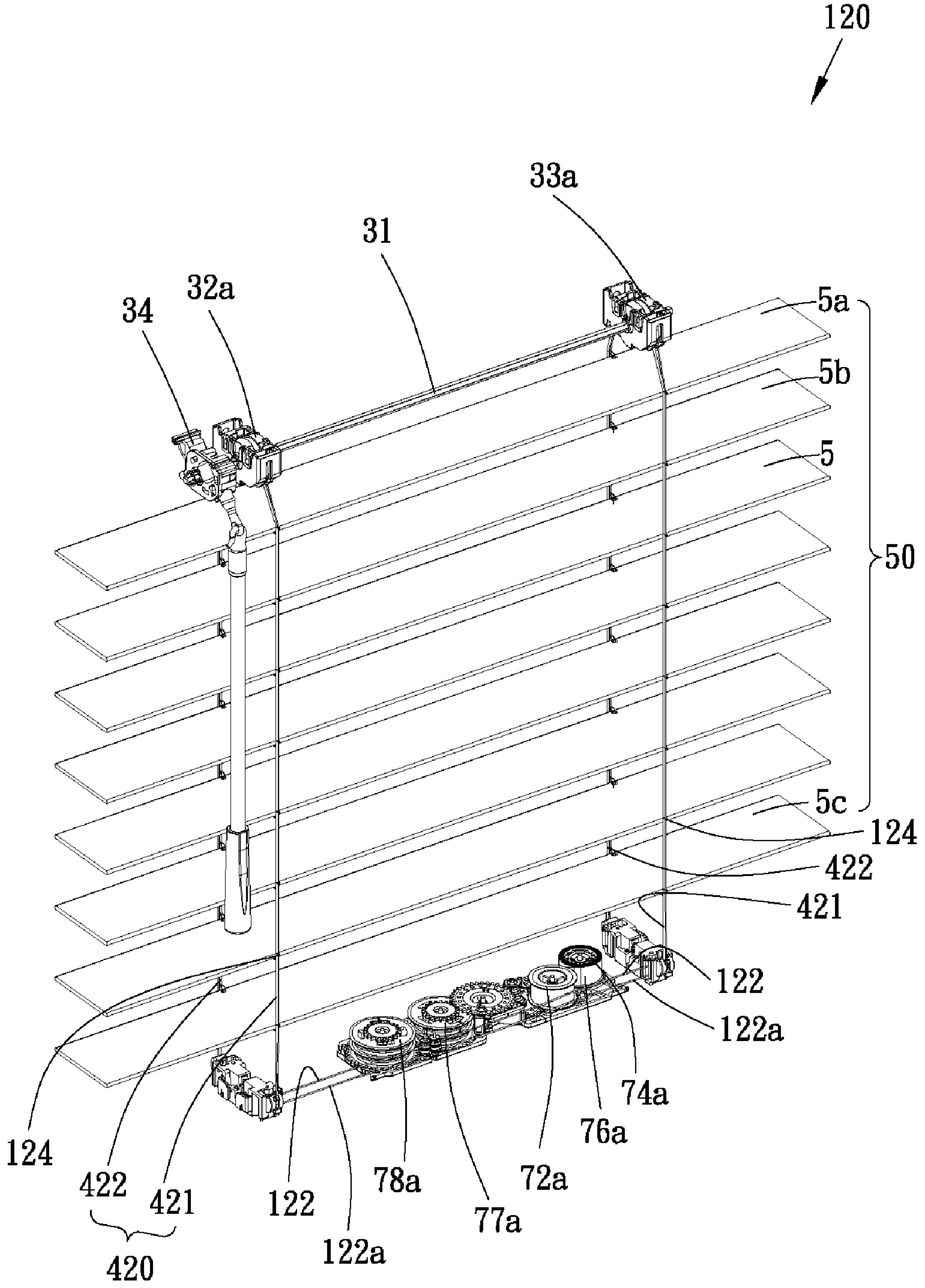
FIG. 24 is a perspective view of the window blind in FIG. 23 omitting the upper rail and the lower rail thereof.
Figure 25:
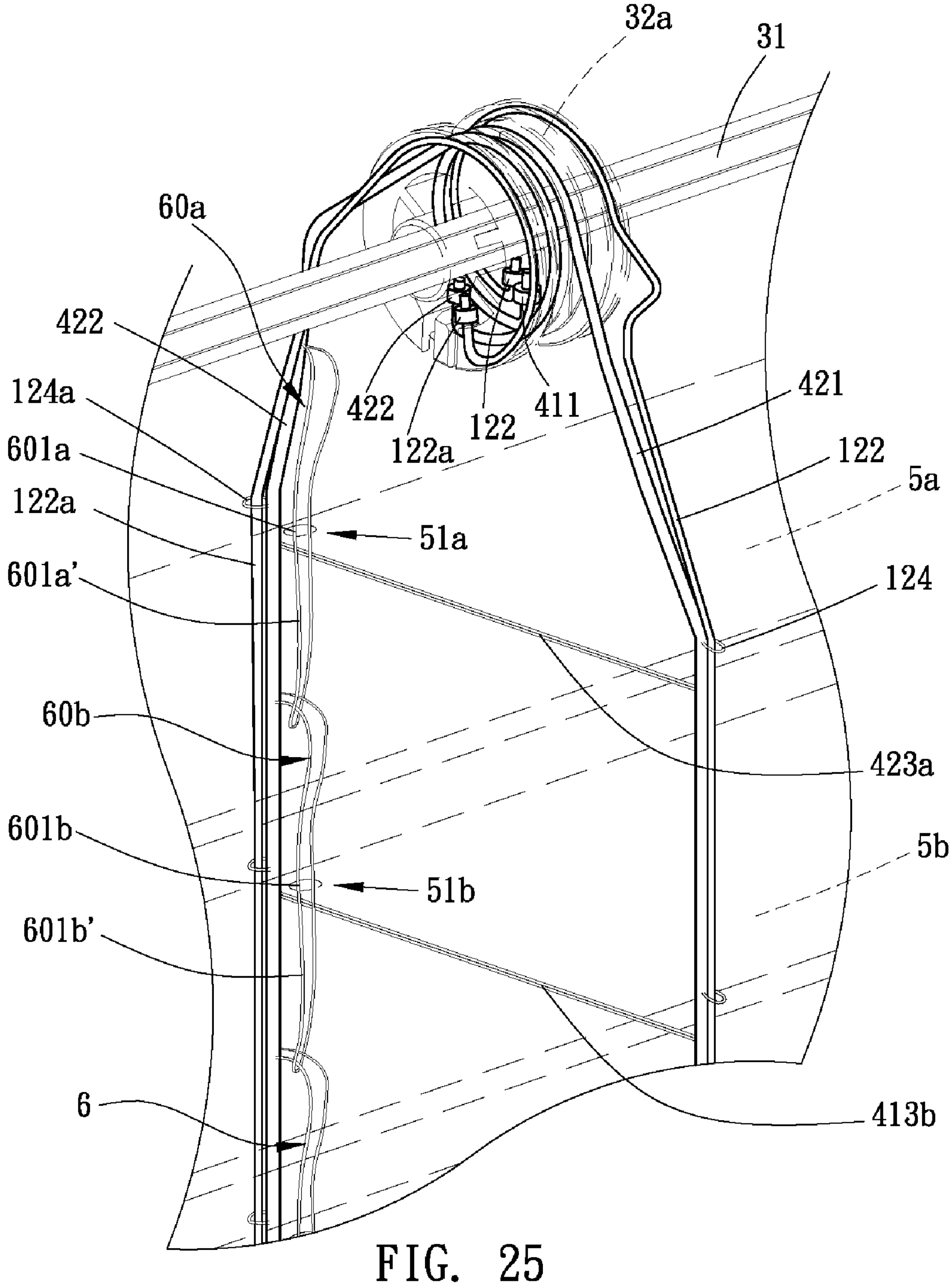
FIG. 25 schematically illustrates a partial view of the window blind in FIG. 24.

The first pulling cord 112 and the second pulling cord 122*a* of the lifting mechanism 70*a* extend from the reeling wheels 77*a* and 78*a*, moving out from the lower rail 2, respectively passing the front side and the rear side of the curtain body 50, penetrating the upper rail 1, then being connected to the first drum 32*a* and the second drum 33*a*. Taking the ladder tape 420, the first pulling cord 112, the second pulling cord 122*a* and the first drum 32*a* on the left side of FIG. 23 for an example, when the window blind 120 is in the first state as the slats 5 are in horizontal state, as shown in FIGS. 23 to 25, the first longitudinal cord 421 and the first pulling cord 112 extend from bottom to top, contacting and going around a front side, a top side and a rear side of the first drum 32*a* sequentially, being wound on part of the first drum 32*a* along the peripheral surface thereof, and having their top ends fixed to the bottom of the first drum 32*a*. On the other hand, the second longitudinal cord 422 and the second pulling cord 112*a* extend from bottom to top, contacting and going around the rear side, the top side and the front side of the first drum 32*a* sequentially, being wound on another part of the first drum 32*a* along the peripheral surface thereof, and having their top ends fixed to the bottom of the first drum 32*a*. At this moment, the top ends of the first longitudinal cord 421, the second longitudinal cord 422, the first pulling cord 112 and the second pulling cord 122*a*, are located at their closest positions on the first drum 32*a* to the slats.

Figure 26:
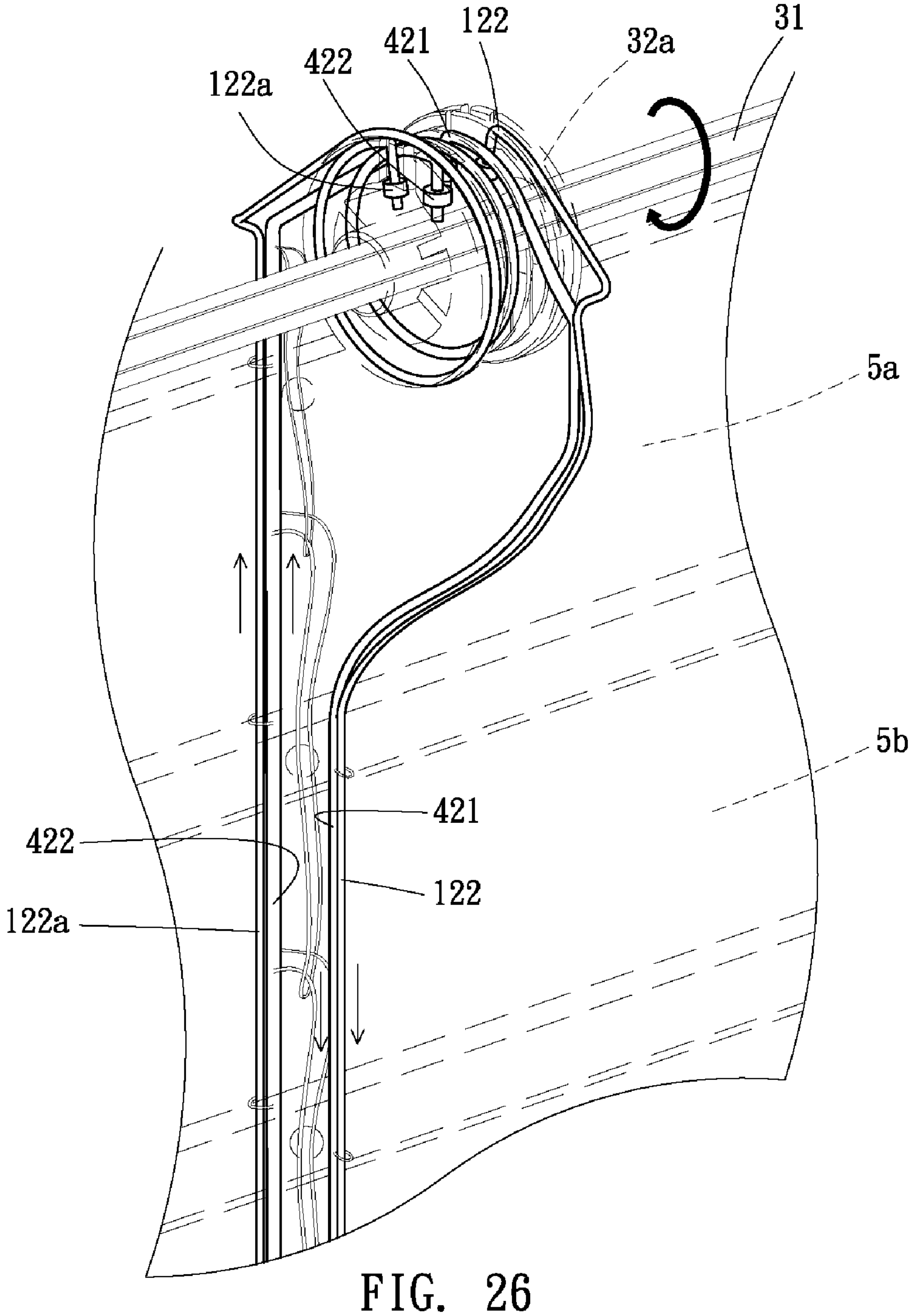
FIG. 26 schematically illustrates a partial view of the window blind according to the third embodiment of the present disclosure in which the curtain body thereof is in a fully-disclosed state.
Figure 27:
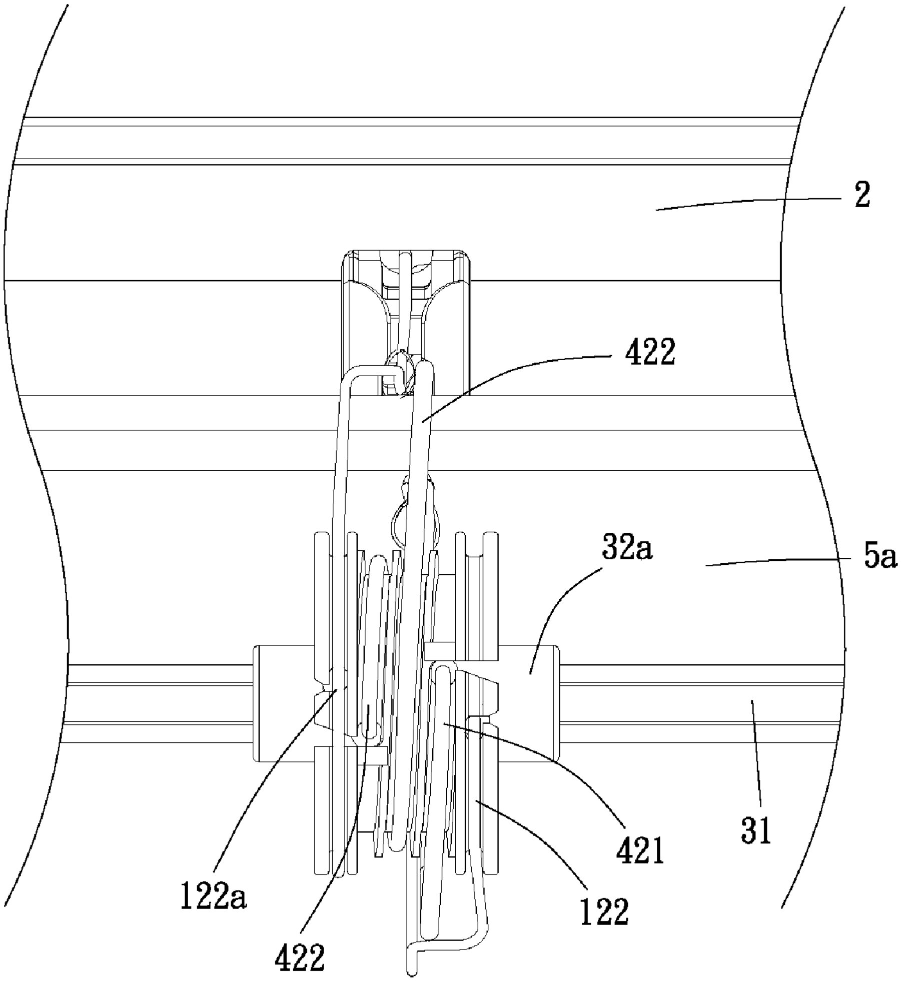
FIG. 27 is a top view of FIG. 26.
Figure 28:
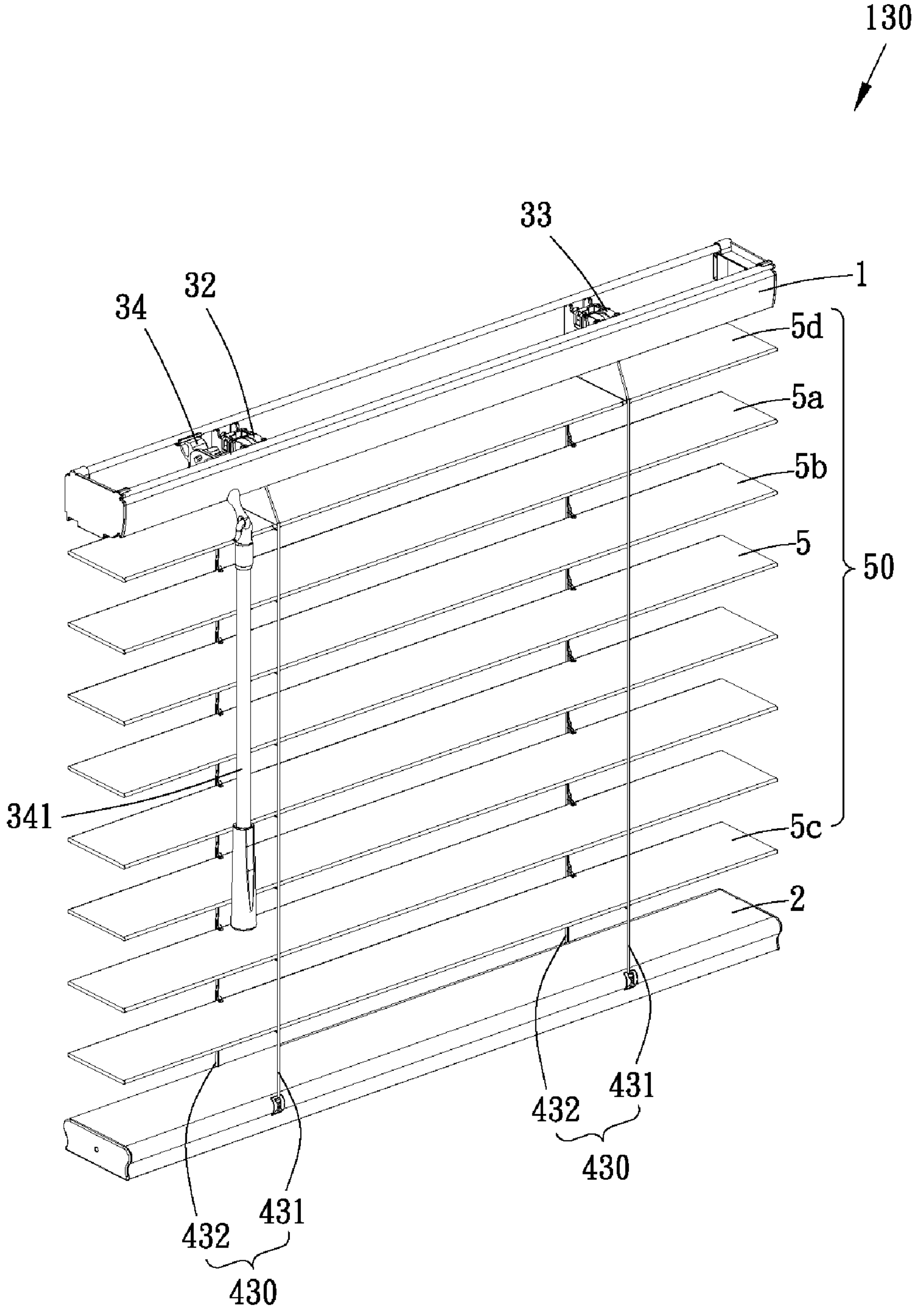
FIG. 28 is a perspective view of the window blind according to a fourth embodiment of the present disclosure, wherein the window blind is fully extended and the curtain body thereof is in the transparency state.

The user is allowed to change translucent degree of the slats by rotating the operating rod 341 to drive the shaft 31 to rotate. As shown in FIG. 26, when the shaft 31 is driven by the operating rod 341 to rotate clockwise (seen from the left side to the right side of the figure), the first drum 32*a* rotates in the same direction concurrently, and the places on the first drum 32*a* where the top ends of the first longitudinal cord 421, the second longitudinal cord 422, the first pulling cord 122 and the second pulling cord 122*a* connected to move along with the rotation of the first drum 32*a*. During the rotation of the first drum 32*a*, the parts of the first longitudinal cord 421 and the first pulling cord 122 located on the front side of the first drum 32*a* are gradually released from the peripheral surface of the first drum 32*a*. That is, the parts of the first longitudinal cord 421 and the first pulling cord 122 wound on the first drum 32*a* decrease, such that the parts of the first longitudinal cord 421 and the first pulling cord 122 located between the upper rail 1 and the lower rail 2 are elongated. On the contrary, during the rotation of the first drum 32*a*, the parts of the second longitudinal cord 422 and the second pulling cord 122*a* located on the rear side of the first drum 32*a* are gradually wound on the peripheral surface of the first drum 32*a*. That is, the parts of the second longitudinal cord 422 and the second pulling cord 122*a* wound on the first drum 32*a* increase, such that the parts of the second longitudinal cord 422 and the second pulling cord 122*a* located between the upper rail 1 and the lower rail 2 are shortened. Since the lengths of the first longitudinal cord 421 and the second longitudinal cord 422 change, the bearers 423 are tilted to be lower at the front and higher at the rear (from a view by the user facing the window blind 120), and the slats 5 placed thereon are also tilted in the same way. Therefore, the translucent degree of the curtain body 50 is changed.

Referring to FIGS. 28 to 33, which illustrate a window blind 130 according to a fourth embodiment of the present disclosure. The window blind 130 comprises an upper rail 1, a lower rail 2, a deflecting mechanism 3, two ladder tapes 430 and a curtain body 50 composed of plural slats 5. Each ladder tape 430 comprises a first longitudinal cord 431, a second longitudinal cord 432, plural bearers 433 and plural limiting members 8. The differences between the window blind 130 and the aforesaid embodiments are mainly in the structure of the limiting members 8, which is different from the structure of the limiting members 6, 60 or 65.

Figure 29:
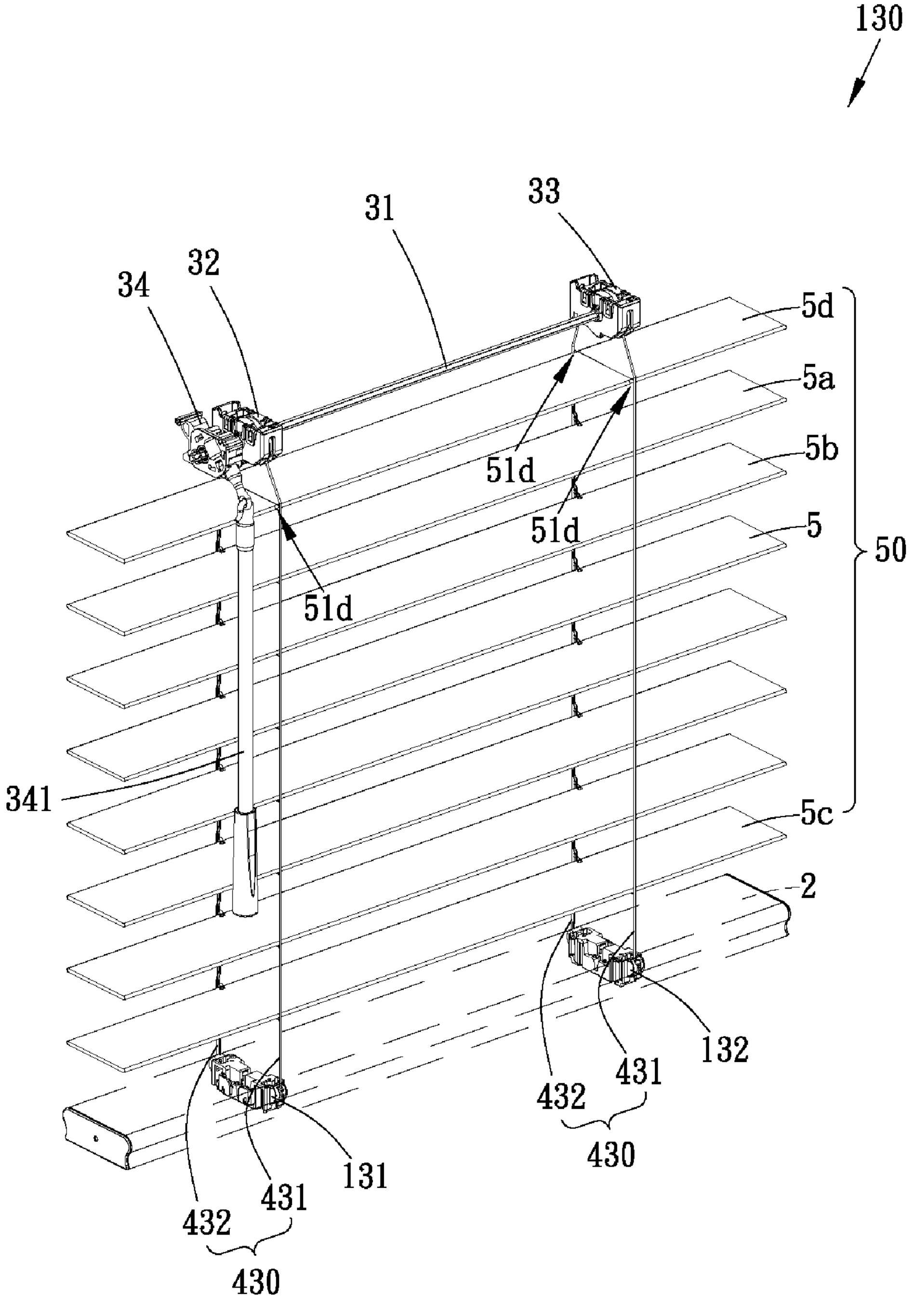
FIG. 29 schematically illustrates the window blind in FIG. 28 omitting the upper rail.

In the present embodiment, the first longitudinal cord 431 of each ladder tape 430 comprises plural first positions P1, which are arranged with spacing and separated by a predetermined interval D on the first longitudinal cord 431. The second longitudinal cord 732 comprises plural second positions P2, plural third positions P3 and plural fourth positions P4 thereon, wherein the third positions P3 are respectively adjacent to the second positions P2, and the fourth positions P4 thereon are arranged in staggered relation to the third positions P3. In the present embodiment, the second positions P2 are spaced the predetermined interval D apart from each other, and so do the third positions P3 and the fourth positions P4. Each bearer 433 is disposed between the first longitudinal cord 431 and the second longitudinal cord 432. More specifically, each bearer 433 has one end correspondingly connected to each first position P1 on the first longitudinal cord 431, and another end correspondingly connected to each second position P2 on the second longitudinal cord 432. The bearers 432 comprise a first bearer 433*a* and a second bearer 433*b* neighboring thereto, and further comprise a top bearer 433*c*. The top bearer 433*c* is the closest one of the bearers 433 to the upper rail 1, and comprises two adjusting units 4331*c* and 4332*c*. The slats 5 comprise a first slat 5*a* and a second slat 5*b* supported by the first bearer 432*a* and the second bearer 432*b*, respectively. In the present embodiment, the slats 5 further comprise a last slat 5*c* and a top slat 5*d*. The top slat 5*d* is disposed between the adjusting units 4331*c* and 4332*c* of the top bearer 433*c*, and has one notch 51*d* for each of the first longitudinal cords 431 and the second longitudinal cords 432. As shown in FIG. 29, the portions of the first longitudinal cords 431 and the second longitudinal cords 432 passing through the top slat 5*d* are each inserted into the corresponding one of the notches 51*d*.

Figure 32:
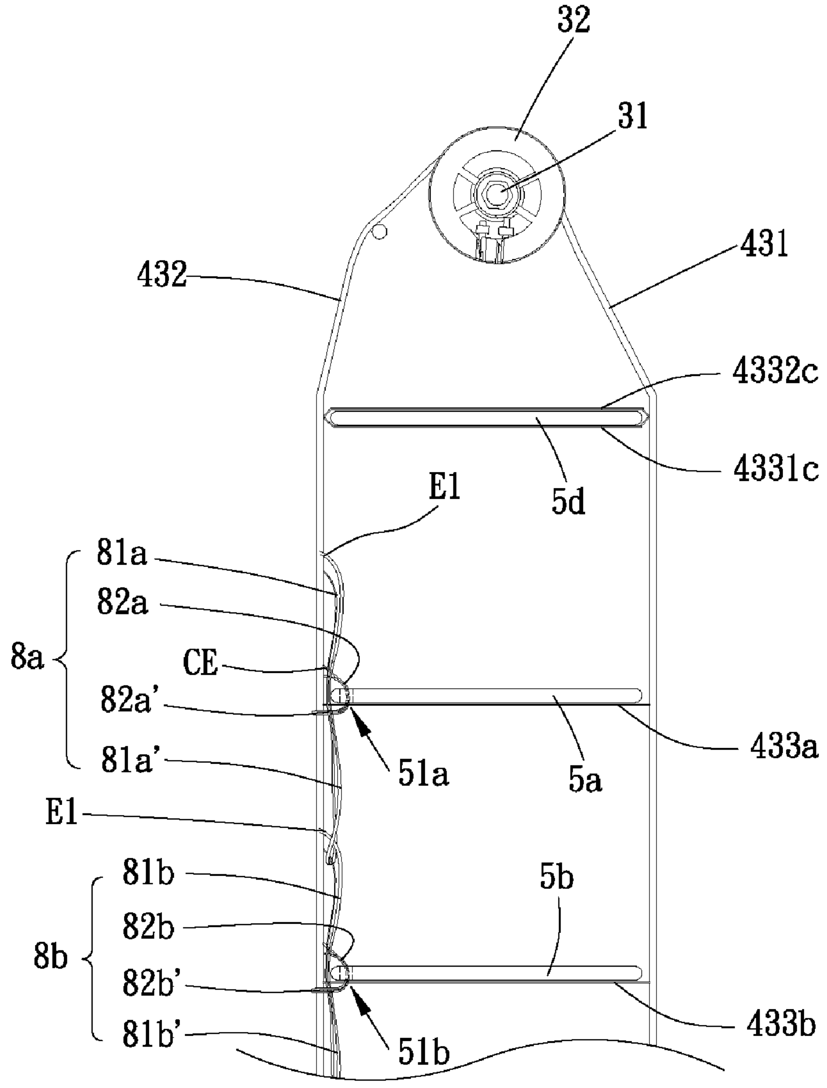
FIG. 32 is a partial enlarged view of the window blind in FIG. 31 omitting the upper rail and the deflecting module.
Figure 33:
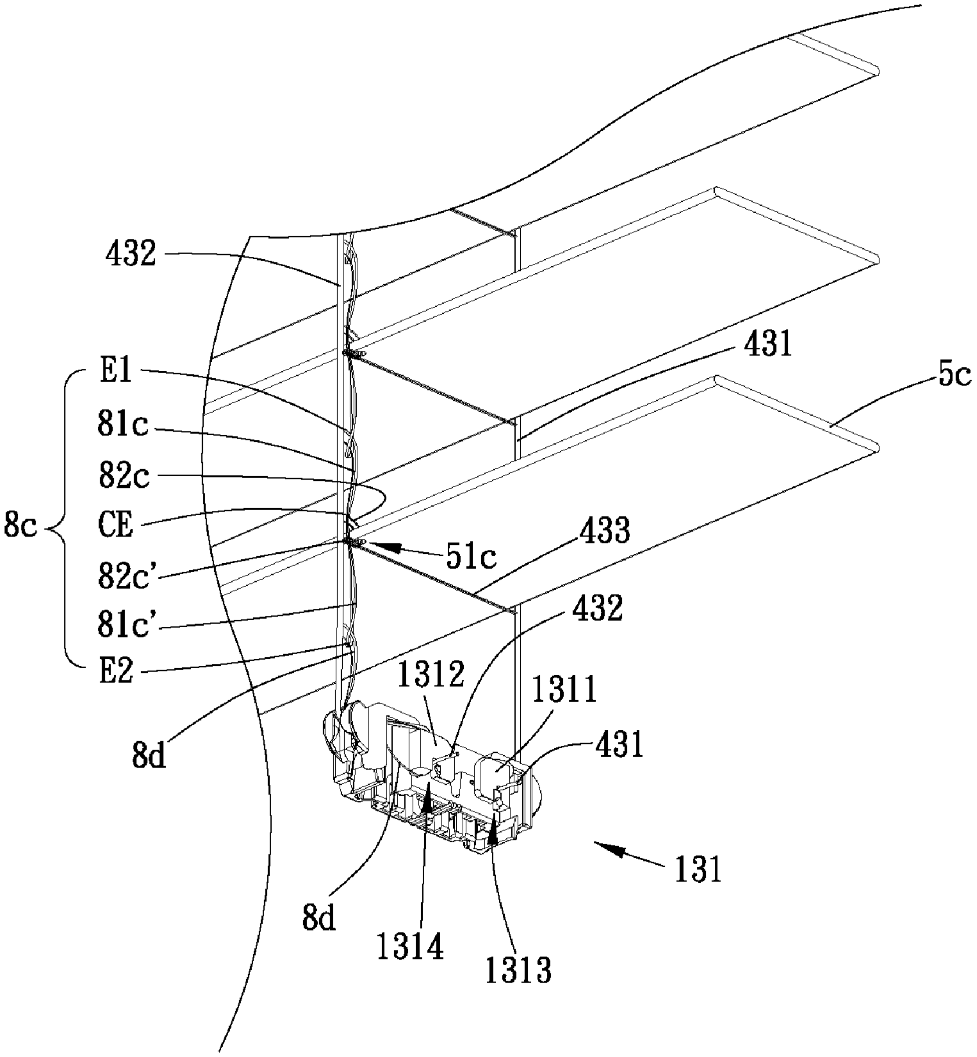
FIG. 33 is a partial enlarged perspective view of the window blind in FIG. 28.
Figure 34:
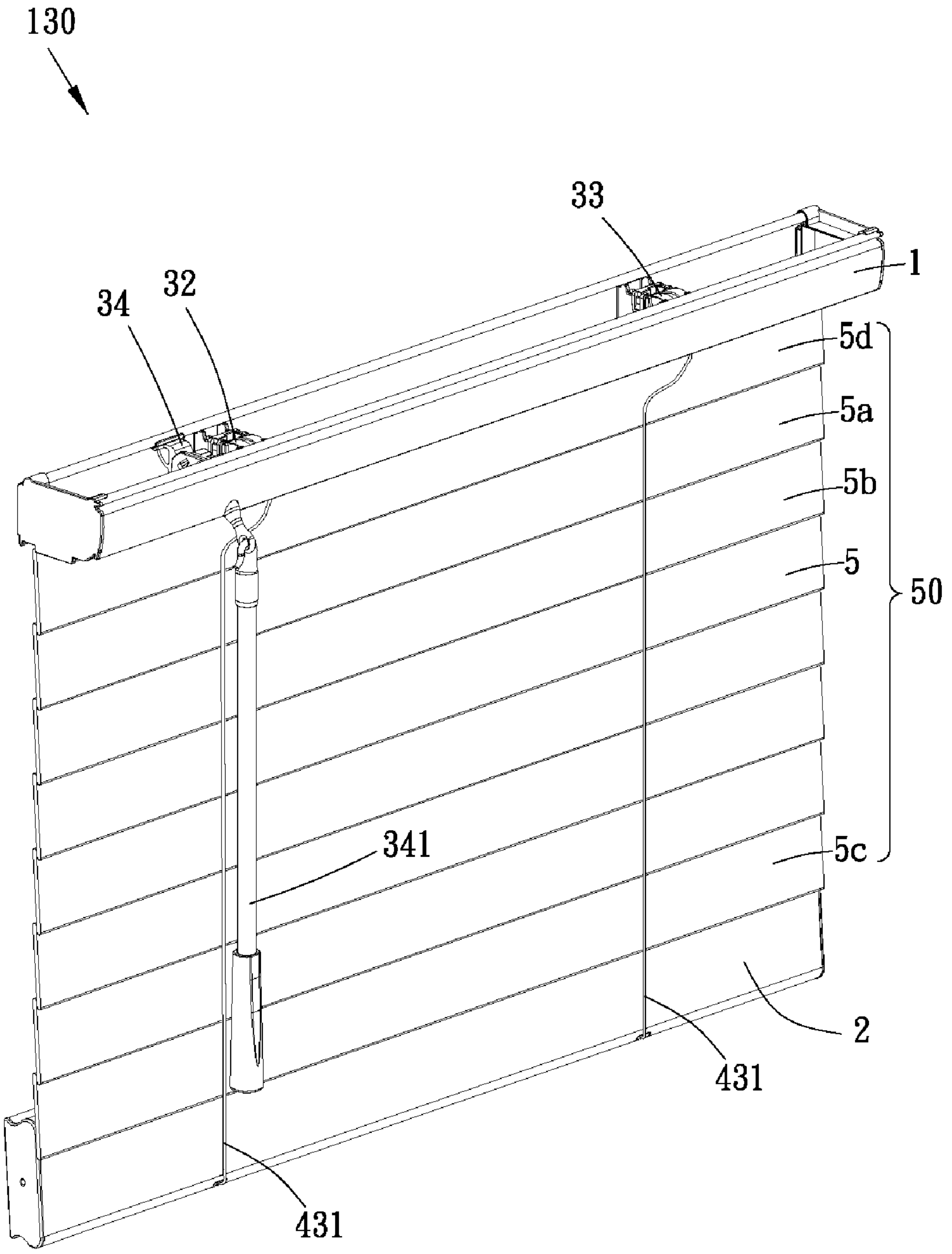
FIG. 34 is a perspective view of the window blind in FIG. 28, wherein the window blind is fully extended and the curtain body thereof is in the closed state.
Figure 35:
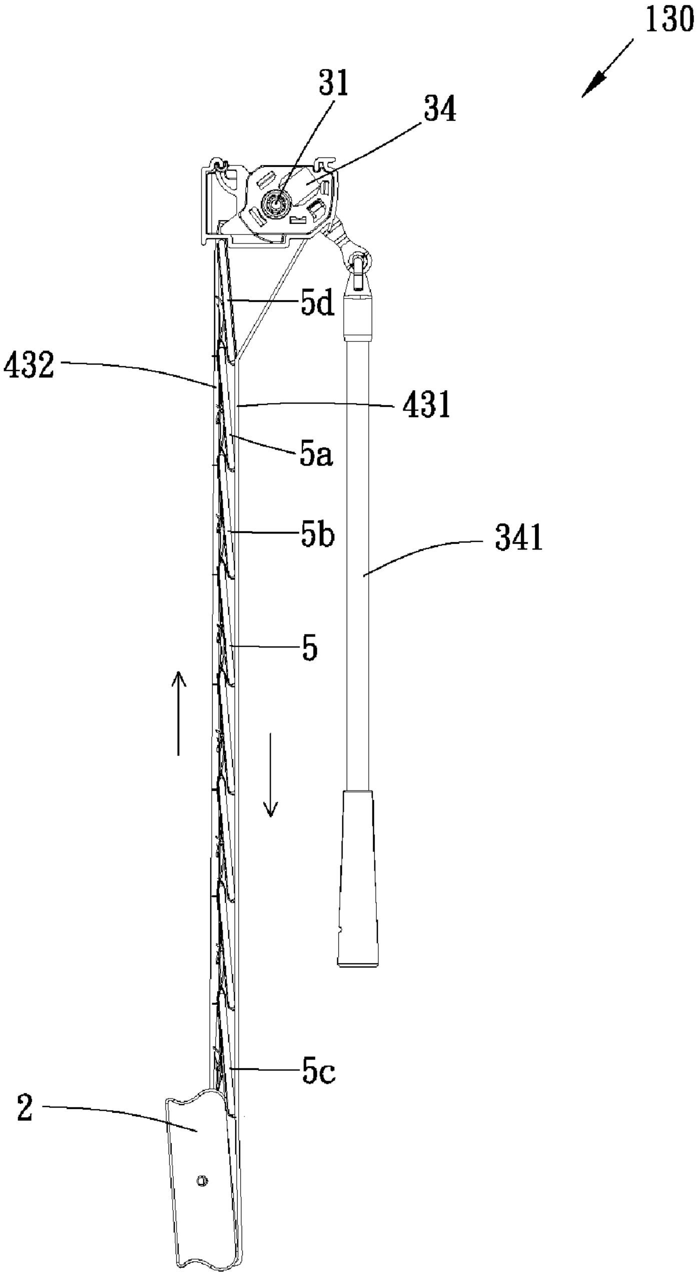
FIG. 35 is a left side view of FIG. 34.
Figure 36:
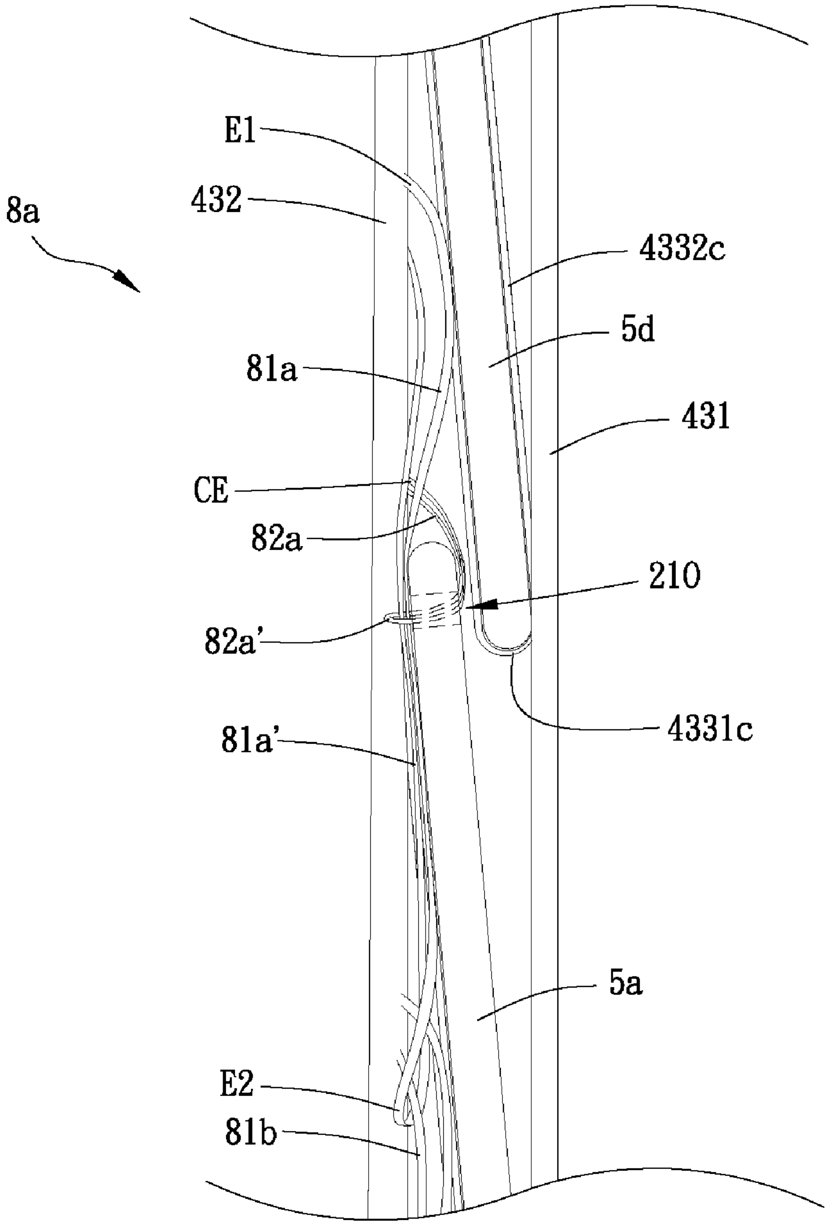
FIG. 36 is a partial enlarged view of FIG. 35.

Referring to FIG. 32 and FIG. 33, in the present embodiment, all of the slats 5 each have a through hole 51 except for the top slat 5*d*, e.g., the first slat 5*a* comprises a first through hole 51*a* at a side thereof near the second longitudinal 432, the second slat 5*b* comprises a second through hole 51*b* at a side thereof near the second longitudinal 432, and the last slat 5*c* comprises a last through hole 51*c* at a side thereof near the second longitudinal 432. Each limiting member 8 has a first end E1 and a second end E2 opposing thereto. The ends E1 of the limiting member 8 are respectively disposed on the third positions P3 on the second longitudinal 432, so that the limiting members 8 are arranged vertically on the second longitudinal 432. The limiting members 8 comprise a first limiting member 8*a* and a second limiting member 8*b* neighboring thereto. The first limiting member 8*a* comprises a first main portion 81*a* and a first slat-through portion 82*a*. The first main portion 81*a* extends from the first end E1 of the first limiting member 8*a* to the second end E2. The first slat-through portion 82*a* has a connecting end CE disposed on the corresponding fourth position P4 on the second longitudinal cord 432, and forms a first limiting loop 82*a*' after passing through the first through hole 51*a* of the first slat 5. The first main portion 81*a* passes through the first limiting loop 82*a*', and forms a first linking loop 81*a*' after passing through the first limiting loop 82*a*', which is provided to be penetrated through by the second limiting member 8*b*. The second end E2 of the first limiting member 8*a* is located on the first linking loop 81*a*'. Since the first main portion 81*a* passes through the first limiting loop 82*a*', when the first slat 5*a* moves under external force, the through hole 51*a* of the first slat 5*a* remains threaded through by one of the first slat-through portion 82*a* and the first main portion 81*a*. That is, movement of the first slat 5*a* is limited.

The second limiting member 8*b* has the same structure as the first limiting member 8*a*, comprising a second main portion 81*b* and a second slat-through portion 82*b*. The second slat-through portion 82*b* forms a second limiting loop 82*b*' after passing through the second through hole 51*b* of the second slat 5*b*. The second main portion 81*b* passes through the first linking loop 81*a*' and the second limiting loop 82*b*' sequentially, and forms a second linking loop 81*b*' after passing through the second limiting loop 82*b*' for the next limiting member 8 located below the second limiting member 8*b* to go therethrough, so on and so forth. As so, each neighboring two of the limiting members 8 are linked in the same way as the first limiting member 8*a* and the second limiting member 8*b*, such that the through holes 51 of all the slats 5 are each penetrated by the slat-through portion 82 of the corresponding limiting member 8 and limited to the vicinity of the corresponding limiting member 8. Even if the slat-through portion 82 of one of the limiting members 8 is accidentally drawn out from the corresponding through hole 51, the main portion 81 going through the limiting loop 82' formed by the slat-through portion 82 will be drawn into and pass through the through hole 51 simultaneously for restricting the position of the aforesaid through hole 51.

Referring to FIG. 32, in the present embodiment, the first slat 5*a* is closer to the upper rail 1 than the second slat 5*b*. On the second longitudinal cored 432, the fourth position P4 where the first slat-through portion 82*a* disposed is closer to the upper rail 1 than the second position P2 where the first bearer 432*a* disposed, the third position P3 where the first limiting member 8*a* disposed is closer to the upper rail 1 than the fourth position P4 where the first slat-through portion 82*a* disposed, the fourth position P4 where the second slat-through portion 82*b* disposed is closer to the upper rail 1 than the second position P2 where the second bearer 432*b* disposed, and the third position P3 where the second limiting member 8*b* disposed is closer to the upper rail 1 than the fourth position P4 where the second slat-through portion 82*b* disposed.

Figure 30:
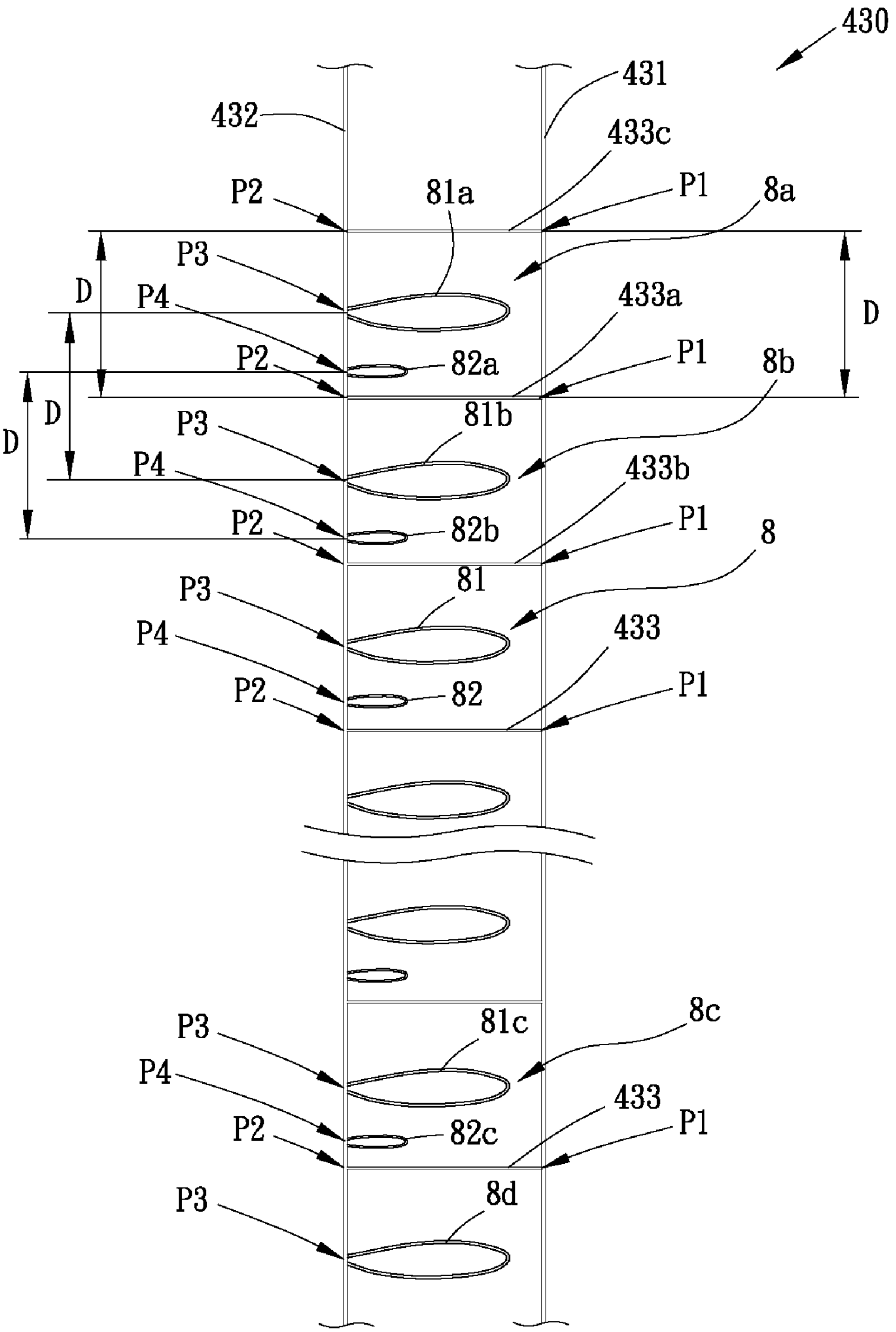
FIG. 30 is a schematic diagram illustrating an original structure of the ladder tape of the window blind in FIG. 28, as the ladder tape is not assembled with the slats yet.
Figure 31:
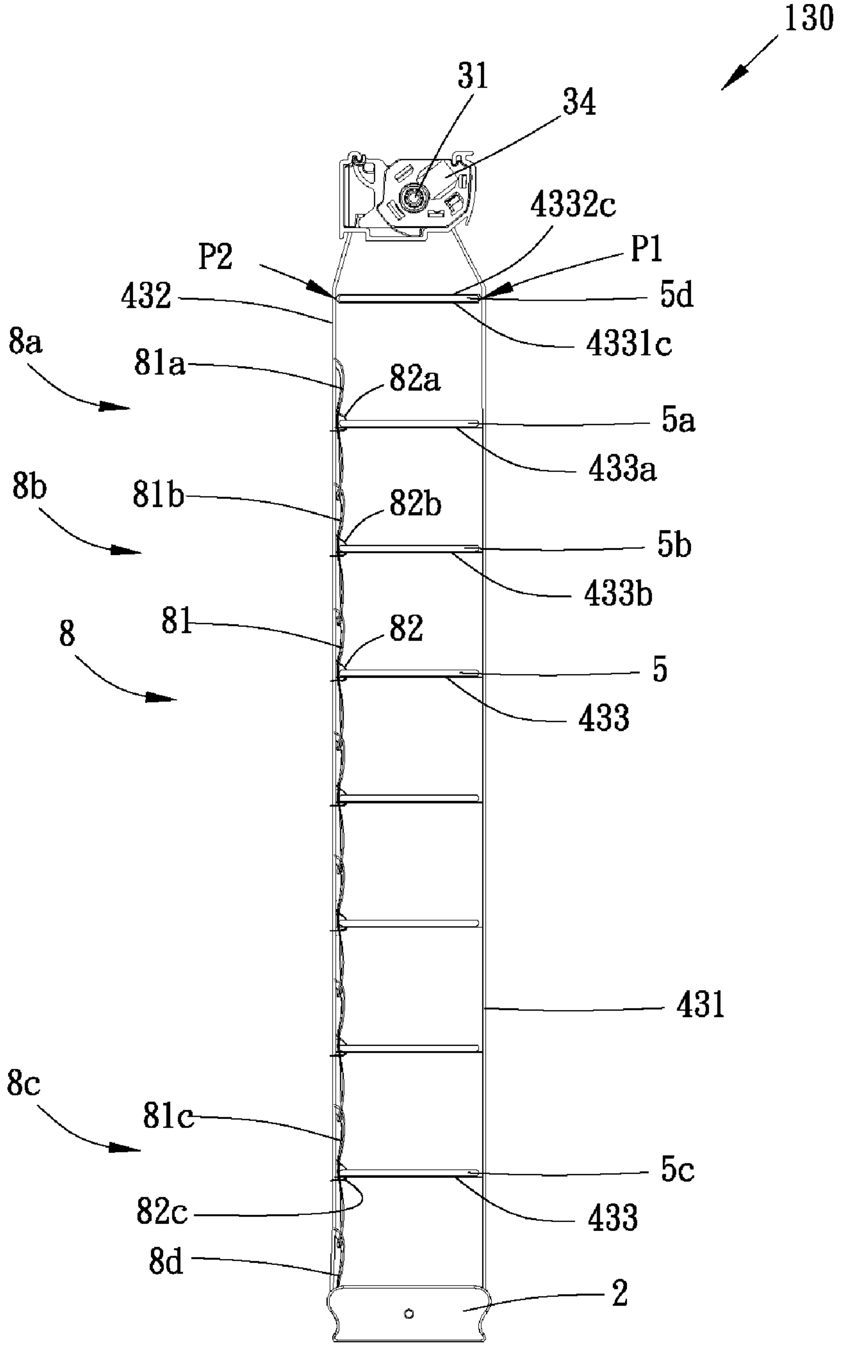
FIG. 31 is a left side view of the window blind in FIG. 28 omitting the operating rod.

Referring to FIG. 33, in the present embodiment, the last slat 5*c* is the closest one of the slats 5 to the lower rail 2. The limiting members 8 further comprise a last limiting member 8*c* and a fixed limiting member 8*d*. On the second longitudinal cord 432, the third positions P3 where the last limiting member 8*c* and the fixed limiting member 8*d* disposed are the second closest one and the closest one to the lower rail 2, respectively. The last limiting member 8*c* comprises a last main portion 81*c*, a last slat-through portion 82*c* and a last-linking loop 81*c*'. The last main portion 81*c* extends from the first end E1 to the second end E2 of the last limiting member 8*c*. The last slat-through portion 82*c* has a connecting end CE disposed on the closest one of the forth positions P4 to the lower rail 2, and forms a last limiting loop 82*c*' after passing through the last through hole 51*c* of the last slat 5*c*. The last main portion 81*c* passes through the linking loop 81' of the previous limiting member 8 and the last limiting loop 82*c*' sequentially, and forms the last-linking loop 81*c*' after passing through the last limiting loop 82*c*'. The first end of the fixed limiting member 8*d* is disposed on the closest one of the third positions P3 to the lower rail 2, as shown in FIG. 30. The second end of the fixed limiting member 8*d* extends towards the bottom of the lower rail 2 after passing through the last-linking loop 81*c*', and is connected to the lower rail 2 together with the bottom ends of the first longitudinal cord 431 and the second longitudinal cord 432 by an anchoring member 131.

In the present embodiment, the anchoring member 131 comprises a first clamping block 1311 and a second clamping block 1312. The first clamping block 1311 has a first clamping groove 1313, and the second clamping block 1312 has a second clamping groove 1314. The anchoring member 131 has several passages inside. The bottom end of the first longitudinal cord 431 goes into the anchoring member 131, then going out from one side of the first clamping block 1311 and going around the first clamping block 1311, finally being inserted into and closely fitted to the first clamping groove 1313. The fixed limiting member 8*d* extends to the anchoring member 131, going around the second clamping block 1312, and then being tightly fitted thereto. In this way, the bottom ends of the first longitudinal cord 431 and the second longitudinal cord 432, and the fixed limiting member 8*d*, are inseparable from the lower rail 2. Referring to FIG. 29, the bottom ends of the ladder tape 430 located on the right side of FIG. 29 are connected to the anchoring member 132 on the right side of the lower rail 2. The structure of the anchoring member 132 is symmetrical to the structure of the anchoring member 131. The first longitudinal cord 431, the second longitudinal cord 432 and the fixed limiting member 8*d* of the ladder tape 430 located on the right side of FIG. 29, are connected to the anchoring member 132, in the same way as the way the ladder tape 430 located on the left side of FIG. 29 is connected to the anchoring member 131.

In some other embodiments, the bottom ends of the first longitudinal cord 431 and the second longitudinal cord 432, as well as the fixed limiting member 8*d*, are connected to the lower rail 2 in other ways. For instance, several holes are bored on the lower rail 2, and the bottom ends of the first longitudinal cord 431 and the second longitudinal cord 432, and the fixed limiting member 8*d*, respectively go through the different holes and then tying a knot for being fixed thereto. In another embodiment, only the first longitudinal cord 431 and the second longitudinal cord 432 are fixed on the lower rail 2, whereas the second end of the fixed limiting member 8*d* is fixed on the second longitudinal cord 432. In this way, the fixed limiting member 8*d* is also restricted to the same position, and the last through hole 51*c* of the last slat 5*c* remains threaded through by one of the last main portion 81*c* and the last slat-through portion 82*c*.

In the present embodiment, for each of the ladder tapes 430, the first longitudinal cord 431, the second longitudinal cord 432, the bearers 433, the main portions 81 of the limiting members 8, and the slat-through portions 82 of the limiting members 8, are integrated into one piece during the weaving process, wherein the second positions P2, the third positions P3 and the fourth positions P4 do not overlap each other. In some other embodiments, the bearers 433, the main portions 81 of the limiting members 8, and the slat-through portions 82, can also be loops formed independently and individually combined with the first longitudinal cord 431 and the second longitudinal cord 432, by stitching or adhesion. In other embodiments, the end of each bearer to be connected to the second longitudinal cord, the first end of the main portion of each limiting member, and the connecting end of the slat-through portion of each limiting member, can be disposed at the same position on the second longitudinal cord. In other words, the second position P2, the third position P3 and the fourth position P4 are overlapped. On this circumstance, the length of the slat-through portion is required to be shorter than the main portion, such that the slat-through portion can prevent large transverse movement of the slat after threading through the slat.

In addition, in the present embodiment, the slat-through portion 82 of each limiting member 8 is a loop formed by folding a cord, but not limited thereto. Each slat-through portion 82 can also be a complete cord loop with a random portion connected to the second longitudinal cord 432. Furthermore, in the present embodiment, the circumference of each slat-through portion 82, is merely required to be large enough so that the limiting loop 82' formed by the slat-through portion 82 after passing through the through hole 51 of the slat 5 allows the corresponding main portion 81 to pass through, and the slat-through portions 82 do not affect the slats 5 to change inclination angles along with tilt of the bearers 433 while the bearers 433 change inclination angles. On the other hand, each main portion 81 is required to be slightly larger than twice the predetermined interval D for threading through the corresponding limiting loop 82' and the linking loop 81' without affecting the intervals between each two bearers 433 (also the intervals between each two slats 5). As so, the circumference of the slat-through portion 82 is obviously smaller than the circumference of the main portion 81. Moreover, the second longitudinal cord 432 passes the rear side of the curtain body 50, but is not limited thereto. The positions of the second longitudinal cord 432 and the first longitudinal cord 431 can be exchanged. In another embodiment, each slat comprises a through hole for each place adjacent to the first longitudinal cord 431 and the second longitudinal cord 432, respectively, while there are limiting members 8 disposed on the first longitudinal cord 431 and the second longitudinal cord 432 corresponding to the through holes of each slat.

With the arrangements mentioned above, the slats 5 are each limited by the slat-through portion 82 of the corresponding limiting member 8. If the slat-through portion 82 of one of the limiting members 8 is drawn out from the through hole 51 of the corresponding slat 5, the main portion 81 corresponding to the limiting loop 82' formed by the aforesaid slat-through portion 82 will be brought into the aforesaid through hole 51. On this circumstance, the through hole 51 of each slat 5 remains threaded through by one of the main portion 81 and the slat-through portion 82 of the corresponding to limiting member 8. Furthermore, since the limiting members 8 are linked to one another, the slats 5 are prevented from being drawn out from the ladder tape 430. In addition, large transverse movements of the slats 5 are prevented because each slat-through portion 82 has small circumference and would not easily deform and deflect in the horizontal direction.

In the present embodiment, the top ends of the two ladder tapes 430 are connected to the first drum 32 and the second drum 33, respectively. Since the diameters of the first drum 32 and the second drum 33 as well as the positions of the bottom of the upper rail 1 through which the first longitudinal cord 431 and the second longitudinal cord 432 go out from the upper rail 1 are not consistent with the length of the shorter edges of the slats 5, the first longitudinal cord 431 and the second longitudinal cord 432 of each ladder tape 430 incline inwardly while extending to one of the first drum 32 and the second drum 33 after passing the top slat 5*d*. As so, compared to the other slats 5, the top slat 5*d* bears larger force derived from the first longitudinal cord 431 and the second longitudinal cord 432 of each ladder tape 430. The notches 51*d* can blunt the inward inclination angles of the first longitudinal cord 431 and the second longitudinal cord 432, thereby reducing impact of the force acting on the top slat 5*d*. At the same time, the first longitudinal cord 431 and the second longitudinal cord 432 inserted into the notches 51*d* can limit the horizontal movement of the top slat 5*d*. Moreover, the adjusting units 4331*c* and 4332*c* of the top bearer 433*c* can make the top slat 5*d* tilt concurrently along with inclination of the other bearers 433. Therefore, the top slat 5 would not flip to an inclination angle different from the other slats 5 due to lack of limitation from the limiting member 8.

Please refer to FIG. 29 and FIGS. 34 to 36. The translucent degree of the curtain body 50 of the window blind 130 is adjustable within a range defined by the first state and the second state with different amount of light passing through the curtain body 50, by controlling the deflecting mechanism 3 via the operating rod 341. The related operating way and action principle are identical to that of the window 100 of the first embodiment and will not be redundantly described below. What is worthy to be mentioned is that, referring to FIGS. 35 and 36, the top slat 5*d* is sandwiched between the adjusting units 4331*c* and 4332*c* while the window blind 130 is in the closed state. The first limiting member 8*a* threading through the first through hole 51*a* hangs the first slat 5*a*. The first main portion 81*a* bends down in the gap between the top slat 5*d* and the second longitudinal cord 432, then penetrating the first limiting loop 82*a*' formed by the first slat-through portion 82 after threading through the first through hole 51*a* of the first slat 5*a*, and finally forming a first linking loop 81*a*' located between the bottom surface of the first slat 5*a* and the second longitudinal cord 432, and so on. Since each slat-through portion 82 has small circumferences, each slat-through portion 82 hangs the corresponding slat 5 to make it almost in a vertical state, and therefore positions each slat 5 to prevent it from sliding down or moving horizontally. Thus, the overlapping areas of each two neighboring slats 5 are substantially the same and two lateral sides thereof are aligned. Besides, the main portions 81 of the limiting members 8 are hidden behind the back sides of the slats 5 and are roughly straitened, thereby not involving or touching other components to affect the closed state of the slats 5.

Please refer to FIGS. 37 to 42, which illustrate a window blind 140 according to a fifth embodiment of the present disclosure as the window blind 140 is in the first state. The window blind 140 comprises an upper rail 1, a lower rail 2, a deflecting mechanism 3, two ladder tapes 440, a curtain body 50 composed of plural slats 5, a lifting mechanism 70*b* and two sets of the pulling cords corresponding to the two ladder tapes 440. Each of the ladder tapes 440 comprises a first longitudinal cord 441, the second longitudinal cord 442, plural bearers 443 and plural limiting members 80. The structure of the limiting members 80 is identical to the limiting members 8 in the fourth embodiment and will not be redundantly described below. The difference of the window blind 140 from the fourth embodiment is that the window blind 140 comprises the lifting mechanism 70*b* and the two sets of the pulling cords. Each set of the pulling cords is disposed adjacent to each of the ladder tapes 440 correspondingly, comprising a first pulling cord 143 and a second pulling cord 143*a* respectively located on the front and rear sides of the window blind 140. The function of the sets of the pulling cords is to upwardly retract or downwardly extend the slats 5.

Figure 37:
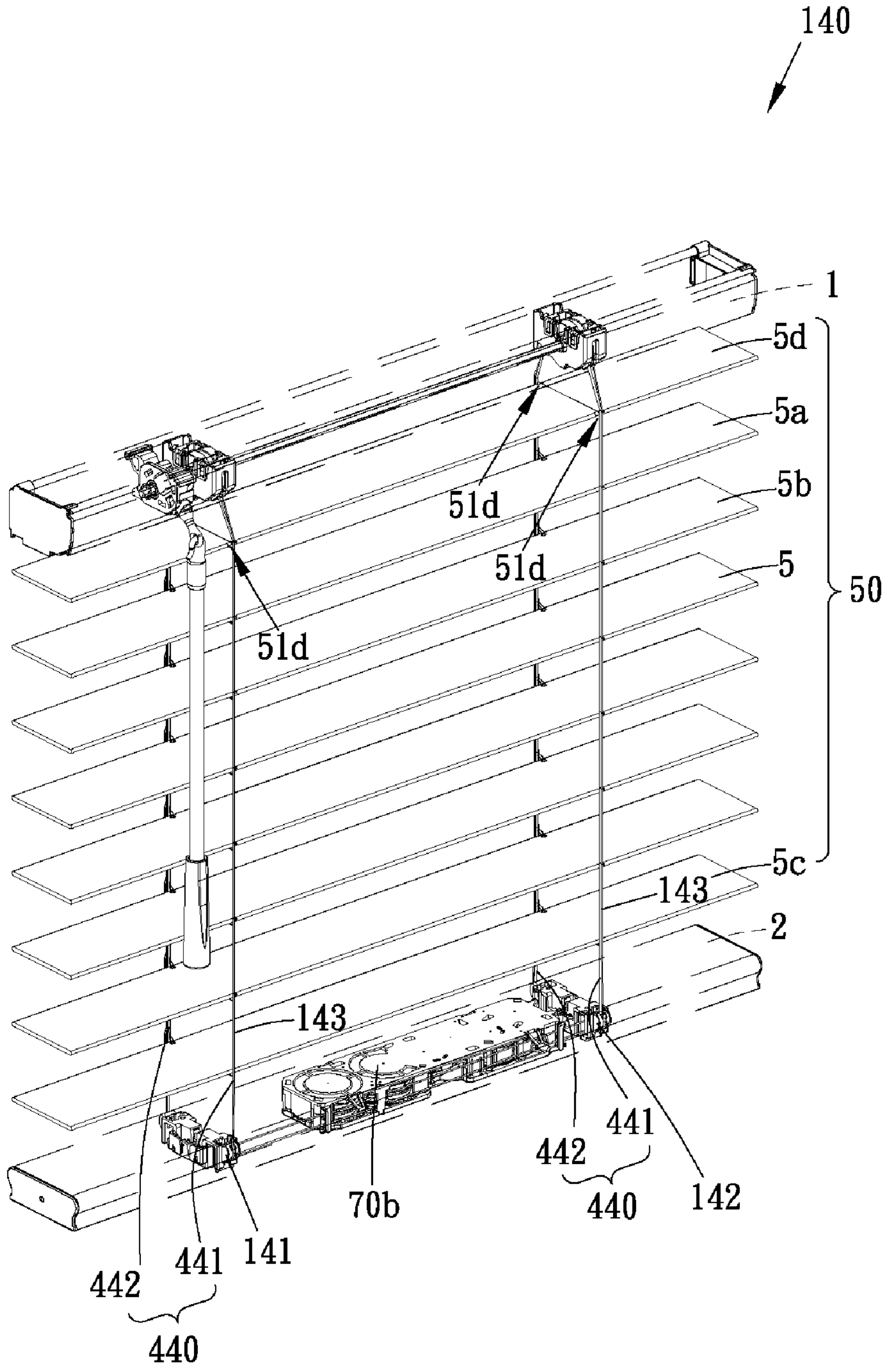
FIG. 37 is a perspective view of the window blind according to a fifth embodiment of the present disclosure, wherein the window blind is fully extended and the curtain body thereof is in the transparency state.
Figure 38:
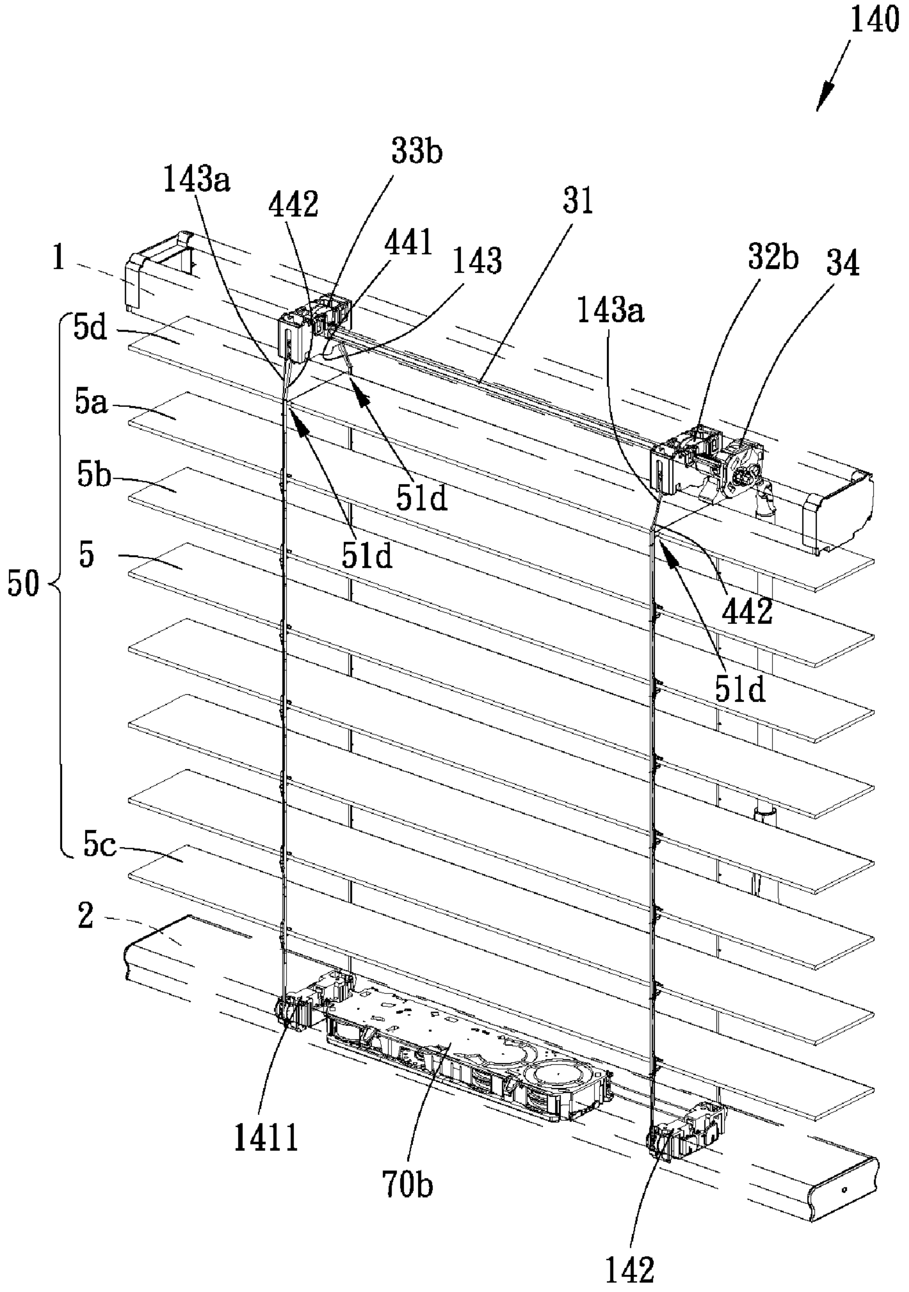
FIG. 38 is another perspective view of the window blind in FIG. 37.
Figure 39:
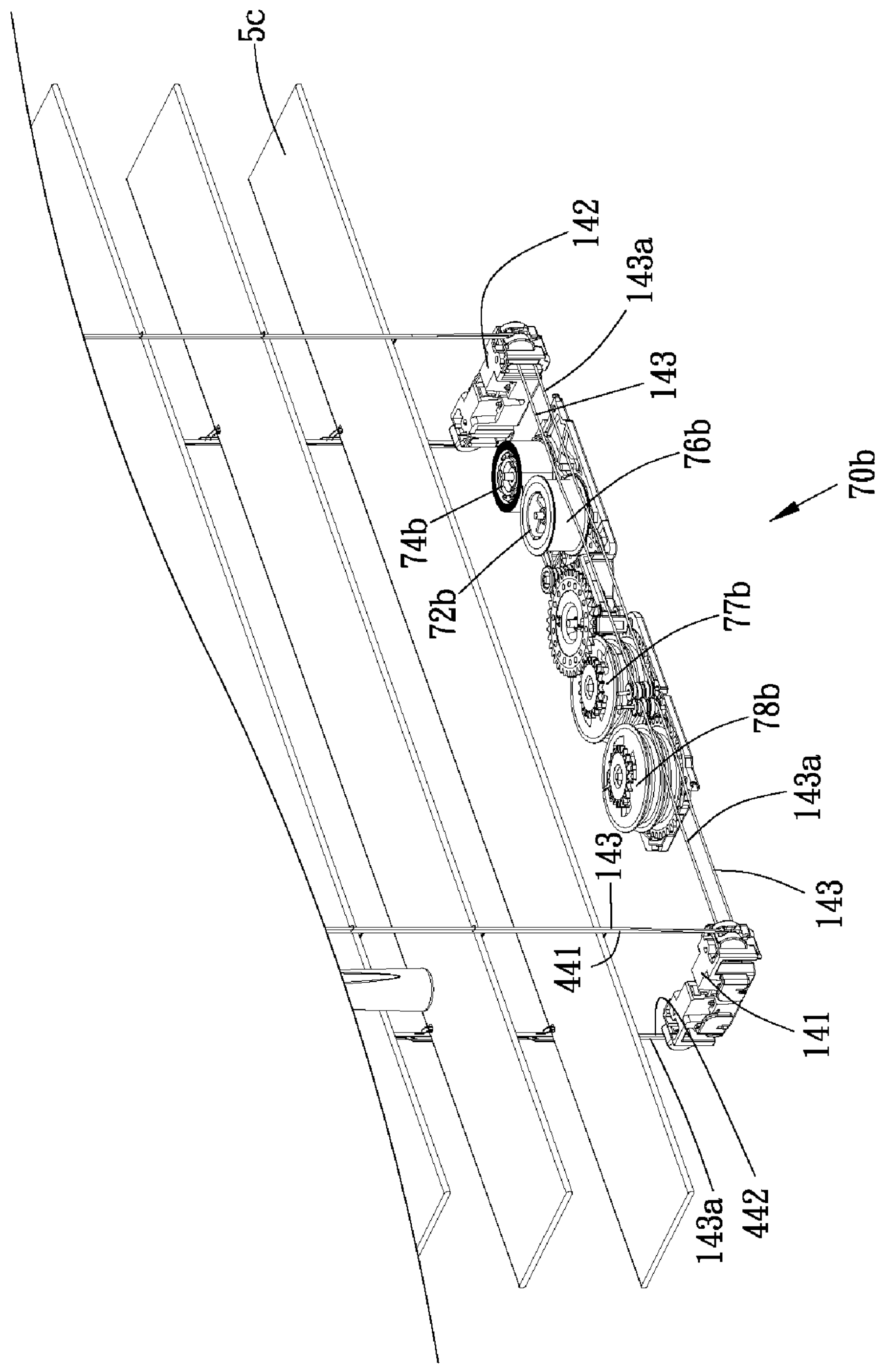
FIG. 39 is a partial enlarged view of the window blind in FIG. 37.
Figure 40:
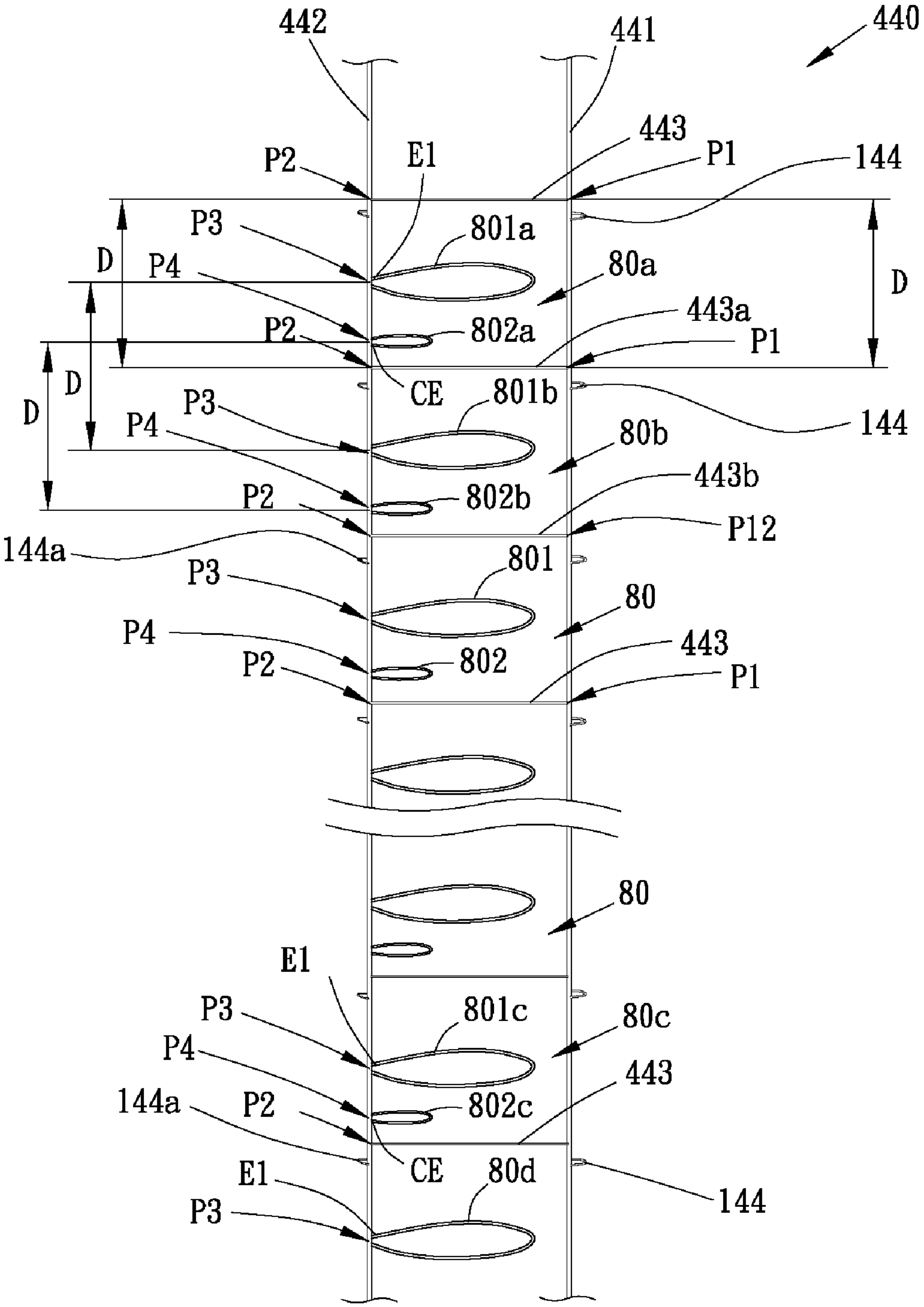
FIG. 40 is a schematic diagram illustrating an original structure of the ladder tape of the window blind in FIG. 37, as the ladder tape is not assembled with the slats yet.
Figure 41:
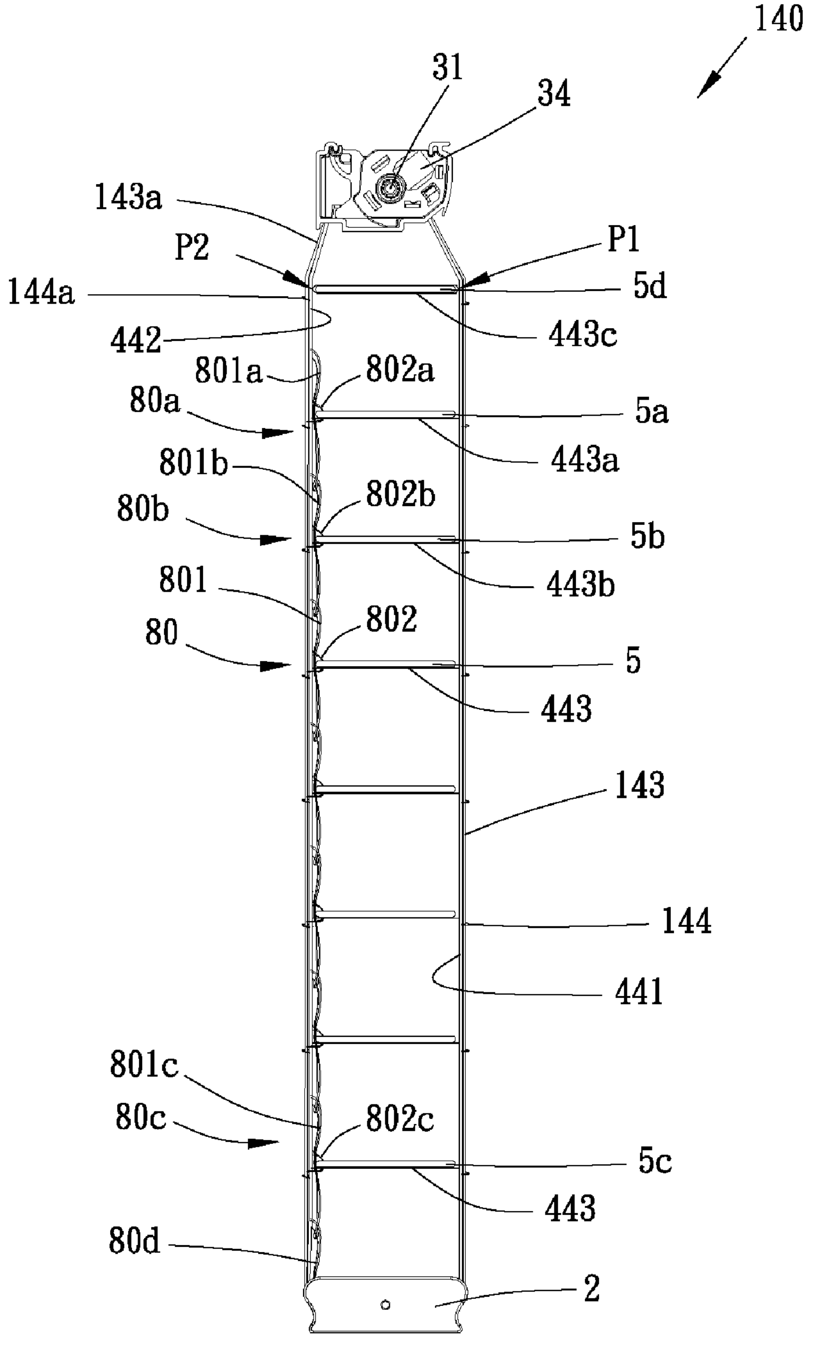
FIG. 41 is a left side view of the window blind in FIG. 37 omitting the operating rod.
Figure 42:
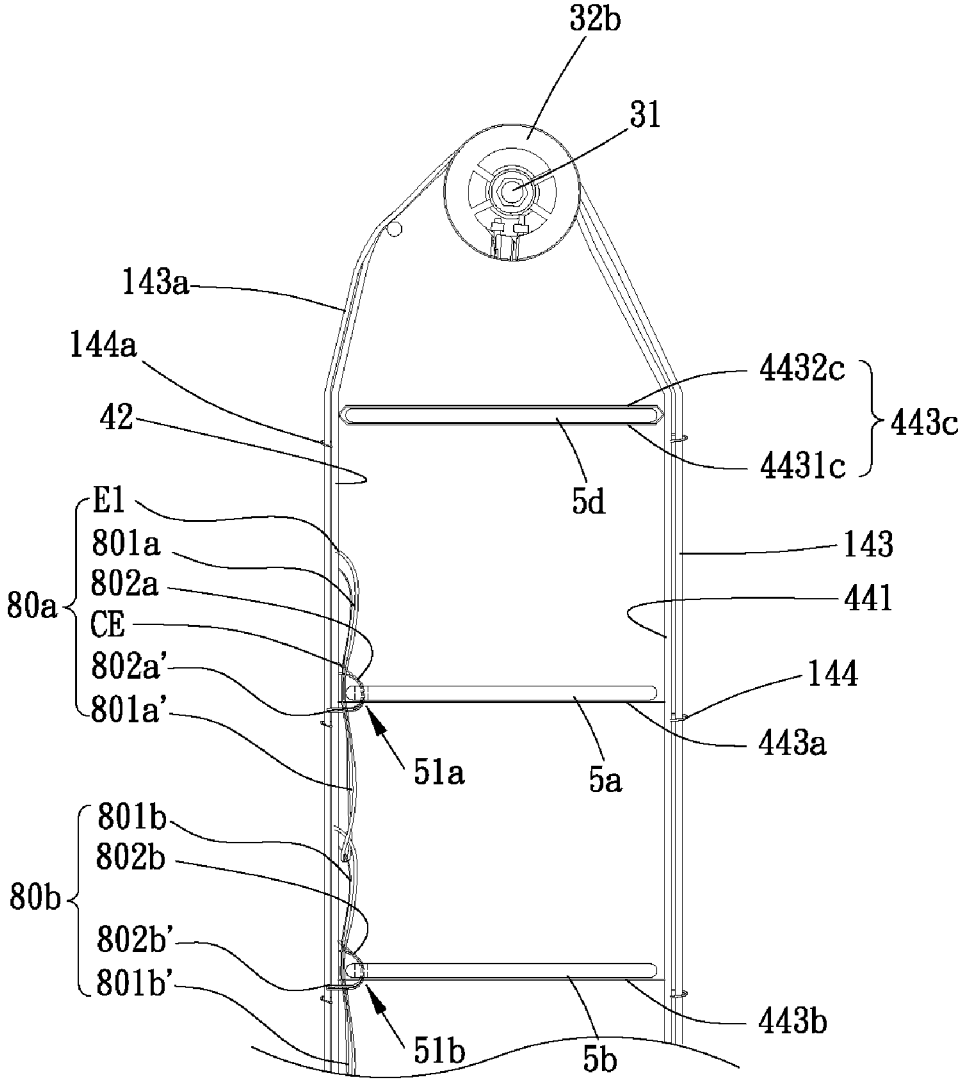
FIG. 42 is a partial enlarged view of the window blind in FIG. 41 omitting the upper rail and the deflecting module.

Referring to FIGS. 37 to 39, the lifting mechanism 70*b* comprises a driving wheel 72*b*, a spring storage wheel 74*b*, a spring 76*b*, and two reeling wheels 77*b* and 78*b*. The configuration and the action principle of the lifting mechanism 70*b* is the same as the lifting mechanism 70*a* in the third embodiment and will not be redundantly described below. For the first pulling cord 143 and the second pulling cord 143*a* of the set of pulling cords on the left side of FIG. 37, their bottom ends are wound on and connected to the reeling wheel 77*b*. For the first pulling cord 143 and the second pulling cord 143*a* of the set of pulling cords on the right side of FIG. 37, their bottom ends are wound on and connected to the reeling wheel 78*b*. When the reeling wheels 77*b* and 78*b* rotate concurrently, the first pulling cords 143 and the second pulling cords 143*a* of the two sets of pulling cords are respectively retracted by the reeling wheel 77*b* and 78*b* or respectively released by the reeling wheel 77*b* and 78*b*.

Figure 43:
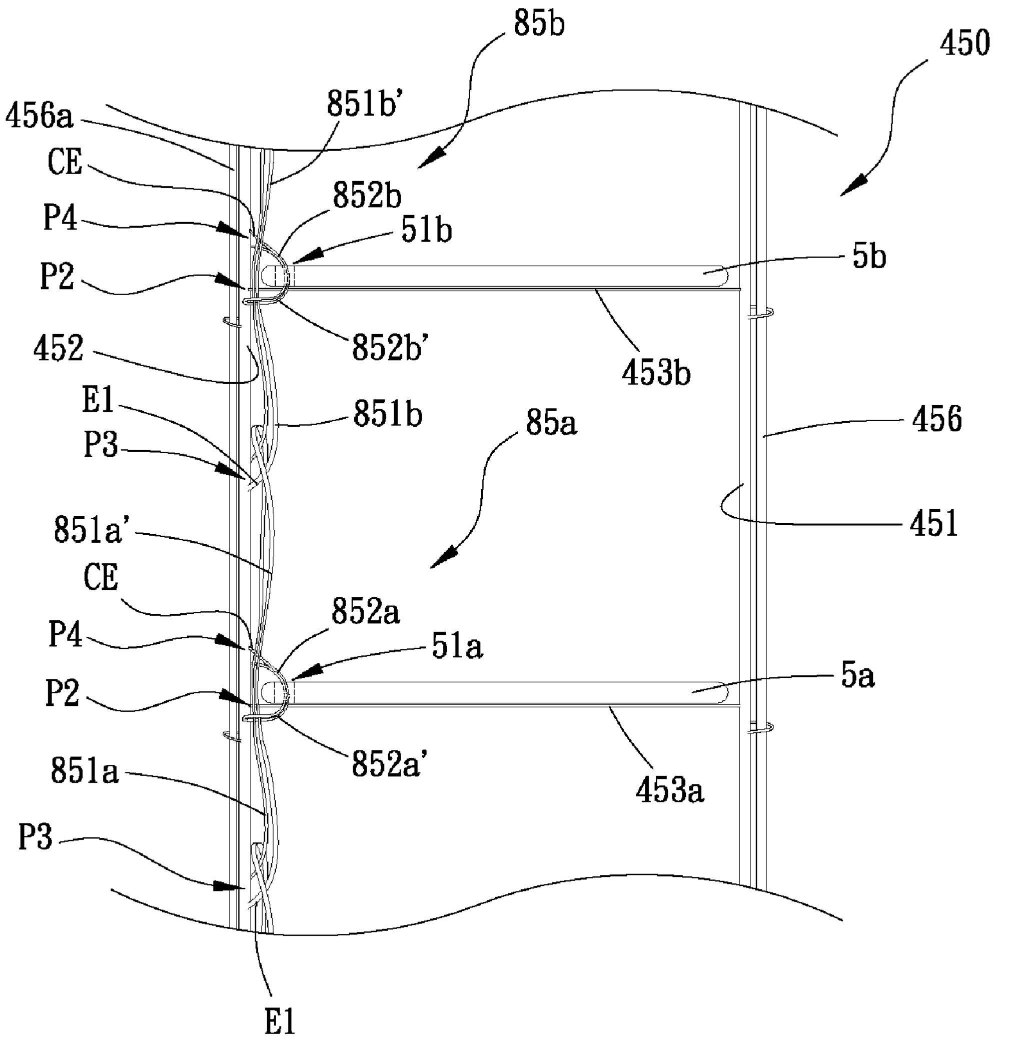
FIG. 43 is a partial left side view of another exemplified ladder tape of the present disclosure applied to the window blind in FIG. 37, wherein an original structure thereof is identical to the ladder tape in FIG. 40 but the limiting members thereof are linked in other way.
Figure 44:
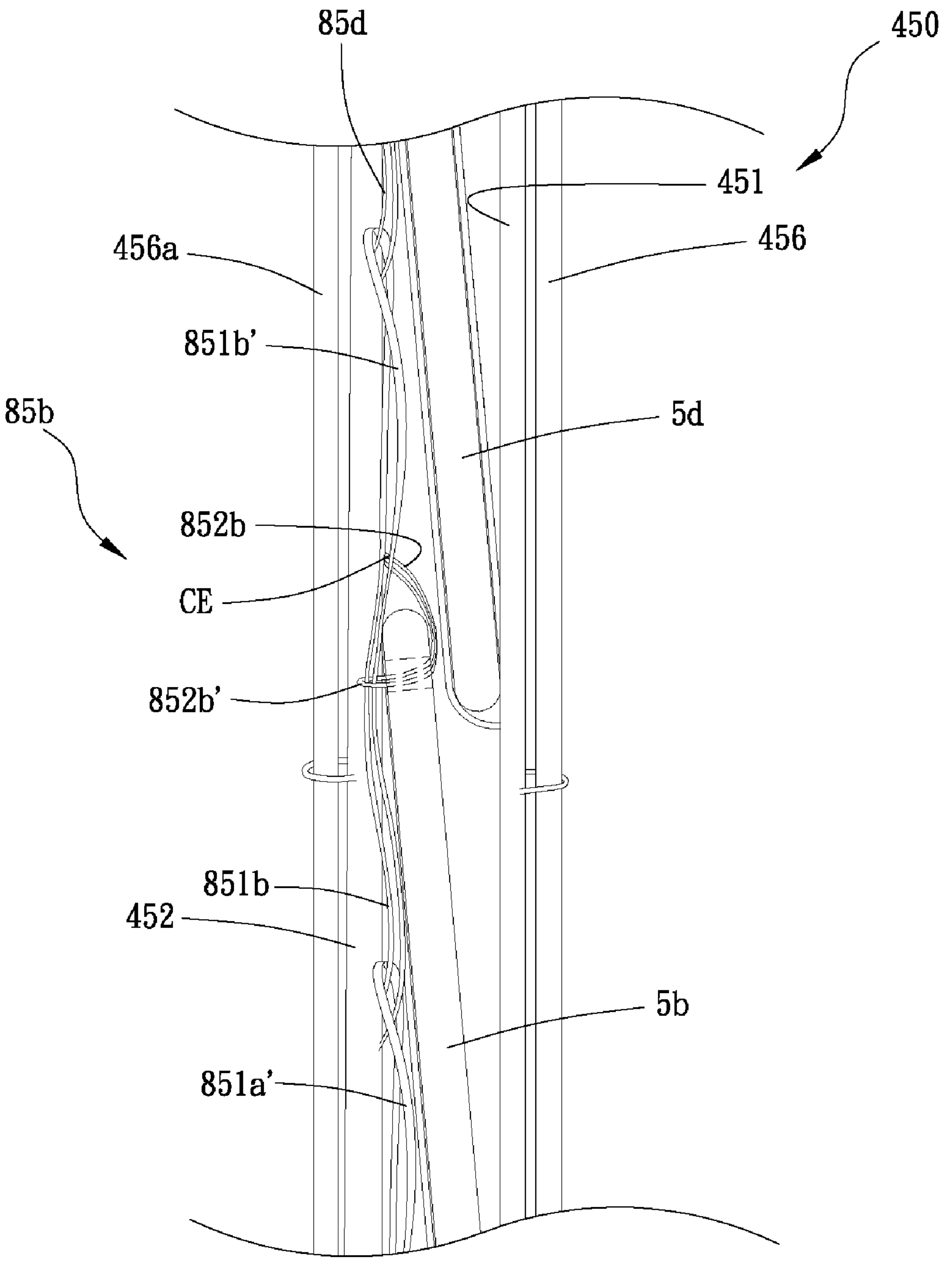
FIG. 44 is a partial left side view of the window blind in FIG. 43, wherein the window blind is in the state in which the slats thereof are closed.

Referring to FIGS. 43 and 44, which illustrates another exemplified ladder tape of the fifth embodiment. The ladder tape 450 has the same original structure as the ladder tape 440 shown in FIG. 40. However, the main portions 81 of the limiting members 80 of the ladder tape 440 are linked to one another from top to bottom, whereas the main portions 81 of the limiting members of the ladder tape 450 are linked to one another from bottom to top. In other words, although the original structures of the ladder tapes 440 and 450 are the same, the main portions of their limiting members are linked in opposite sequence, such that different limiting members are defined as the first limiting member, the second limiting member, the last member and the fixed member. For example, regarding the ladder tape 440 shown in FIGS. 40 to 42, the last limiting member 80*c* and the fixed limiting member 80*d* thereof disposed on the second closest one and the closest one of the third positions P3 to the lower rail 2 on the second longitudinal cord 442, respectively. In comparison, the last limiting member and the fixed limiting member of the ladder tape 450 of the ladder tape 450 are disposed on the second closest one and the closest one of the third positions P3 to the upper rail 1 on the second longitudinal cord 442, respectively.

The ladder tape 450 comprises a first longitudinal cord 451, a second longitudinal cord 452, plural bearers 453 and the plural limiting members, while the limiting members comprise a first limiting member 85*a* and a second limiting member 85*b* which is arranged above the first limiting member 85*a*. The first limiting member 85*a* comprises a first main portion 851*a* and a first slat-through portion 852*a*. One end of the first main portion 851*a*, which is also the first end E1 of the first limiting member 85*a*, is disposed on the corresponding third position P3 on the second longitudinal cord 452. A connecting end CE of the first slat-through portion 852*a* is disposed on the corresponding fourth position P4 on the second longitudinal cord 452. The first slat-through portion 852*a* forms a first limiting loop 852*a*' after passing through the first through hole 51*a* of the first slat 5*a* from top to bottom. The first main portion 851*a* forms a first linking loop 851*a*' after passing through the first limiting loop 852*a*'. The second limiting member 85*b* comprises a second main portion 851*b* and a second slat-through portion 852*b*. One end of the first main portion 851*a*, which is also the first end E1 of the first limiting member 85*a*, is disposed on the corresponding third position P3 on the second longitudinal cord 452. A connecting end CE of the first slat-through portion 852*a* is disposed on the corresponding fourth position P4 on the second longitudinal cord 452. The first slat-through portion 852*a* forms a first limiting loop 852*a*' after passing through the first through hole 51*a* of the first slat 5*a* from top to bottom. The first main portion 851*a* forms a first linking loop 851*a*' after passing through the first limiting loop 852*a*'.

Please keep referring to FIGS. 43 and 44. For the present exemplified ladder tape 450, the first slat 5*a* is closer to the lower rail 2 than the second slat 5*b*. On the second longitudinal cord 452, the fourth position P4 where the first slat-through portion 852*a* disposed is closer to the upper rail 1 than the second position P2 where the first bearer 453*a* disposed; the third position P3 where the first main portion 851*a* of the first limiting member 85*a*, is closer to the lower rail 2 than the fourth position P4 where the first slat-through portion 852*a*; the fourth position P4 where the second slat-through portion 852*b* is closer to the upper rail 1 than the second position P2 where the second bearer 453*b* disposed; the third position P3 is closer to the lower rail 2 than the forth position P4 where the second slat-through portion 852*b*.

Figure 45:
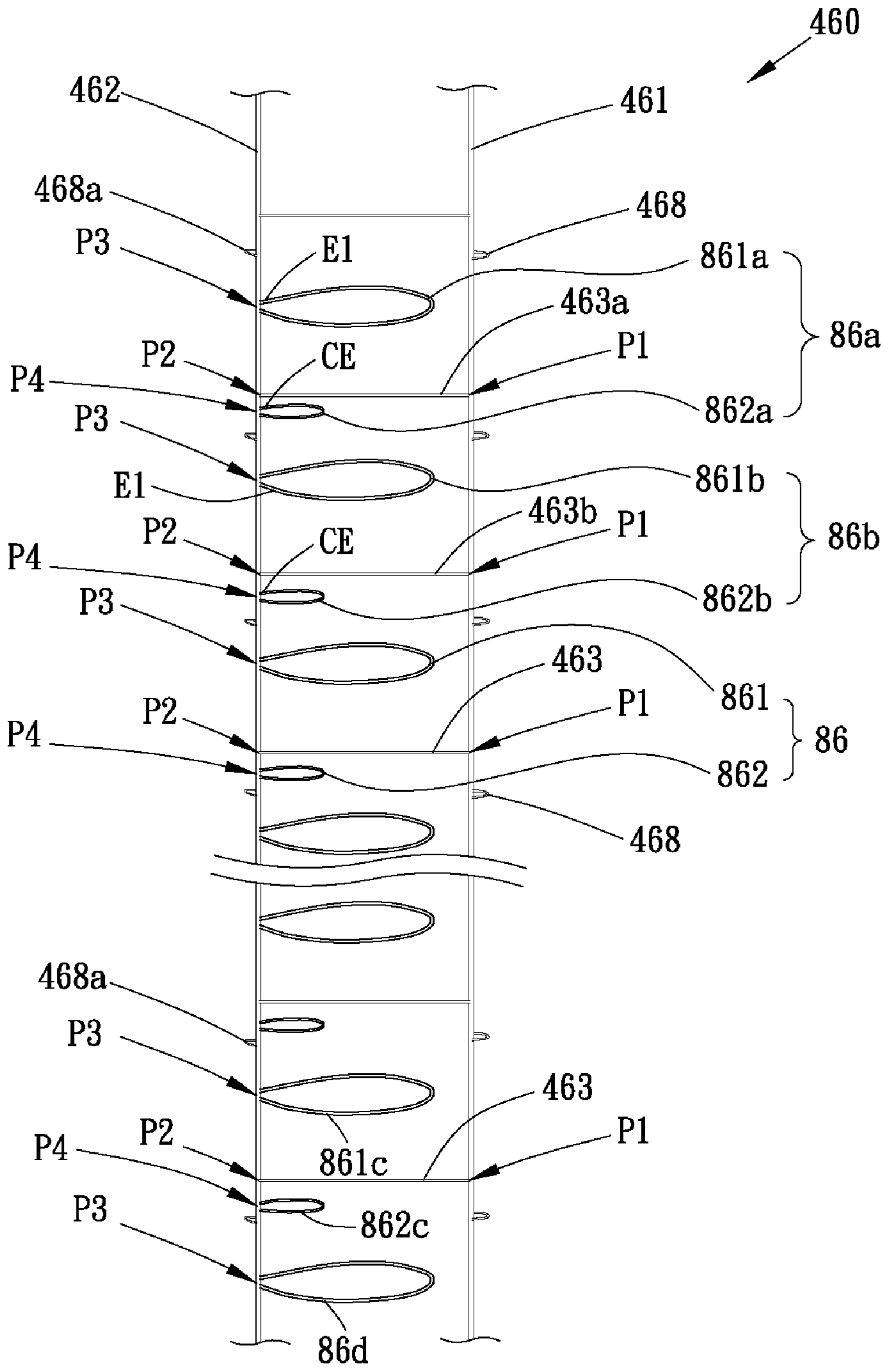
FIG. 45 is a schematic diagram illustrating an original structure of still another exemplified ladder tape of the present disclosure, as the still another exemplified ladder tape is not assembled with the slats yet.
Figure 47:
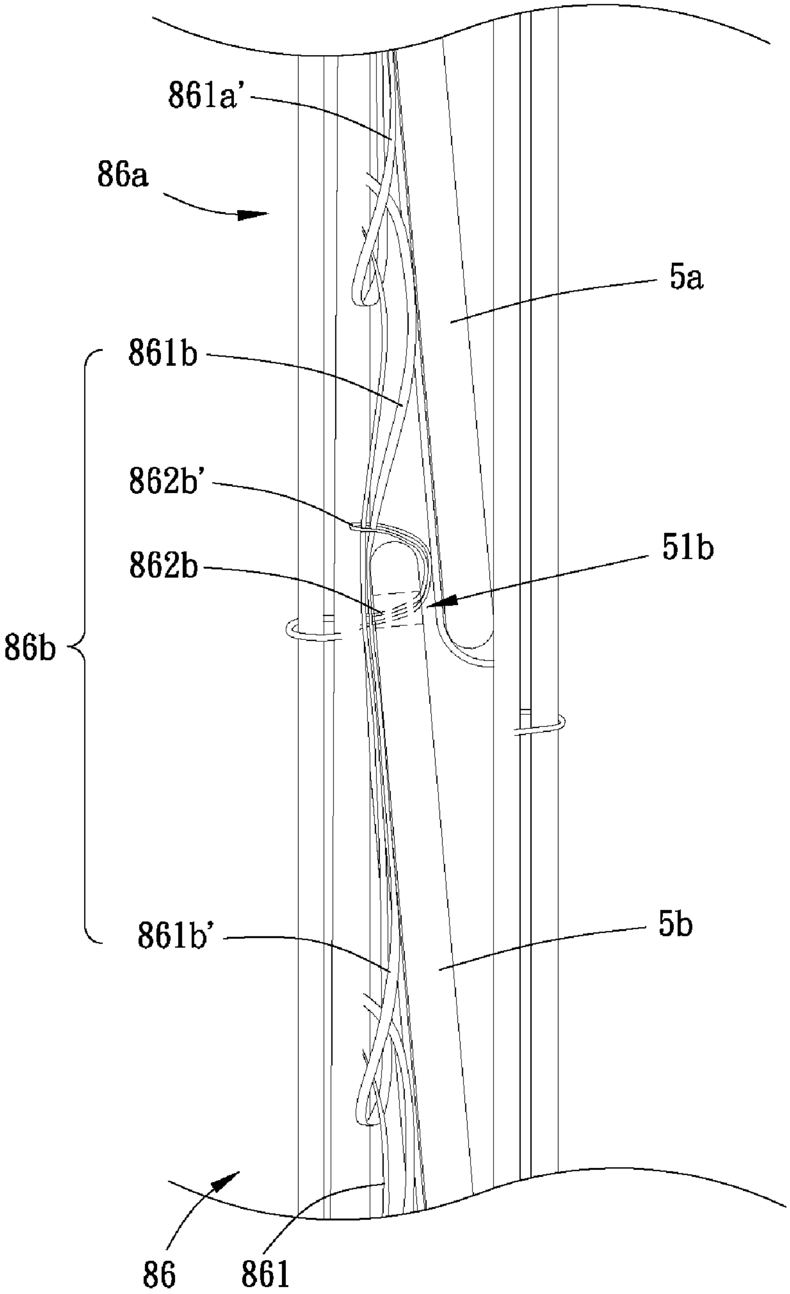
FIG. 47 schematically illustrates the ladder tape in FIG. 46 assembled with the slats while the slats are closed.

Referring to FIGS. 45 and 47, which illustrate still another exemplified ladder tape according to the fifth embodiment. The ladder tape 460 comprises a first longitudinal cord 461, the second longitudinal cord 462, plural bearers 463 and plural limiting members 86. The limiting members 86 comprise a first limiting member 86*a* and a second limiting member 86*b* adjacent thereto. The first limiting member 86*a* comprises a first main portion 861*a* and a first slat-through portion 862*a*. One end of the first main portion 861*a*, which is also a first end E1 of the first limiting member 86*a*, is disposed on the corresponding one of the third positions P3 on the second longitudinal cord 462. A connecting end CE of the first slat-through portion 862*a* is disposed on the corresponding one of the forth positions P4 on the second longitudinal cord 462. The first slat-through portion 862*a* forms a first limiting loop 862*a*' after passing through the first through hole 51*a* of the first slat 5*a* from bottom to top, The first main portion 861*a* forms a first linking loop 861*a*' after passing through the first limiting loop 862*a*' from bottom to top. The second limiting member 86*b* comprises a second main portion 861*b* and a second slat-through portion 862*b*. One end of the second main portion 861*b*, which is also a first end E1 of the second limiting member 86*b*, is disposed on the corresponding one of the third positions P3 on the second longitudinal cord 462. A connecting end CE of the second slat-through portion 862*b* is disposed on the corresponding one of the forth positions P4 on the second longitudinal cord 462. The second slat-through portion 862*b* forms a second limiting loop 862*b*' after passing through the second through hole 51*b* of the second slat 5*b* from bottom to top. The second main portion 861*b* forms a second linking loop **861*b*' after passing through the second limiting loop 862*b*' from bottom to top, and the second linking loop 861*b*' is provided for the main portion 861 of the next limiting member 86** to penetrate into, and so on.

Figure 46:
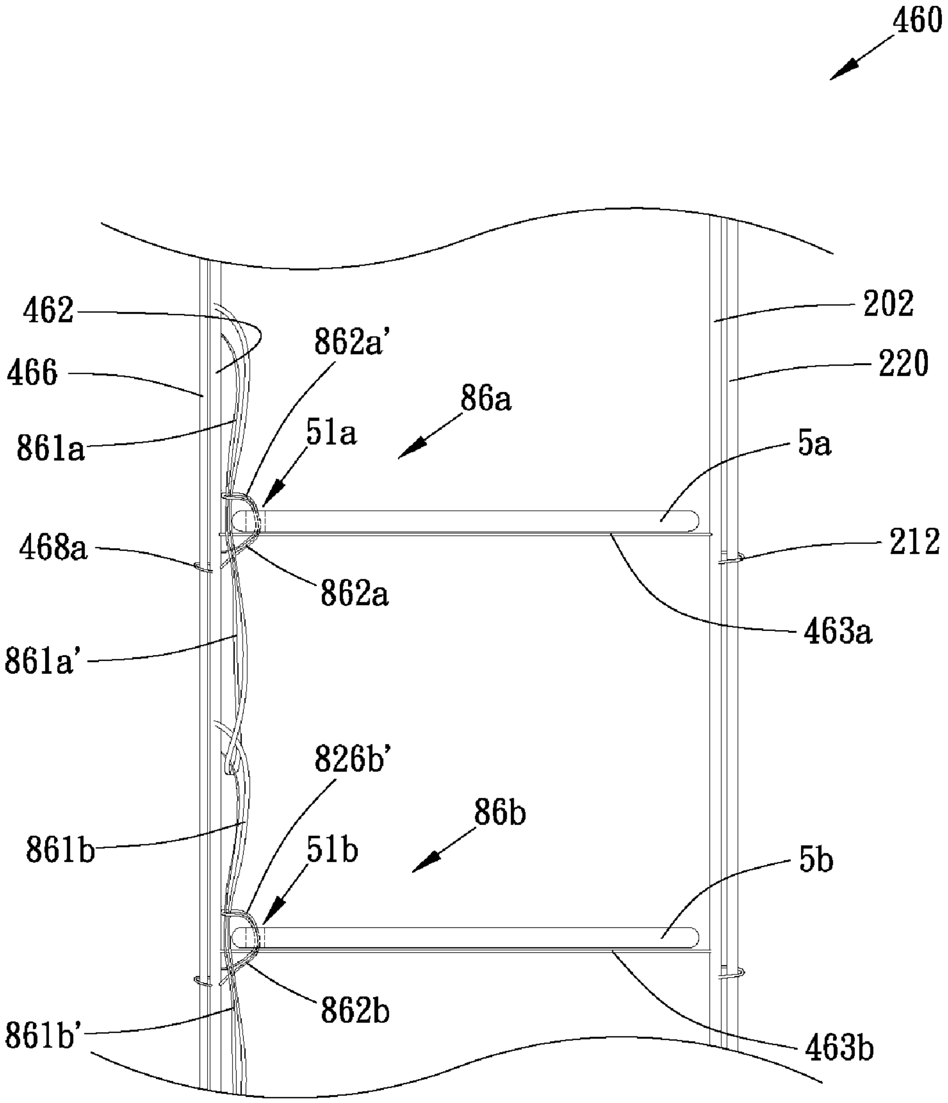
FIG. 46 schematically illustrates the ladder tape in FIG. 45 assembled with the slats.

Please keep referring to FIGS. 45 to 47. For the present exemplified ladder tape 460, the first slat **5*a* is closer to the upper rail 1 than the second slat 5*b*. On the second longitudinal cord 462. On the second longitudinal cord 462, the third position P3 where the main portion 861*a* of the first limiting member 86*a* disposed is closer to the upper rail 1 than the second position P2 where the first bearer 463*a* disposed; the second position P2 where the first bearer 463*a* disposed is closer to the upper rail 1 than the fourth position P4 where the first slat-through portion 862*a* disposed; the third position P3 where the second main portion 861*b* of the second limiting member 86*b* disposed is closer to the upper rail 1 than the second position P2 where the second bearer 463*b* disposed; the second position P2 where the second bearer 463*b* disposed is closer to the upper rail 1 than the fourth position P4 where the second slat-through portion 862*b*** disposed.

Figure 48:
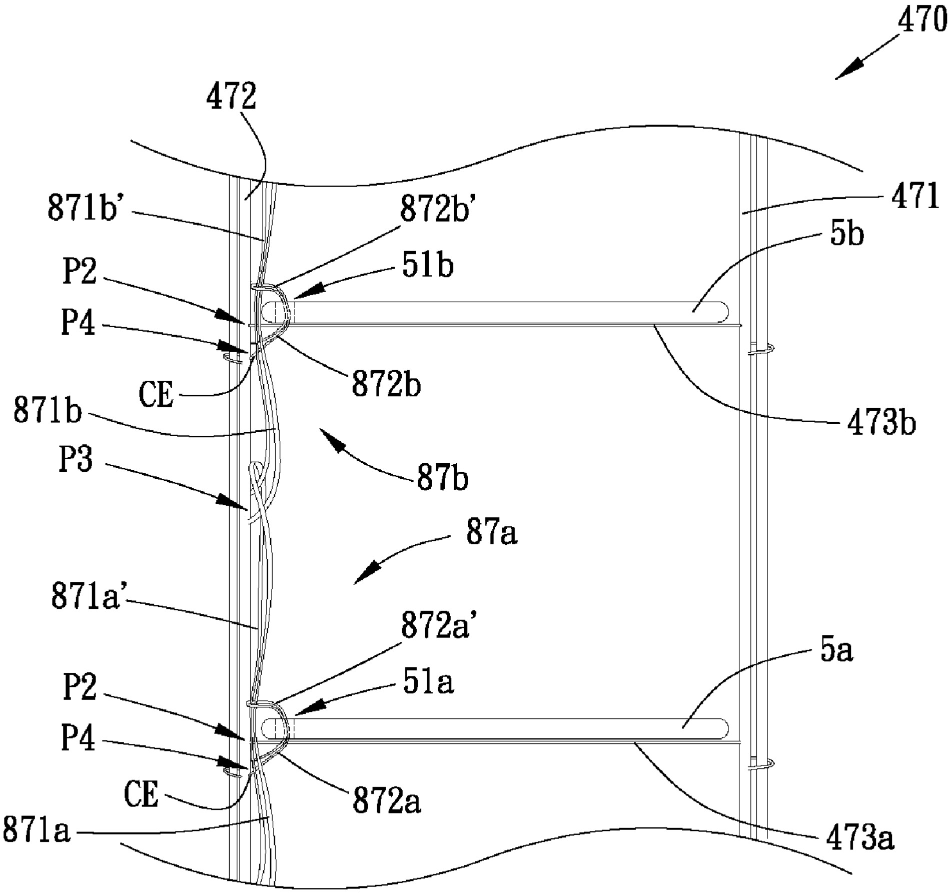
FIG. 48 is a partial left side view of yet another exemplified ladder tape of the present disclosure applied to the window blind in FIG. 37, wherein an original structure thereof is identical to the ladder tape in FIG. 45 but the limiting members thereof are linked in other way.
Figure 49:
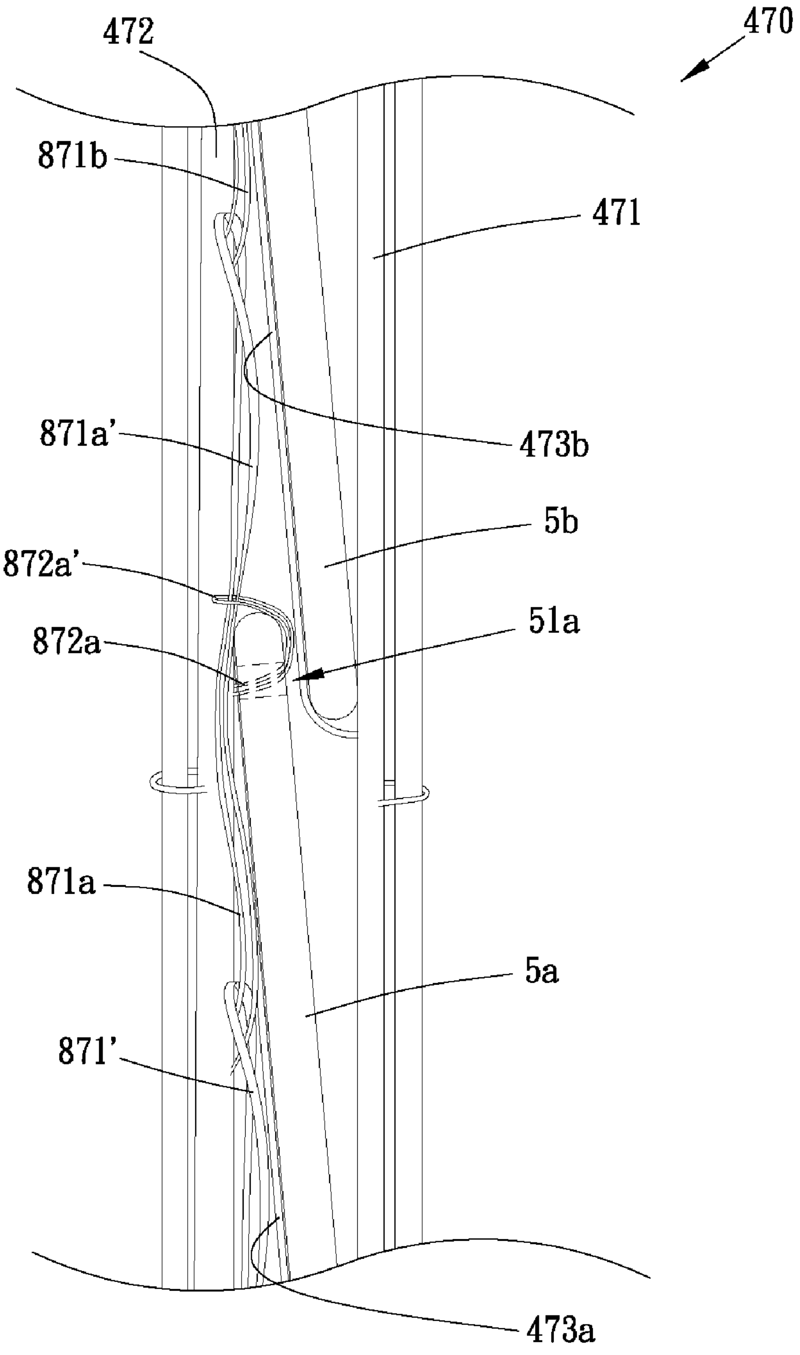
FIG. 49 schematically illustrates the ladder tape in FIG. 48 assembled with the slats while the slats are closed.

Referring to FIGS. 48 and 49, which illustrate yet another exemplified ladder tape according to the fifth embodiment. The ladder tape 470 has the same original structure as the ladder tape 460 shown in FIG. 45. However, the main portions of the limiting members of the ladder tape 460 are linked to one another from top to bottom, whereas the main portions of the limiting members of the ladder tape 470 are linked to one another from bottom to top. In other words, although the original structures of the ladder tapes 460 and 470 are the same, the main portions of their limiting members are linked in opposite sequences, such that different limiting members are defined as the first limiting member, the second limiting member, the last member and the fixed member.

The ladder tape 470 comprises a first longitudinal cord 471, the second longitudinal cord 472, plural bearers 473, and plural limiting members, wherein the plural limiting members comprise a first limiting member **87*a* and a second limiting member 87*b* neighboring thereto. The first limiting member 87*a* is arranged below the second limiting member 87*b*. The first limiting member 87*a* comprises a first main portion 871*a* and a first slat-through portion 872*a*. One end of the first main portion 871*a* is disposed on the corresponding third position P3 (not shown in FIG. 48) on the second longitudinal cord 472. A connecting end CE of the first slat-through portion 872*a* is disposed on the corresponding forth position P4 on the second longitudinal cord 472. The first slat-through portion 872*a* forms a first limiting loop 872*a*' after passing through the first through hole 51*a* of the first slat 5*a* from bottom to top. The first main portion 871*a* forms a first linking loop 871*a*' after passing through the first limiting loop 872*a*' from bottom to top. The second limiting member 87*b* comprises a second main portion 871*b* and a second slat-through portion 872*b*. One end of the second main portion 871*b* is disposed on the corresponding third position P3 on the second longitudinal cord 472. A connecting end CE of the second slat-through portion 872*b* is disposed on the corresponding forth position P4 on the second longitudinal cord 472. The second slat-through portion 872*b* forms a second limiting loop 872*b*' after passing through the second through hole 51*b* of the second slat 5*b* from bottom to top. The second main portion 871*b* forms a second linking loop 871*b*' after passing through the second limiting loop 872*b*' from bottom to top, and the second linking loop 871*b*' is provided for the main portion 871 of the next limiting member 87 to penetrate into, and so on. Each of the limiting members of the ladder tape 470 goes around the next limiting member as the limiting members of the ladder tape 470 are arranged from bottom to top. As shown in FIG. 49, the main portion 871*a* passes through the linking loop 871' of the previous limiting member firstly, then penetrating the first limiting loop 872*a*' formed by the first slat-through portion 872*a***.

Please keep referring to FIGS. 48 and 49. For the present exemplified ladder tape 470, the first slat **5*a* is closer to the lower rail 2 than the second slat 5*b*. On the second longitudinal cord 472, the fourth position P4 where the first slat-through portion 872*a* disposed is closer to the lower rail 2 than the second position P2 where the first bearer 473*a* disposed, the third position P3 (not shown in FIG. 48) where the first main portion 871*a* of the first limiting member 87*a* disposed is closer to the lower rail 2 than the fourth position P4 where the first slat-through portion 872*a* disposed, the fourth position P4 where the second slat-through portion 872*b* disposed is closer to the lower rail 2 than the second position P2 where the second bearer 473*b* disposed, the third position P3 where the second main portion 871*b* of the second limiting member 87*b* disposed is closer to the lower rail 2 than the fourth position P4 where the second slat-through portion 872*b*** disposed.

For the above-mentioned exemplified ladder tapes, the main portion and the slat-through portion of each limiting member both extend towards the first longitudinal cord from the second longitudinal cord. More specifically, for each limiting member, the main portion and the slat-through portion each have one fixed end disposed on the second longitudinal cord and one free end located between the first longitudinal cord and the second longitudinal cord. In some other embodiments, for each limiting member, the free ends of the main portion and the slat-through portion extend in two different directions.

Figure 50:
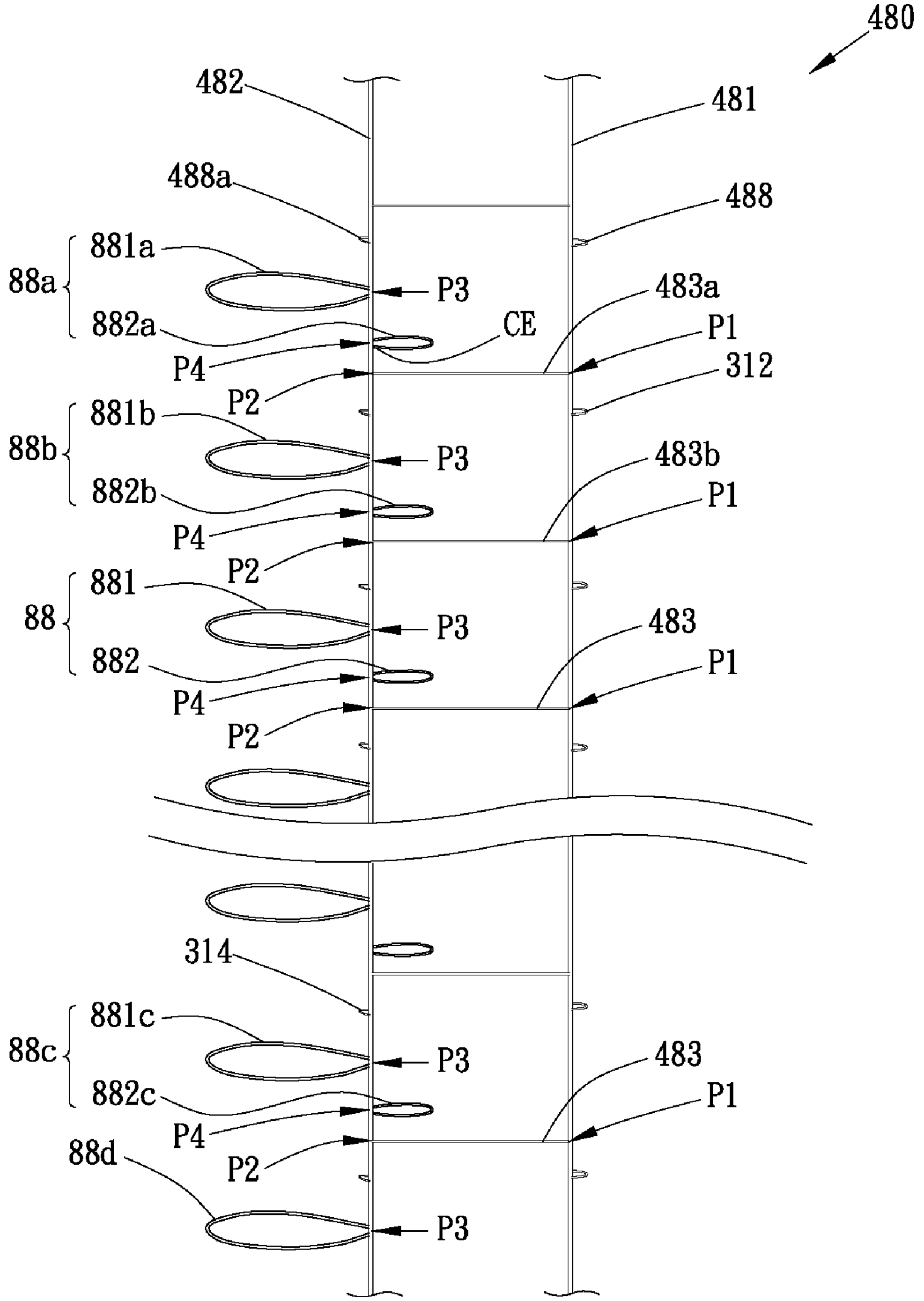
FIG. 50 is a schematic diagram illustrating an original structure of further another exemplified ladder tape of the present disclosure, as the further another exemplified ladder tape is not assembled with the slats yet.
Figure 52:
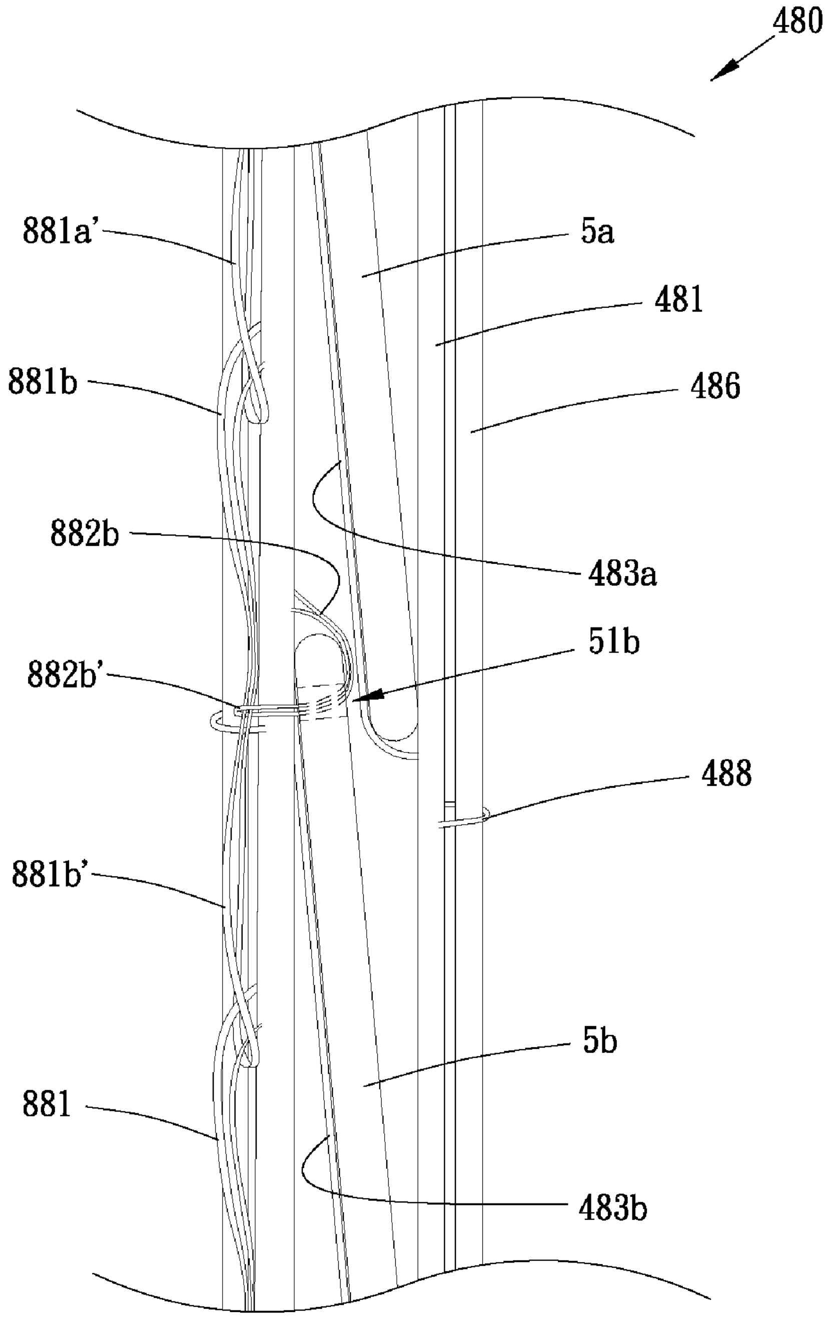
FIG. 52 schematically illustrates the ladder tape in FIG. 51 assembled with the slats while the slats are closed.

Referring to FIGS. 50 and 52, which illustrate further another exemplified ladder tape according to the fifth embodiment. The ladder tape 480 comprises a first longitudinal cord 481, a second longitudinal cord 482, plural bearers 483 and plural limiting members 88. The limiting members 88 are vertically arranged on the second longitudinal cord 482, and comprise a first limiting member **88*a* and a second limiting member 88*b* neighboring to the first limiting member 88*a*. The first limiting member 88*a* is arranged above the second limiting member 88*b*. The first limiting member 88*a* comprises a first main portion 881*a* and a first slat-through portion 882*a*. One end of the first main portion 881*a*, which is also a first end E1 of the first limiting member 88*a*, is disposed on the corresponding third position P3 on the second longitudinal cord 482. A connecting end CE of the first slat-through portion 882*a* is disposed on the corresponding forth position P4 on the second longitudinal cord 482. The first main portion 881*a* and the first slat-through portion 882*a* are disposed at two different sides of the second longitudinal cord 482, and respectively extend in different directions to be away from the second longitudinal cord 482. The first slat-through portion 882*a* forms a first limiting loop 882*a*' after passing through the first through hole 51*a* of the first slat 5*a* from bottom to top. The first main portion 881*a* forms a first linking loop 881*a*' after passing through the first limiting loop 882*a*' from top to bottom. The second limiting member 88*b* comprises a second main portion 881*b* and a second slat-through portion 882*b*. One end of the second main portion 881*b*, which is also a first end E1 of the second limiting member 88*b*, is disposed on the corresponding third position P3 on the second longitudinal cord 482. A connecting end CE of the second slat-through portion 882***b* is disposed on the corresponding forth position P4 on the second longitudinal cord 482. The second main portion 881*b* and the second slat-through portion 882*b* are disposed at two different sides of the second longitudinal cord 482, and respectively extend in different directions to be away from the second longitudinal cord 482. The second slat-through portion 882*b* forms a second limiting loop 882*b*' after passing through the second through hole 51*b* of the second slat 5*b* from top to bottom. The second main portion 881*b* forms a second linking loop 881*b*' after passing through the second limiting loop 882*b*' from top to bottom, and the second linking loop 881*b*' is provided for the main portion 881 of the next limiting member 88 to penetrate into, and so on.

Figure 51:
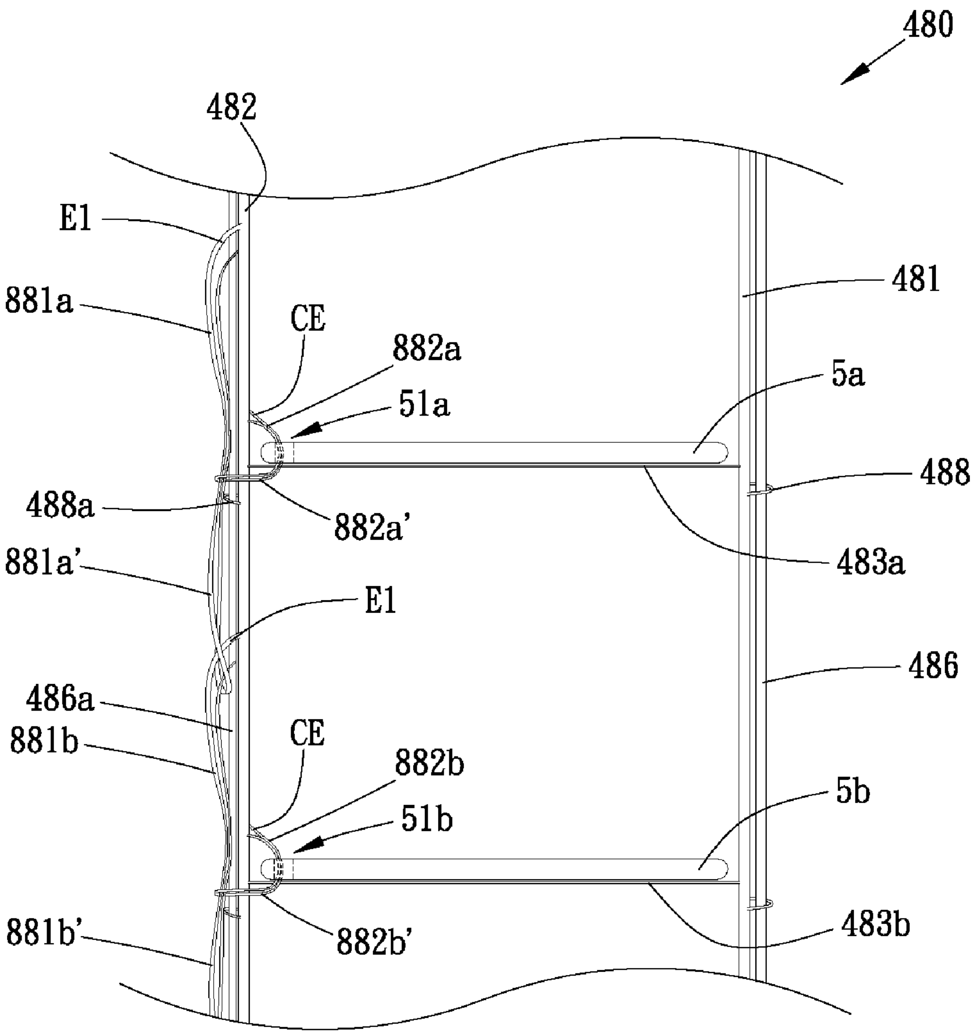
FIG. 51 schematically illustrates the ladder tape in FIG. 50 assembled with the slats.

Please keep referring to FIGS. 50 to 52. For the present exemplified ladder tape 480, the first slat 5*a* is closer to the upper rail 1 than the second slat 5*b*. On the second longitudinal cord 482, the fourth position P4 where the first slat-through portion 882*a* disposed is closer to the upper rail 1 than the second position P2 where the first bearer 483*a* disposed; the third position P3 where the main portion 881*a* of the first limiting member 88*a* disposed is closer to the upper rail 1 than the fourth position P4 where the first slat-through portion 882*a* disposed; the fourth position P4 where the second slat-through portion 882*b* disposed is closer to the upper rail 1 than the second position P2 where the second bearer 483*b* disposed; the third position P3 where the second main portion 881*b* of the second limiting member 88*b* disposed is closer to the upper rail 1 than the fourth position P4 where the second slat-through portion 882*b* disposed. It is worthy to note that the difference between the present exemplified ladder tape 480 and the all above-mentioned exemplified ladder tapes is that the first main portion 881 of the limiting members 881 of this exemplified ladder tape 400 passing through the limiting loop 882' from top to bottom, are located by an outer side of the second longitudinal cord 482 instead of being located between the first longitudinal cord 481 and the second longitudinal cord 482.

Figure 53:
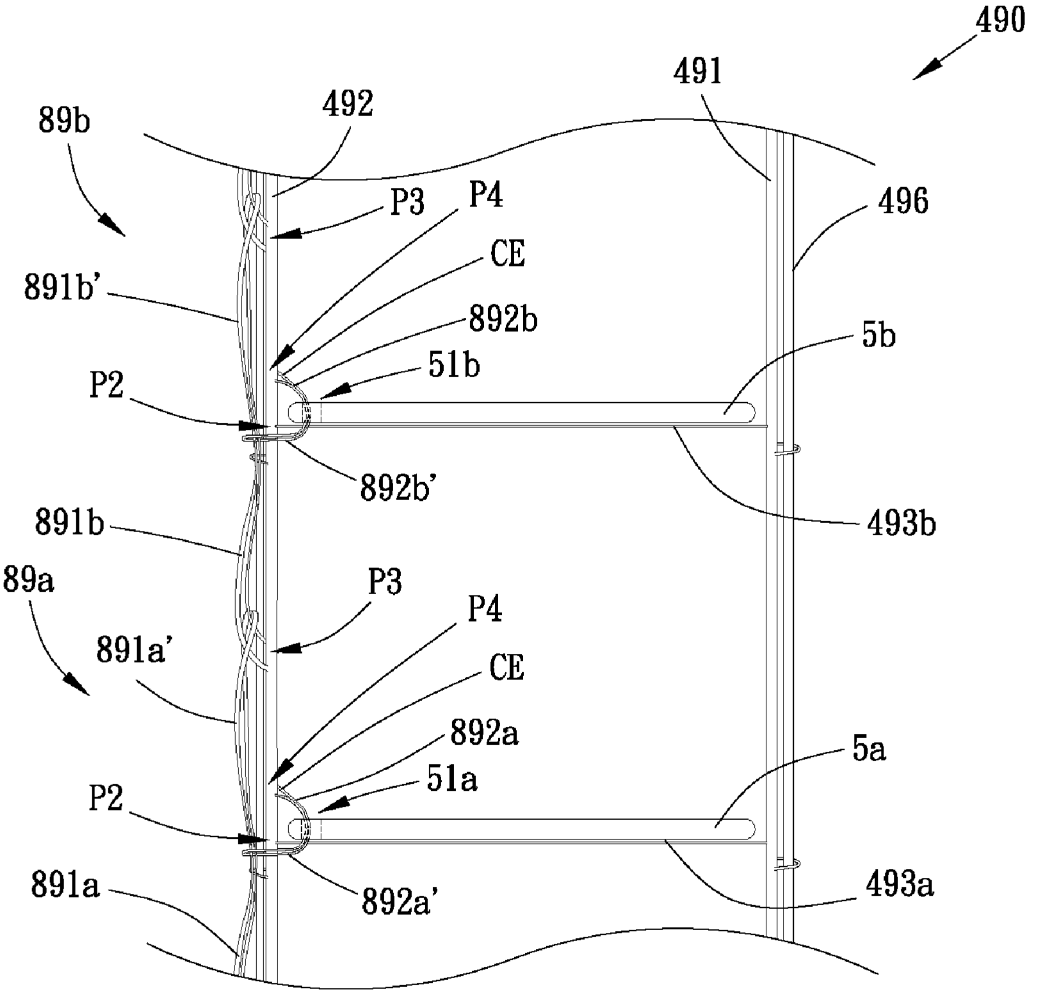
FIG. 53 is a partial left side view of a further exemplified ladder tape of the present disclosure applied to the window blind in FIG. 37, wherein an original structure thereof is identical to one of the ladder tape in FIG. 50 but the limiting members thereof are linked in other way.
Figure 54:
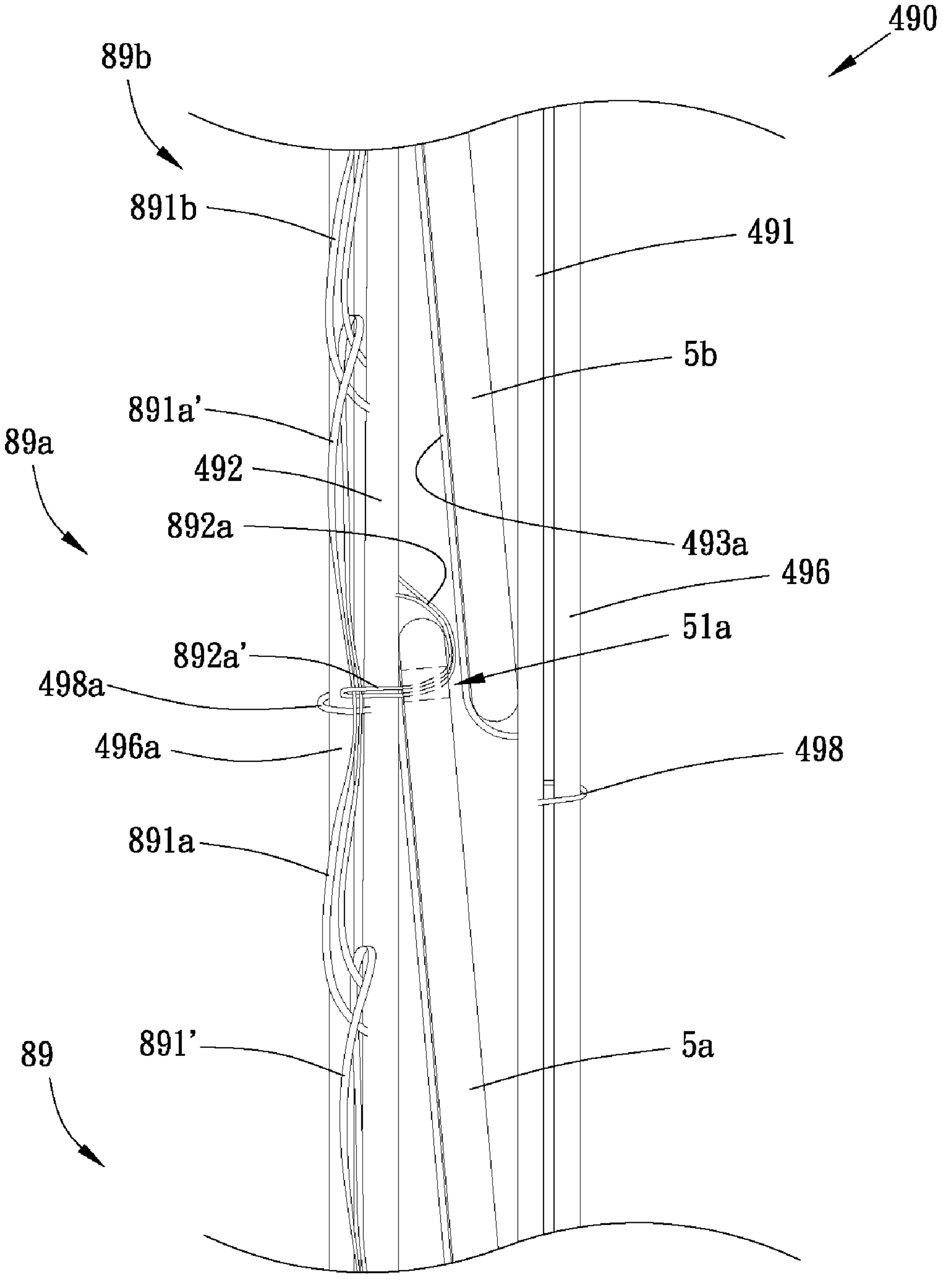
FIG. 54 schematically illustrates the ladder tape in FIG. 53 assembled with the slats while the slats are closed.

Referring to FIGS. 53 and 54, which illustrate a further exemplified ladder tape according to the fifth embodiment. The ladder tape 490 has the same original structure as the ladder tape 480 shown in FIG. 50. However, the main portions of the limiting members of the ladder tape 480 are linked to one another from top to bottom, whereas the main portions of the limiting members of the ladder tape 490 are linked to one another from bottom to top. In other words, although the original structures of the ladder tapes 480 and 490 are basically the same, the main portions of their limiting members are linked in opposite sequences, such that different limiting members are defined as the first limiting member, the second limiting member, the last member and the fixed member.

The ladder tape 490 comprises a first longitudinal cord 491, a second longitudinal cord 492, plural bearers 493 and the plural limiting members 89. The limiting members 89 comprise a first limiting member 89*a* and a second limiting member 89*b* neighboring thereto, while the first limiting member 89*a* is arranged below the second limiting member 89*b*. The first limiting member 89*a* comprises a first main portion 891*a* and a first slat-through portion 892*a*. One end of the first main portion 891*a* is disposed on the corresponding third position P3 (not shown in FIG. 53) on the second longitudinal cord 492. A connecting end CE of the first slat-through portion 892*a* is disposed on the corresponding fourth position P4 on the second longitudinal cord 492. The first main portion 891*a* and the first slat-through portion 892*a* are disposed at two different sides of the second longitudinal cord 492, and respectively extend in different directions to be away from the second longitudinal cord 492. The first slat-through portion 892*a* forms a first limiting loop 492*a*' after passing through the first through hole 51*a* of the first slat 5*a* from top to bottom. The first main portion 891*a* forms a first linking loop 891*a*' after passing through the first limiting loop 892*a*' from bottom to top. The second limiting member 89*b* comprises a second main portion 891*b* and a second slat-through portion 892*b*. One end of the second main portion 891*b* is disposed on the corresponding third position P3 on the second longitudinal cord 492. A connecting end CE of the second slat-through portion 892*b* is disposed on the corresponding fourth position P4 on the second longitudinal cord 492. The second main portion 891*b* and the second slat-through portion 892*b* are disposed at two different sides of the second longitudinal cord 492, and respectively extend in different directions to be away from the second longitudinal cord 492. The second slat-through portion 892*b* forms a second limiting loop 892*b*' after passing through the second through hole 51*b* of the second slat 5*b* from top to bottom. After passing through the second limiting loop 892*b*' from bottom to top, the second main portion 891*b* forms a second linking loop 891*a*', which is provided for the main portion of the next limiting member 89 to penetrate into, and so on.

Please keep referring to FIGS. 53 and 54. For the present exemplified ladder tape 490, the first slat 5*a* is closer to the lower rail 2 than the second slat 5*b*. On the second longitudinal cord 492, the third position P3 where the main portion 891*a* of the first limiting member 89*a* disposed (not shown in FIG. 53) is closer to the lower rail 2 than the second position P2 where the first bearer 493*a* disposed; the third position P3 where the second main portion 891*b* of the second limiting member 89*b* disposed is closer to the lower rail 2 than the second position P2 where the second bearer 493*b* disposed; the second position P2 where the second bearer 493*b* disposed is closer to the lower rail 2 than the fourth position P4 where the second slat-through portion 892*b* disposed. It is worthy to note that the first main portion 891*a* and the second main portion 891*b* of this exemplified ladder tape 400, which respectively pass through the first limiting loop 892*a*' and the second limiting loop 892*b*' from top to bottom, are located by an outer side of the second longitudinal cord 492 instead of being located between the first longitudinal cord 491 and the second longitudinal cord 492.

Figure 55:
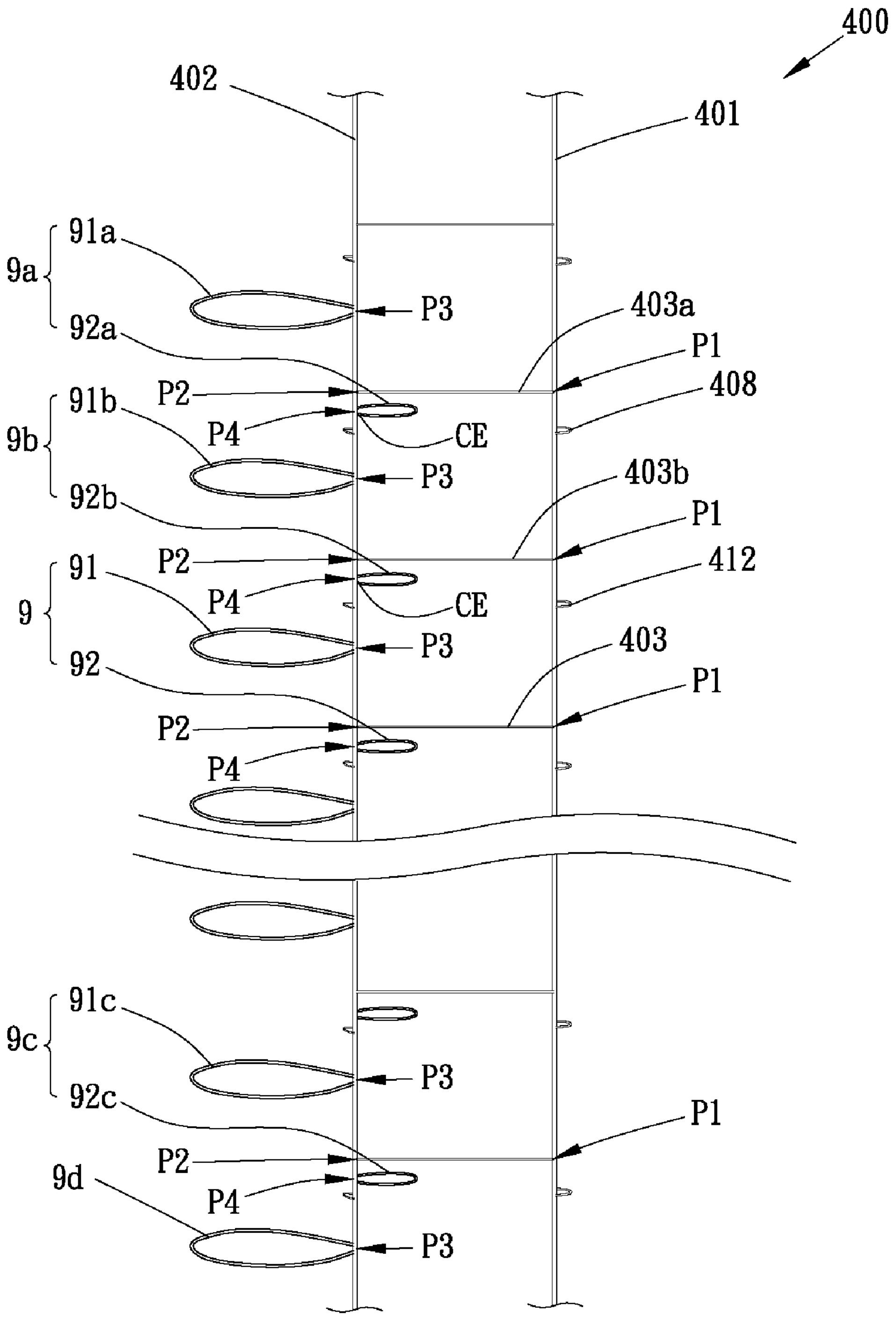
FIG. 55 is a schematic diagram illustrating an original structure of a still further exemplified ladder tape of the present disclosure, as the still further exemplified ladder tape is not assembled with the slats yet.
Figure 56:
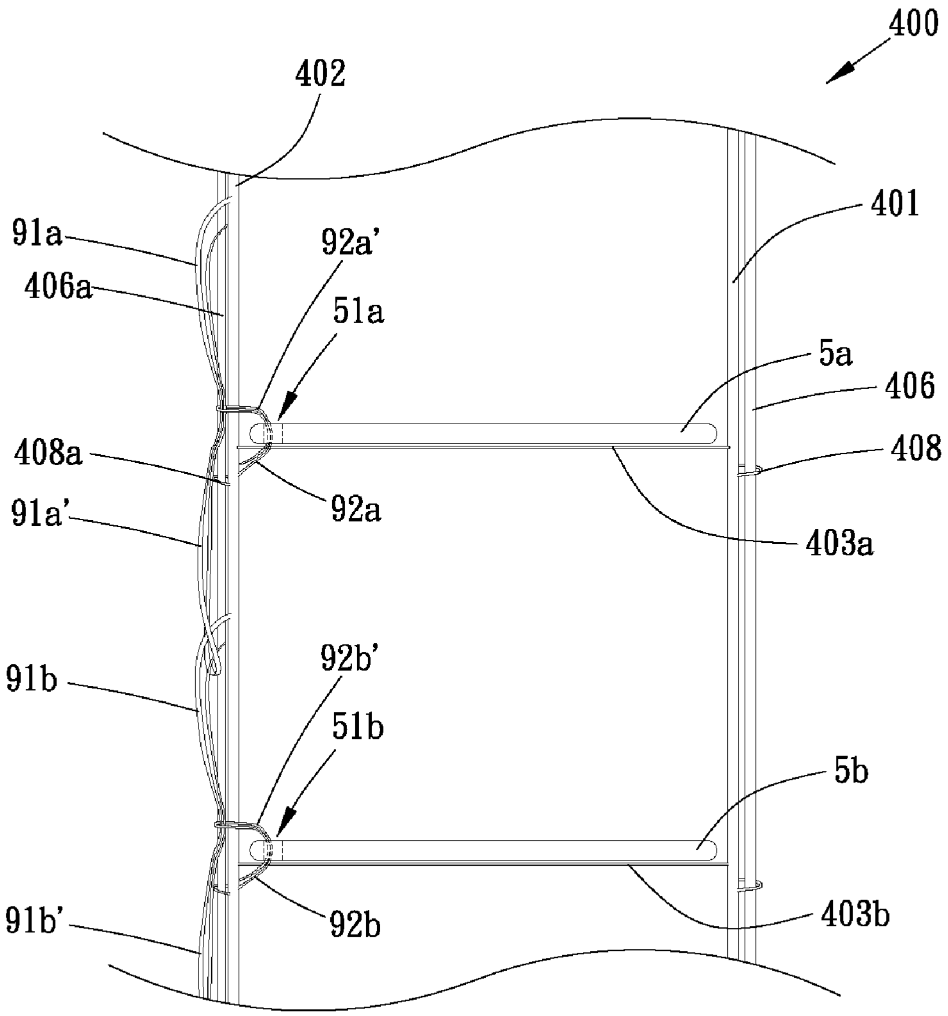
FIG. 56 schematically illustrates the ladder tape in FIG. 55 assembled with the slats.
Figure 57:
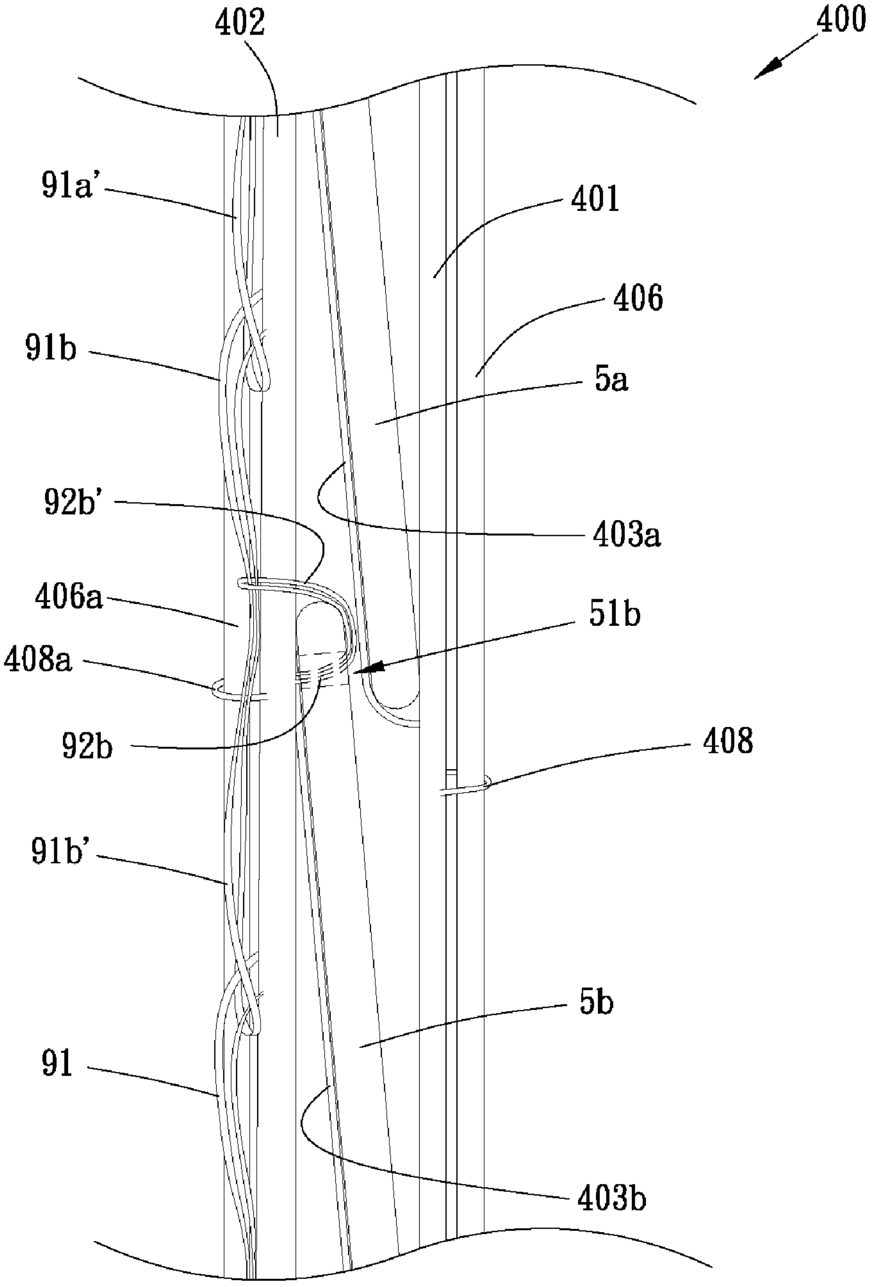
FIG. 57 schematically illustrates the ladder tape in FIG. 55 assembled with the slats while the slats are closed.

Referring to FIGS. 55 and 57, which illustrate a still further exemplified ladder tape according to the fifth embodiment. The ladder tape 400 comprises a first longitudinal cord 401, a second longitudinal cord 402, plural bearers 403 and plural limiting members 9. The limiting members 9 are vertically arranged on the second longitudinal cord 402, and comprise a first limiting member 9*a* and a second limiting member 9*b* adjacent thereto. The first limiting member 9*a* is arranged above the second limiting member 9*b*. The first limiting member 9*a* comprises a first main portion 91*a* and a first slat-through portion 92*a*. One end of the first main portion 91*a* is disposed on the corresponding third position P3 on the second longitudinal cord 402. A connecting end CE of the first slat-through portion 92*a* is disposed on the corresponding forth position P4 on the second longitudinal cord 402. The first main portion 91*a* and the first slat-through portion 92*a* are disposed at two different sides of the second longitudinal cord 402, and respectively extend in different directions to be away from the second longitudinal cord 402. The first slat-through portion 92*a* forms a first limiting loop 92*a*' after passing through the first through hole 51*a* of the first slat 5*a* from bottom to top. The first main portion 91*a* forms a first linking loop 91*a*' after passing through the first limiting loop 92*a*' from top to bottom. The second limiting member 9*b* comprises a second main portion 91*b* and a second slat-through portion 92*b*. One end of the second main portion 91*b*, which is also a first end E1 of the second limiting member 9*b*, is disposed on the corresponding third position P3 on the second longitudinal cord 402. A connecting end CE of the second slat-through portion 92*b* is disposed on the corresponding forth position P4 on the second longitudinal cord 402. The second main portion 91*b* and the second slat-through portion 92*b* are disposed at two different sides of the second longitudinal cord 402, and respectively extend in different directions to be away from the second longitudinal cord 402. The second slat-through portion 92*b* forms a second limiting loop 92*b*' after passing through the second through hole 51*b* of the second slat 5*b* from bottom to top. The second main portion 91*b* forms a second linking loop 91*b*' after passing through the second limiting loop 92*b*' from top to bottom, and the second linking loop 91*b*' is for the main portion 91 of the next limiting member 9 to penetrate into, and so forth.

Please keep referring to FIGS. 55 and 57. For the present exemplified ladder tape 400, the first slat 5*a* is closer to the upper rail 1 than the second slat 5*b*. On the second longitudinal cord 402, the third position P3 where the main portion 91*a* of the first limiting member 9*a* disposed is closer to the upper rail 1 than the second position P2 where the first bearer 403*a* disposed; the second position P2 where the first bearer 403*a* disposed is closer to the upper rail 1 than the fourth position P4 where the first slat-through portion 92*a* disposed; the third position P3 where the second main portion 91*b* of the second limiting member 9*b* disposed is closer to the upper rail 1 than the second position P2 where the second bearer 403*b* disposed; the second position P2 where the second bearer 403*b* disposed is closer to the upper rail 1 than the fourth position P4 where the second slat-through portion 92*b* disposed. It is worthy to note that the first main portion 91*a* and the second main portion 91*b* of this exemplified ladder tape 400, which respectively pass through the first limiting loop 92*a*' and the second limiting loop 92*b*' from top to bottom, are located by an outer side of the second longitudinal cord 402 instead of being located between the first longitudinal cord 401 and the second longitudinal cord 402.

With the above-mentioned exemplified ladder tapes according to the fifth embodiment of the present disclosure, the main portions of the limiting members are disposed on the second longitudinal cord at intervals, and can be selectively disposed on the side of the second longitudinal cord close to or away from the first longitudinal cord, as correspondingly extending in a direction close to or away from the first longitudinal cord. The slat-through portions of the limiting members are also disposed on the second longitudinal cord at intervals. For each of the limiting members, the slat-through portion is closer to the corresponding bearer than the main portion, and can be set above or below the corresponding bearer. Accordingly, the slat-through portion is then threaded through the through hole of the slat supported by the corresponding bearer from top to bottom or from bottom to top, and forms a limiting loop. The main portion can pass through the limiting loop formed by the corresponding slat-through portion, in an upward direction or in a downward direction, selectively along a path between the first longitudinal cord and the second longitudinal cord or a path on an outer side of the second longitudinal cord, then forming a linking loop for the main portion of the next limiting member to penetrate into. Except for the limiting member arranged in the first place, each limiting member has its main portion passing through the linking loop produced by the main portion of the previous limiting member before passing through the limiting loop formed by the corresponding slat-through portion, thereby limiting the main portion of the previous limiting member. With the arrangements mentioned above, the through hole of each slat remains threaded through by either the main portion or the slat-through portion of the corresponding limiting member. The main portion of each limiting member cooperates with the slat-through portion to limit the position of the slat to between the first longitudinal cord and the second longitudinal cord, such that the slats are prevented from being drawn out. In the meantime, small circumferences of the slat-through portions not only prevent the excessive lateral movements of the slats, but also limit downwardly sliding degree of the slats while the slats are tilted to be in the closed state. Therefore, the slats can finely close for preventing light leakages and protecting user's privacy.

In some other embodiments, the above-mentioned exemplified ladder tapes according to the fifth embodiment can also be applied to the window blind 130 according to the fourth embodiment of the present disclosure, as the window blind 130 does not comprise the lifting mechanism, the pulling cords and the locating rings. In other words, for the above-mentioned exemplified ladder tapes according to the fifth embodiment, it is not necessary to be used together with the lifting mechanism, the pulling cords and the locating rings. Without the lifting mechanism, the pulling cords and the locating rings, the above-mentioned exemplified ladder tapes according to the fifth embodiment still can be applied to the window blind 130 and implemented to achieve the following effects: preventing the slats from excessively moving in the lateral direction which may result in the slats being pulled out from the ladder tape, and helping the slats to be fully closed.

The embodiments described above are only some exemplary embodiments of the present disclosure. All equivalent structures which employ the concepts disclosed in this specification and the appended claims should fall within the scope of the present disclosure.

What is claimed is:

1. A window blind switchable between a first state and a second state allowing different amount of light passing through the window blind, the window blind comprising:
- an upper rail;
- a lower rail, situated below the upper rail;
- a deflecting mechanism, disposed on the upper rail;
- a ladder tape, connected to the deflecting mechanism and comprising:
  - a first longitudinal cord, having plural first positions thereon spaced a predetermined interval apart from each other;
  - a second longitudinal cord, substantially parallel to and spaced from the first longitudinal cord, the second longitudinal cord having plural second positions and plural third positions thereon, wherein when the window blind is in the first state, the second positions are respectively at substantially the same height as the first positions, and the third positions are respectively adjacent to the second positions;
  - plural bearers, situated between the first longitudinal cord and the second longitudinal cord, each of the bearers having one end connected to a respective one of the first positions on the first longitudinal cord, and another end connected to a respective one of the second positions on the second longitudinal cord; and plural limiting members, each of the limiting members having a first end disposed on a respective one of the third positions on the second longitudinal cord and a second end opposing to the first end, the limiting members comprising a first limiting member and a second limiting member adjacent to the first limiting member; and plural slats, situated between the upper rail and the lower rail and respectively supported by the bearers, wherein a first end of the first longitudinal cord and a first end of the second longitudinal cord are connected to the deflecting mechanism for suspending the ladder tape below the upper rail, and a second end of the first longitudinal cord and a second end of the second longitudinal cord are connected to the lower rail; the deflecting mechanism is configured to drive the first longitudinal cord and the second longitudinal cord to move in opposite directions, by which the bearers are tilted along with movements of the first longitudinal cord and the second longitudinal cord so that the slats supported thereby are concurrently tilted, making the window blind switched from the first state in which the slats are in horizontal positions to the second state in which the slats are tilted as a lateral edge of each slat keeps a minimum distance from another lateral edge of the neighboring slat;

wherein the bearers comprise a first bearer and a second bearer adjacent to the first bearer; the slats comprise a first slat and a second slat adjacent to the first slat which are supported by the first bearer and the second bearer respectively, and the first slat has a first through hole adjacent to the second longitudinal cord; the first limiting member comprises a first slat-through portion and a first linking loop, wherein the first slat-through portion is located between the first end and the second end of the first limiting member and passes through the first through hole of the first slat, and the second end of the first limiting member is located at the first linking loop; the second limiting member passes through the first linking loop.

2. The window blind of claim 1, wherein the first limiting member passes through the first through hole of the first slat, after which the portion of the first limiting member passing through and within the first through hole is defined as the first-slat portion, and the portion of the first limiting member has passed through and outside the first through hole is defined as the first linking loop; the second limiting member passes through the first linking loop, such that the first through hole remains threaded through by one of the first limiting member and the second member.

3. The window blind of claim 2, wherein the second slat comprises a second through hole adjacent to the second longitudinal cord, and the second limiting member comprises a second slat-through portion located between the first end and the second end of the second limiting member; the second limiting member sequentially passes through the first linking loop and the second through hole of the second slat, such that the second slat-through portion is passing through the second through hole for limiting the first limiting member to passing through the first through hole of the first slat.

4. The window blind of claim 2, wherein the third positions are spaced the predetermined interval apart from each other.

5. The window blind of claim 2, wherein the limiting members comprise a last limiting member and a fixed limiting member; the slats comprise a last slat which is the closest one of the slats to the lower rail and has a last through hole adjacent to the second longitudinal cord; the first slat is closer to the upper rail than the second slat; on the second longitudinal cord, the third position connected to the last limiting member is closer to the upper rail than the third position connected to the fixed limiting member; the last limiting member comprises a last slat-through portion and a last linking loop, wherein the last slat-through portion is located between the first end and the second end of the last limiting member; the last limiting member passes through the last through hole of the last slat, after which the portion of the last limiting member passing through and within the last through hole is defined as the last slat-through portion, and the portion of the last limiting member has passed through and outside the last through hole is defined as the last linking loop; the fixed limiting member passes through the last linking loop and the second end of the fixed limiting member is fixed to the lower rail, such that the last limiting member is limited to passing through the last through hole of the last slat.

6. The window blind of claim 5, further comprising:

a lifting mechanism, disposed on one of the upper rail and the lower rail;

a pulling cord, having a first end connected to the lifting mechanism for being released or retracted thereby along with change of the distance between the upper rail and the lower rail, and a second end extending to another one of the upper rail and the lower rail other than the one where the lifting mechanism disposed; and plural locating rings spaced apart from each other and connected to at least one of the first longitudinal cord and the second longitudinal cord, wherein the pulling cord passes through at least one of the locating rings.

7. The window blind of claim 6, wherein each of the limiting members is ring-shaped, the circumference of each limiting member is larger than twice the length of the predetermined interval, and the circumference of each locating ring is lesser than the circumference of each limiting member.

8. The window blind of claim 6, wherein the limiting members and the locating rings are integrated into one piece with the second longitudinal cord.

9. The window blind of claim 2, wherein the limiting members comprise a last limiting member and a fixed limiting member; the slats comprise a last slat which is the closest one of the slats to the upper rail and has a last through hole adjacent to the second longitudinal cord; the first slat is closer to the lower rail than the second slat; on the second longitudinal cord, the third position connected to the last limiting member is closer to the lower rail than the third position connected to the fixed limiting member; the last limiting member comprises a last slat-through portion and a last linking loop, wherein the last slat-through portion is located between the first end and the second end of the last limiting member; the last limiting member passes through the last through hole of the last slat, after which the portion of the last limiting member passing through and within the last through hole is defined as the last slat-through portion, and the portion of the last limiting member has passed through and outside the last through hole is defined as the last linking loop; the fixed limiting member passes through the last linking loop and the second end of the fixed limiting member is fixed to the second longitudinal cord, such that the last limiting member is limited to passing through the last through hole of the last slat.

10. The window blind of claim 1, wherein the second longitudinal cord further has plural fourth positions arranged in staggered relation to the third positions; the first limiting member further comprises a first main portion extending from the first end of the first limiting member to the second end of the first limiting member; the first slat-through portion comprises a connecting end disposed on the corresponding fourth position on the second longitudinal cord; on the second longitudinal cord, the fourth position where the first slat-through portion disposed is closer to the second position where the first bearer disposed than the third position where the first limiting member disposed; the first slat-through portion forms a first limiting loop after passing through the first through hole, and the first main portion passes through the first limiting loop for keeping the first through hole threaded through by one of the first slat-through portion and the first main portion.

11. The window blind of claim 10, wherein the first linking loop is formed after the first main portion passes through the first limiting loop.

12. The window blind of claim 10, wherein the third positions are spaced the predetermined interval apart from each other.

13. The window blind of claim 10, wherein the fourth positions are spaced the predetermined interval apart from each other.

14. The window blind of claim 10, wherein the second slat comprises a second through hole adjacent to the second longitudinal cord, and the second limiting member comprises:

a second main portion, extending from the first end of the second limiting member to the second end of the second limiting member;

a second slat-through portion, having a connecting end disposed on the corresponding fourth position of the second longitudinal cord and forming a second limiting loop after passing through the second through hole of the second slat; and a second linking loop, formed by the second main portion after the second main portion sequentially passes through the first linking loop and the second limiting loop, wherein the second end of the second limiting member is located at the second linking loop.

15. The window blind of claim 14, wherein the first slat is closer to the upper rail than the second slat; on the second longitudinal cord, the fourth position where the first slat-through portion disposed is closer to the upper rail than the second position where the first bearer disposed, the third position where the first limiting member disposed is closer to the upper rail than the fourth position where the first slat-through portion disposed, the fourth position where the second slat-through portion disposed is closer to the upper rail than the second position where the second bearer disposed, and the third position where the second limiting member disposed is closer to the upper rail than the fourth position where the second slat-through portion disposed.

16. The window blind of claim 15, further comprising:

a lifting mechanism, disposed on one of the upper rail and the lower rail;

a pulling cord, having a first end connected to the lifting mechanism for being released or retracted thereby along with change of the distance between the upper rail and the lower rail, and a second end extended to another one of the upper rail and the lower rail other than the one where the lifting mechanism disposed; and plural locating rings spaced apart from each other and connected to at least one of the first longitudinal cord and the second longitudinal cord, wherein the pulling cord passes through at least one of the locating rings.

17. The window blind of claim 16, wherein each of the limiting members comprises a main portion which is ring-shaped and the circumference of the main portion is larger than twice the length of the predetermined interval, the slat-through portion of each limiting member is ring-shaped and the circumference thereof is lesser than the circumference of the main portion of each limiting member, and the circumference of each locating ring is lesser than the circumference of the slat-through portion of each limiting member.

18. The window blind of claim 16, wherein the main portions and the slat-through portions of the limiting members, and the locating rings, are integrated into one piece with the second longitudinal cord.

19. The window blind of claim 14, wherein the first slat is closer to the upper rail than the second slat; on the second longitudinal cord, the third position where the first limiting member disposed is closer to the upper rail than the second position where the first bearer disposed, the second position where the first bearer disposed is closer to the upper rail than the fourth position where the first slat-through portion disposed, and the second position where the second bearer disposed is closer to the upper rail than the fourth position where the second slat-through portion disposed.

20. The window blind of claim 14, wherein the first slat is closer to the lower rail than the second slat; on the second longitudinal cord, the third position where the first limiting member disposed is closer to the lower rail than the second position where the first bearer disposed, the second position where the first bearer disposed is closer to the lower rail than the fourth position where the first slat-through portion disposed, and the second position where the second bearer disposed is closer to the lower rail than the fourth position where the second slat-through portion disposed.

21. The window blind of claim 14, wherein the first slat is closer to the lower rail than the second slat; on the second longitudinal cord, the fourth position where the first slat-through portion disposed is closer to the lower rail than the second position where the first bearer disposed, the third position where the first limiting member disposed is closer to the lower rail than the fourth position where the first slat-through portion disposed, the fourth position where the second slat-through portion disposed is closer to the lower rail than the second position where the second bearer disposed, and the third position where the second limiting member disposed is closer to the lower rail than the fourth position where the second slat-through portion disposed.

22. The window blind of claim 1, wherein the bearers further comprise a top bearer which is the closest one of the bearers to the upper rail and comprises two adjusting units; the slats further comprise a top slat disposed between the adjusting units, the top slat has at least one notch for receiving at least one of the first longitudinal cord and the second longitudinal cord.

23. The window blind of claim 1, further comprising an anchoring member fixedly connected to the lower rail, and the first longitudinal cord and the second longitudinal cord are connected to the lower rail by the anchoring member.

* * * * *